(12) United States Patent
Murakami et al.

(10) Patent No.: US 12,068,903 B2
(45) Date of Patent: *Aug. 20, 2024

(54) TECHNOLOGIES FOR GENERATING AND PROCESSING SIGNALS

(71) Applicant: Apple Inc., Cupertino, CA (US)

(72) Inventors: Yutaka Murakami, Kanagawa (JP); Tomohiro Kimura, Osaka (JP); Mikihiro Ouchi, Osaka (JP)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,949

(22) Filed: Jun. 5, 2023

(65) Prior Publication Data

US 2023/0318902 A1 Oct. 5, 2023

Related U.S. Application Data

(63) Continuation of application No. 17/578,359, filed on Jan. 18, 2022, now Pat. No. 11,671,304, which is a (Continued)

(30) Foreign Application Priority Data

Feb. 14, 2017 (JP) ................................. 2017-025126

(51) Int. Cl.
*H04L 27/36* (2006.01)
*H04L 5/00* (2006.01)
(Continued)

(52) U.S. Cl.
CPC ........ *H04L 27/362* (2013.01); *H04L 27/0008* (2013.01); *H04L 27/04* (2013.01); (Continued)

(58) Field of Classification Search
CPC ... H04L 5/0023; H04L 27/0008; H04L 27/04; H04L 27/183; H04L 27/20; H04L 27/3488; H04L 27/36; H04L 27/362; H04L 27/389
See application file for complete search history.

(56) References Cited

U.S. PATENT DOCUMENTS 10,411,944 B2  9/2019  Murakami et al.
10,659,276 B2  5/2020  Murakami et al.
(Continued)

FOREIGN PATENT DOCUMENTS

CN   105450277 A   3/2016
CN   105721111 A   6/2016
(Continued)

OTHER PUBLICATIONS

Digital Video Broadcasting (DVB); Next Generation Broadcasting System to Handheld, Physical Layer Specification (DVB-NGH), DVB Document A160, Available Online at: https://dvb.org/wp-content/uploads/2019/12/A160_DVB-NGH_Spec.pdf, Nov. 2012, 295 pages.
(Continued)

*Primary Examiner* — David B Lugo
(74) *Attorney, Agent, or Firm* — Kilpatrick Townsend & Stockton LLP

(57) ABSTRACT

Embodiments include devices and methods that improves quality in radio transmission/reception using a single-carrier scheme and/or a multi-carrier scheme.

20 Claims, 21 Drawing Sheets

Related U.S. Application Data continuation of application No. 17/182,798, filed on Feb. 23, 2021, now Pat. No. 11,258,651, which is a continuation of application No. 16/848,057, filed on Apr. 14, 2020, now Pat. No. 10,979,276, which is a continuation of application No. 16/448,607, filed on Jun. 21, 2019, now Pat. No. 10,659,276, which is a continuation of application No. 16/079,693, filed as application No. PCT/JP2017/007372 on Feb. 27, 2017, now Pat. No. 10,411,944.

(60) Provisional application No. 62/301,055, filed on Feb. 29, 2016.

(51) Int. Cl.
| | | |
|---|---|---|
| *H04L 27/00* | (2006.01) | |
| *H04L 27/04* | (2006.01) | |
| *H04L 27/18* | (2006.01) | |
| *H04L 27/20* | (2006.01) | |
| *H04L 27/34* | (2006.01) | |
| *H04L 27/38* | (2006.01) | |

(52) U.S. Cl.
CPC ............ *H04L 27/183* (2013.01); *H04L 27/20* (2013.01); *H04L 27/3488* (2013.01); *H04L 27/36* (2013.01); *H04L 27/389* (2013.01); *H04L 5/0023* (2013.01)

(56) References Cited

U.S. PATENT DOCUMENTS

| | | | |
|---|---|---|---|
| 10,873,492 | B2 | 12/2020 | Murakami et al. |
| 10,979,276 | B2 | 4/2021 | Murakami et al. |
| 11,258,651 | B2 | 2/2022 | Murakami et al. |
| 11,671,304 | B2 | 6/2023 | Murakami et al. |
| 11,876,664 | B2 | 1/2024 | Murakami et al. |
| 2011/0255870 | A1 | 10/2011 | Grigoryan et al. |
| 2013/0195158 | A1 | 8/2013 | Bae et al. |
| 2014/0205032 | A1 | 7/2014 | Murakami et al. |
| 2014/0269861 | A1 | 9/2014 | Eliaz |
| 2015/0030006 | A1 | 1/2015 | Fujio et al. |
| 2016/0013841 | A1 | 1/2016 | Murakami et al. |
| 2018/0302131 | A1 | 10/2018 | Zhao et al. |
| 2018/0316399 | A1 | 11/2018 | Murakami et al. |
| 2019/0349224 | A1* | 11/2019 | Chiskis ............... H04B 3/32 |
| 2020/0267701 | A1* | 8/2020 | Park ................ H04W 72/23 |
| 2022/0141078 | A1 | 5/2022 | Murakami et al. |

FOREIGN PATENT DOCUMENTS

| | | |
|---|---|---|
| EP | 2930871 A1 | 10/2015 |
| JP | 2014212565 A | 11/2014 |
| WO | 2010038474 A1 | 4/2010 |
| WO | 2015115079 A1 | 8/2015 |

OTHER PUBLICATIONS

Part 11: Wireless LAN Medium Access Control (MAC) and Physical Layer (PHY) Specifications; Amendment 3:Enhancements for Very High Throughput in the 60 GHz Band, IEEE Std 802.11ad, Dec. 28, 2012, 627 pages.

U.S. Appl. No. 17/091,200 , Non-Final Office Action, Mailed On Mar. 29, 2022, 10 pages.

U.S. Appl. No. 17/091,200 , Notice of Allowance, Mailed On Feb. 21, 2023, 10 pages.

U.S. Appl. No. 17/091,200 , Notice of Allowance, Mailed On Sep. 8, 2022, 14 pages.

U.S. Appl. No. 17/182,798 , Non-Final Office Action, Mailed On Jun. 24, 2021, 6 pages.

U.S. Appl. No. 17/182,798 , Notice of Allowance, Mailed On Oct. 20, 2021, 7 pages.

U.S. Appl. No. 17/578,359 , Non Final Office Action, Mailed On Sep. 2, 2022, 10 pages.

U.S. Appl. No. 17/578,359 , Notice of Allowance, Mailed On Jan. 25, 2023, 6 pages.

Bingham, Multicarrier Modulation for Data Transmission: An Idea Whose Time Has Come, Institute of Electrical and Electronics Engineers Communications Magazine, vol. 28, No. 5, May 1990, 8 pages.

China Patent Application No. 201780042674.X , Notice of Decision to Grant, Mailed On Jun. 1, 2021, 8 pages.

European Patent Application No. 17827647.3 , Communication under Rule 71(3) EPC, Apr. 14, 2020, 8 pages.

Gomez-Barquero et al., MIMO for ATSC 3.0, Institute of Electrical and Electronics Engineers Transactions on Broadcasting, vol. 62, No. 1, Jan. 2016, pp. 1-8.

Japan Patent Application No. 2018-527620 , Notice of Decision to Grant, Mailed On Apr. 27, 2021, 5 pages.

Loghin et al., Non-Uniform Constellations for ATSC 3.0, Institute of Electrical and Electronics Engineers Transactions on Broadcasting, vol. 62, No. 1, Mar. 2016, pp. 197-203.

International Patent Application No. PCT/JP2017/007372 , International Search Report and Written Opinion, Mailed On May 9, 2017, 11 pages.

International Patent Application No. PCT/JP2017/025349 , International Search Report and Written Opinion, Mailed On Sep. 19, 2017, 12 pages.

\* cited by examiner

TECHNOLOGIES FOR GENERATING AND PROCESSING SIGNALS

CROSS-REFERENCES TO RELATED APPLICATIONS

This application is a continuation of U.S. patent application Ser. No. 17/578,359, filed Jan. 18, 2022, which is a continuation of U.S. patent application Ser. No. 17/182,798, filed Feb. 23, 2021, which is a continuation of U.S. patent application Ser. No. 16/848,057, filed Apr. 14, 2020, which is a continuation of U.S. patent application Ser. No. 16/448,607, filed Jun. 21, 2019, which is a continuation of U.S. patent application Ser. No. 16/079,693, filed Aug. 24, 2018, which is a 371 U.S. National Phase of PCT International Patent Application No. PCT/JP2017/007372, filed Feb. 27, 2017, which claims priority to U.S. Patent Application No. 62/301,055, filed Feb. 29, 2016. This application also claims the benefit of Japan Patent Application No. 2017-025126, filed Feb. 14, 2017. The disclosures of which are herein incorporated by reference in their entireties for all purposes.

TECHNICAL FIELD

The present disclosure relates to a transmission method, a transmission device, a reception method, and a reception device.

BACKGROUND OF THE INVENTION

As radio communications schemes, single-carrier schemes and multi-carrier schemes such as OFDM (orthogonal frequency division multiplexing) (for example, see Patent Literature (PTL) 1) have been proposed. Multi-carrier schemes are advantageous in that they provide a high frequency-usage efficiency and are suitable for large-capacity transmission. Single-carrier schemes are advantageous in that they do not require signal processing such as FFT (fast Fourier transform) or IFFT (inverse FFT), and are thus suitable for realizing a low power consumption implementation.

CITATION LIST

Non-Patent Literature

NPTL 1: J. A. C. Bingham, "Multicarrier Modulation for Data Transmission: An Idea Whose Time Has Come," IEEE Communications Magazine, May 1990.

BRIEF SUMMARY OF THE INVENTION

Technical Problem

In radio communication using a single-carrier scheme and/or multi-carrier scheme, a technique for improving data reception quality is desired.

Solutions to Problem

A transmission method according to one aspect of the present disclosures includes a mapping step, a signal processing step, and a transmission step. In the mapping step, a plurality of first modulated signals s1(i) and a plurality of second modulated signals s2(i) are generated from transmission data, where i is a symbol number that is an integer greater than or equal to 0, the plurality of first modulated signals s1(i) are signals generated using a QPSK modulation scheme, and the plurality of second modulated signals s2(i) are signals generated using 16QAM modulation. In the signal processing step, a plurality of first signal-processed signals z1(i) and a plurality of second signal-processed signals z2(i) that satisfy a predetermined equation are generated from the plurality of first modulated signals s1(i) and the plurality of second modulated signals s2(i). In the transmission step, the plurality of first signal-processed signals z1(i) and the plurality of second signal-processed signals z2(i) are transmitted using a plurality of antennas. Among the plurality of first signal-processed signals z1(i) and the plurality of second signal-processed signals z2(i), a first signal-processed signal and a second signal-processed signal that have identical symbol numbers are simultaneously transmitted at the same frequency.

A transmission device according to one aspect of the present disclosures includes a mapper, a signal processor, and a transmitter. The mapper generates a plurality of first modulated signals s1(i) and a plurality of second modulated signals s2(i) from transmission data, where i is a symbol number that is an integer greater than or equal to 0, the plurality of first modulated signals s1(i) are signals generated using a QPSK modulation scheme, and the plurality of second modulated signals s2(i) are signals generated using 16QAM modulation. The signal processor generates a plurality of first signal-processed signals z1(i) and a plurality of second signal-processed signals z2(i) that satisfy a predetermined equation from the plurality of first modulated signals s1(i) and the plurality of second modulated signals s2(i). The transmitter transmits the plurality of first signal-processed signals z1(i) and the plurality of second signal-processed signals z2(i) using a plurality of antennas. Among the plurality of first signal-processed signals z1(i) and the plurality of second signal-processed signals z2(i), a first signal-processed signal and a second signal-processed signal that have identical symbol numbers are simultaneously transmitted at the same frequency.

A reception method according to one aspect of the present disclosure includes a reception step and a demodulation step. In the reception step, reception signals are obtained by receiving a first transmission signal and a second transmission signal transmitted from different antennas. The first transmission signal and the second transmission signal are signals resulting from transmitting a plurality of first signal-processed signals z1(i) and a plurality of second signal-processed signals z2(i) using a plurality of antennas, where i is a symbol number that is an integer greater than or equal to 0, and among the plurality of first signal-processed signals z1(i) and the plurality of second signal-processed signals z2(i), a first signal-processed signal and a second signal-processed signal that have identical symbol numbers are simultaneously transmitted at the same frequency. The plurality of first signal-processed signals z1(i) and the plurality of second signal-processed signals z2(i) are signals generated by performing first signal processing on a plurality of first modulated signals s1(i) generated using a QPSK modulation scheme and a plurality of second modulated signals s2(i) generated using 16QAM modulation. The plurality of first signal-processed signals z1(i) and the plurality of second signal-processed signals z2(i) satisfy a predetermined equation in regard to the plurality of first modulated signals s1(i) and the plurality of second modulated signals s2(i). In the demodulation step, the reception signals are demodulated by performing second signal processing corresponding to the first signal processing.

A reception device according to one aspect of the present disclosure includes a receiver and a demodulator. The receiver obtains reception signals by receiving a first transmission signal and a second transmission signal transmitted from different antennas. The first transmission signal and the second transmission signal are signals resulting from transmitting a plurality of first signal-processed signals z1(i) and a plurality of second signal-processed signals z2(i) using a plurality of antennas, where i is a symbol number that is an integer greater than or equal to 0, and among the plurality of first signal-processed signals z1(i) and the plurality of second signal-processed signals z2(i), a first signal-processed signal and a second signal-processed signal that have identical symbol numbers are simultaneously transmitted at the same frequency. The plurality of first signal-processed signals z1(i) and the plurality of second signal-processed signals z2(i) are signals generated by performing first signal processing on a plurality of first modulated signals s1(i) generated using a QPSK modulation scheme and a plurality of second modulated signals s2(i) generated using 16QAM modulation. The plurality of first signal-processed signals z1(i) and the plurality of second signal-processed signals z2(i) satisfy a predetermined equation in regard to the plurality of first modulated signals s1(i) and the plurality of second modulated signals s2(i). The demodulator demodulates the reception signals by performing second signal processing corresponding to the first signal processing.

Advantageous Effect of Invention

According to the present disclosure, it is possible to improve data reception quality is desired in radio communication using a single-carrier scheme and/or multi-carrier scheme.

DETAILED DESCRIPTION OF THE INVENTION

Embodiment 1

A transmission method, transmission device, reception method, and reception device according to this embodiment will be described in detail.

Figure 1:
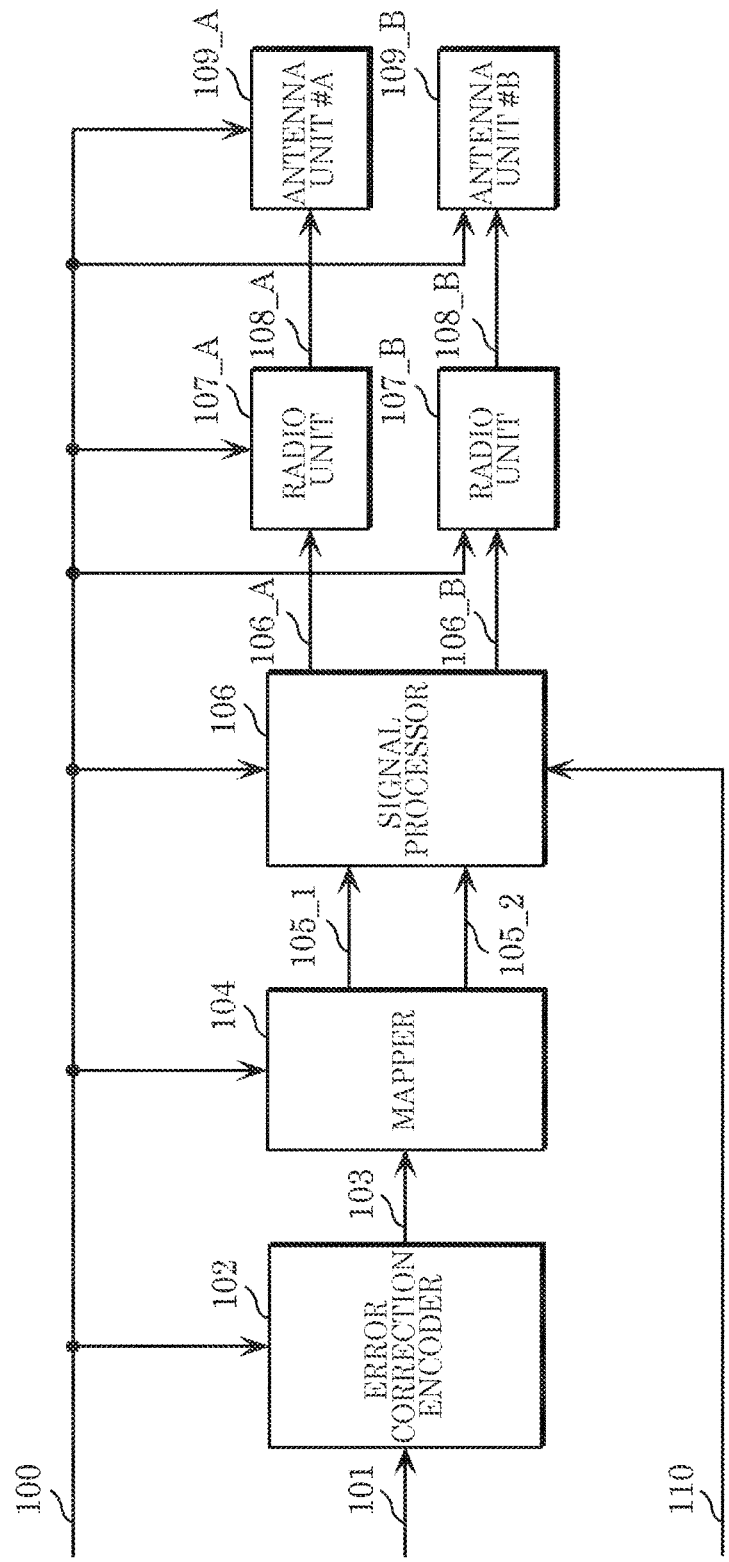
FIG. 1 illustrates one example of a configuration of a transmission device.

FIG. 1 illustrates one example of a configuration of a transmission device according to this embodiment, such as a base station, access point, or broadcast station. Error correction encoder 102 receives inputs of data 101 and control signal 100, and based on information related to the error correction code included in control signal 100 (e.g., error correction code information, code length (block length), encode rate), performs error correction encoding, and outputs encoded data 103. Note that error correction encoder 102 may include an interleaver. In such a case, error correction encoder 102 may rearrange the encoded data before outputting encoded data 103.

Mapper 104 receives inputs of encoded data 103 and control signal 100, and based on information on the modulated signal included in control signal 100, performs mapping in accordance with the modulation scheme, and outputs mapped signal (baseband signal) 105_1 and mapped signal (baseband signal) 105_2. Note that mapper 104 generates mapped signal 105_1 using a first sequence and generates mapped signal 105_2 using a second sequence. Here, the first sequence and second sequence are different.

Signal processor 106 receives inputs of mapped signals 105_1 and 105_2, signal group 110, and control signal 100, performs signal processing based on control signal 100, and outputs signal-processed signals 106_A and 106_B. Here, signal-processed signal 106_A is expressed as u1(i), and signal-processed signal 106_B is expressed as u2(i) (i is a symbol number; for example, i is an integer that is greater than or equal to 0). Note that details regarding the signal processing will be described with reference to FIG. 2 later.

Radio unit 107_A receives inputs of signal-processed signal 106_A and control signal 100, and based on control signal 100, processes signal-processed signal 106_A and outputs transmission signal 108_A. Transmission signal 108_A is then output as radio waves from antenna unit #A (109_A).

Similarly, radio unit 107_B receives inputs of signal-processed signal 106_B and control signal 100, and based on control signal 100, processes signal-processed signal 106_B and outputs transmission signal 108_B. Transmission signal 108_B is then output as radio waves from antenna unit #B (109_B).

Antenna unit #A (109_A) receives an input of control signal 100. Here, based on control signal 100, antenna unit #A (108_A) processes transmission signal 108_A and outputs the result as radio waves. However, antenna unit #A (109_A) may not receive an input of control signal 100.

Similarly, antenna unit #B (109_B) receives an input of control signal 100. Here, based on control signal 100, antenna unit #B (108_B) processes transmission signal 108_B and outputs the result as radio waves. However, antenna unit #B (109_B) may not receive an input of control signal 100.

Note that control signal 100 may be generated based on information transmitted by a device that is the communication partner in FIG. 1, and, alternatively, the device in FIG. 1 may include an input unit, and control signal 100 may be generated based on information input from the input unit.

Figure 2:
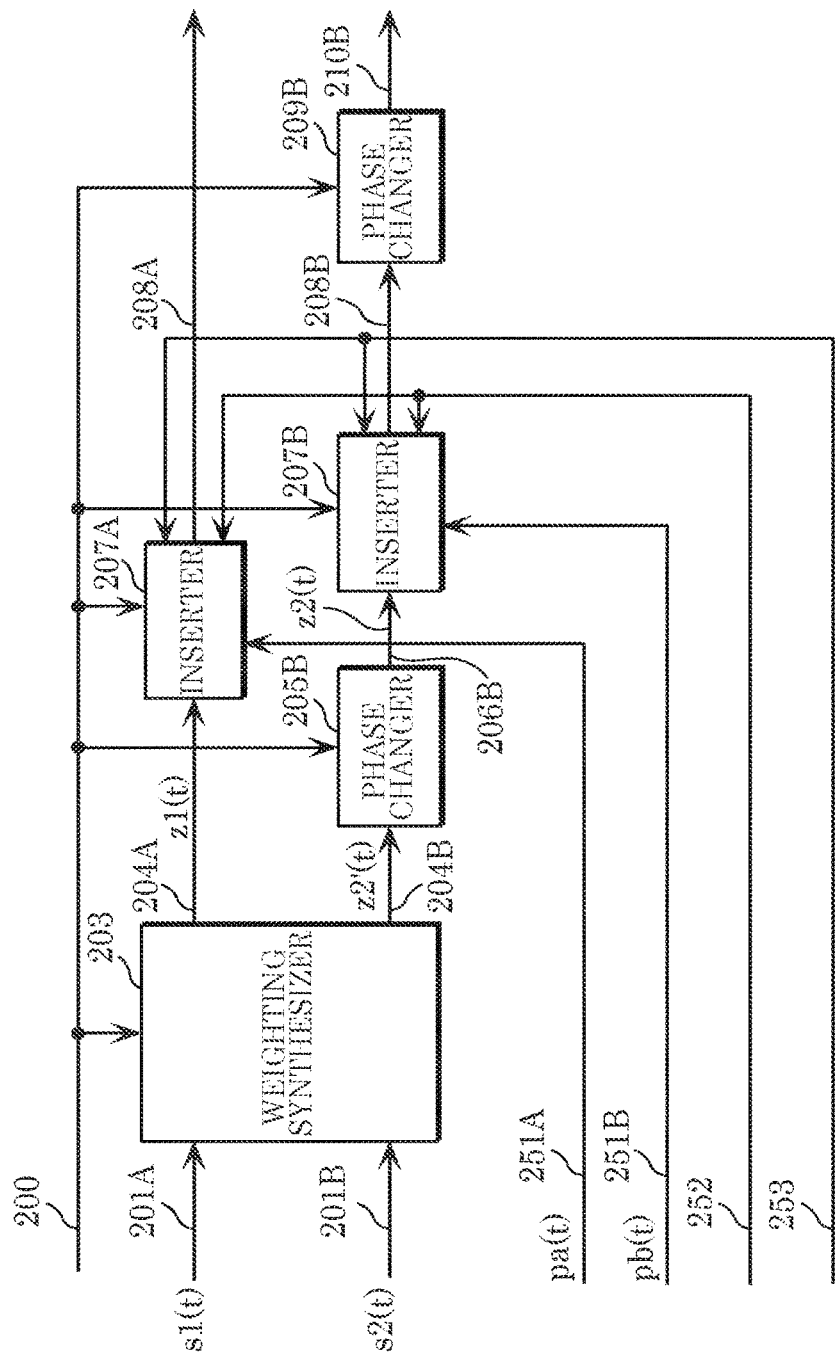
FIG. 2 illustrates one example of a configuration of a signal processor in a transmission device.

FIG. 2 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted synthesized signal 204A and weighted synthesized signal 204B. Here, mapped signal 201A is expressed as s1(t), mapped signal 201B is expressed as s2(t), weighted synthesized signal 204A is expressed as z1(t), and weighted synthesized signal 204B is expressed as z2'(t). Note that one example of t is time (s1(t), s2(t), z1(t), and z2'(t) are defined as complex numbers (accordingly, they may be real numbers)).

Weighting synthesizer (precoder) 203 performs the following calculation.

[MATH. 1]

$$\begin{pmatrix} z1(i) \\ z2'(i) \end{pmatrix} = \begin{pmatrix} a & b \\ c & d \end{pmatrix} \begin{pmatrix} s1(i) \\ s2(i) \end{pmatrix} \quad \text{Equation (1)}$$

In Equation (1), a, b, c, and d can be defined as complex numbers. Accordingly, a, b, c, and d are complex numbers (and may be real numbers). Note that i is a symbol number.

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t), and z2(t) is defined as a complex number (and may be a real number).

Next, specific operations performed by phase changer 205B will be described. In phase changer 205B, for example, a phase change of y(i) is applied to z2'(i). Accordingly, z2(i) can be expressed as z2(i)=y(i)×z2'(i) (i is a symbol number (i is an integer that is greater than or equal to 0)).

For example, the phase change value is set as shown below (N is an integer that is greater than or equal to 2, N is a phase change cycle)(when N is set to an odd number greater than or equal to 3, data reception quality may be improved).

[MATH. 2]

$$y(i) = e^{j\frac{2\pi \times i}{N}} \quad \text{Equation (2)}$$

(j is an imaginary number unit). However, Equation (2) is merely a non-limiting example. Here, phase change value $y(i) = e^{j \times \delta(i)}$.

Here, z1(i) and z2(i) can be expressed with the following equation.

[MATH. 3]

$$\begin{pmatrix} z1(i) \\ z2'(i) \end{pmatrix} = \begin{pmatrix} 1 & 0 \\ 0 & y(i) \end{pmatrix} \begin{pmatrix} a & b \\ c & d \end{pmatrix} \begin{pmatrix} s1(i) \\ s2(i) \end{pmatrix} \quad \text{Equation (3)}$$

$$= \begin{pmatrix} 1 & 0 \\ 0 & e^{j \times \delta(i)} \end{pmatrix} \begin{pmatrix} a & b \\ c & d \end{pmatrix} \begin{pmatrix} s1(i) \\ s2(i) \end{pmatrix}$$

Note that δ(i) is a real number. z1(i) and z2(i) are transmitted from the transmission device at the same time and using the same frequency (same frequency band).

In Equation (3), the phase change value is not limited to the value used in Equation (2); for example, a method in which the phase is changed cyclically or regularly is conceivable.

The matrix (precoding matrix) in Equation (1) and Equation (3) is as follows.

[MATH. 4]

$$\begin{pmatrix} a & b \\ c & d \end{pmatrix} = F \quad \text{Equation (4)}$$

For example, using the following matrix for matrix F is conceivable.

[MATH. 5]

$$F = \begin{pmatrix} \beta \times e^{j0} & \beta \times \alpha \times e^{j0} \\ \beta \times \alpha \times e^{j0} & \beta \times e^{j\pi} \end{pmatrix} \quad \text{Equation (5)}$$

or

[MATH. 6]

$$F = \frac{1}{\sqrt{\alpha^2 + 1}} \begin{pmatrix} e^{j0} & \alpha \times e^{j0} \\ \alpha \times e^{j0} & e^{j\pi} \end{pmatrix} \quad \text{Equation (6)}$$

or

[MATH. 7]

$$F = \begin{pmatrix} \beta \times e^{j0} & \beta \times \alpha \times e^{j\pi} \\ \beta \times \alpha \times e^{j0} & \beta \times e^{j0} \end{pmatrix} \quad \text{Equation (7)}$$

or

[MATH. 8]

$$F = \frac{1}{\sqrt{\alpha^2 + 1}} \begin{pmatrix} e^{j0} & \alpha \times e^{j\pi} \\ \alpha \times e^{j0} & e^{j0} \end{pmatrix} \quad \text{Equation (8)}$$

or

[MATH. 9]

$$F = \begin{pmatrix} \beta \times \alpha \times e^{j0} & \beta \times e^{j\pi} \\ \beta \times e^{j0} & \beta \times \alpha \times e^{j0} \end{pmatrix} \quad \text{Equation (9)}$$

-continued or

[MATH. 10]
$$F = \frac{1}{\sqrt{\alpha^2+1}}\begin{pmatrix} \alpha \times e^{j0} & e^{j\pi} \\ e^{j0} & \alpha \times e^{j0} \end{pmatrix} \quad \text{Equation (10)}$$

or

[MATH. 11]
$$F = \begin{pmatrix} \beta \times \alpha \times e^{j0} & \beta \times e^{j0} \\ \beta \times e^{j0} & \beta \times \alpha \times e^{j\pi} \end{pmatrix} \quad \text{Equation (11)}$$

or

[MATH. 12]
$$F = \frac{1}{\sqrt{\alpha^2+1}}\begin{pmatrix} \alpha \times e^{j0} & e^{j0} \\ e^{j0} & \alpha \times e^{j\pi} \end{pmatrix} \quad \text{Equation (12)}$$

Note that in Equation (5), Equation (6), Equation (7), Equation (8), Equation (9), Equation (10), Equation (11), and Equation (12), $\alpha$ may be a real number and may be an imaginary number, and $\beta$ may be a real number and may be an imaginary number. However, $\alpha$ is not 0 (zero). $\beta$ is also not 0 (zero).

or

[MATH. 13]
$$F = \begin{pmatrix} \beta \times \cos\theta & \beta \times \sin\theta \\ \beta \times \sin\theta & -\beta \times \cos\theta \end{pmatrix} \quad \text{Equation (13)}$$

or

[MATH. 14]
$$F = \begin{pmatrix} \cos\theta & \sin\theta \\ \cos\theta & -\cos\theta \end{pmatrix} \quad \text{Equation (14)}$$

or

[MATH. 15]
$$F = \begin{pmatrix} \beta \times \cos\theta & -\beta \times \sin\theta \\ \beta \times \sin\theta & \beta \times \cos\theta \end{pmatrix} \quad \overline{\text{Equation (15)}}$$

or

[MATH. 16]
$$F = \begin{pmatrix} \cos\theta & -\sin\theta \\ \sin\theta & \cos\theta \end{pmatrix} \quad \overline{\text{Equation (16)}}$$

or

[MATH. 17]
$$F = \begin{pmatrix} \beta \times \sin\theta & -\beta \times \cos\theta \\ \beta \times \cos\theta & \beta \times \sin\theta \end{pmatrix} \quad \overline{\text{Equation (17)}}$$

or

[MATH. 18]
$$F = \begin{pmatrix} \sin\theta & -\cos\theta \\ \cos\theta & \sin\theta \end{pmatrix} \quad \text{Equation (18)}$$

or

[MATH. 19]
$$F = \begin{pmatrix} \beta \times \sin\theta & \beta \times \cos\theta \\ \beta \times \cos\theta & -\beta \times \sin\theta \end{pmatrix} \quad \text{Equation (19)}$$

or

[MATH. 20]
$$F = \begin{pmatrix} \sin\theta & \cos\theta \\ \cos\theta & -\sin\theta \end{pmatrix} \quad \text{Equation (20)}$$

or

[MATH. 21]
$$F(i) = \begin{pmatrix} \beta \times e^{j\theta_{11}(i)} & \beta \times \alpha \times e^{j(\theta_{11}(i)+\lambda)} \\ \beta \times \alpha \times e^{j\theta_{21}(i)} & \beta \times e^{j(\theta_{21}(i)+\lambda+\pi)} \end{pmatrix} \quad \text{Equation (21)}$$

or

[MATH. 22]
$$F(i) = \frac{1}{\sqrt{\alpha^2+1}} = \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix} \quad \text{Equation (22)}$$

or

[MATH. 23]
$$F(i) = \begin{pmatrix} \beta \times \alpha \times e^{j\theta_{21}(i)} & \beta \times e^{j(\theta_{21}(i)+\lambda+\pi)} \\ \beta \times e^{j\theta_{11}(i)} & \beta \times \alpha \times e^{j(\theta_{11}(i)+\lambda)} \end{pmatrix} \quad \text{Equation (23)}$$

or

[MATH. 24]
$$F(i) = \frac{1}{\sqrt{\alpha^2+1}} \begin{pmatrix} \alpha \times e^{j\theta_{21}(i)} & \alpha \times e^{j(\theta_{11}(i)+\lambda+\pi)} \\ e^{j\theta_{11}(i)} & \alpha \times e^{j(\theta_{21}(i)+\lambda)} \end{pmatrix} \quad \text{Equation (24)}$$

or

[MATH. 25]
$$F(i) = \begin{pmatrix} \beta \times e^{j\theta_{11}} & \beta \times \alpha \times e^{j(\theta_{11}+\lambda(i))} \\ \beta \times \alpha \times e^{j\theta_{21}} & \beta \times \alpha \times e^{j(\theta_{21}+\lambda(i)+\pi)} \end{pmatrix} \quad \overline{\text{Equation (25)}}$$

or

[MATH. 26]
$$F(i) = \frac{1}{\sqrt{\alpha^2+1}} = \begin{pmatrix} e^{j\theta_{11}} & \alpha \times e^{j(\theta_{11}\lambda(i))} \\ \alpha \times e^{j\theta_{21}} & e^{j(\theta_{21}+\lambda(i)+\pi)} \end{pmatrix} \quad \text{Equation (26)}$$

or

[MATH. 27]
$$F(i) = \begin{pmatrix} \beta \times \alpha \times e^{j\theta_{21}} & \beta \times e^{j(\theta_{21}+\lambda(i)+\pi)} \\ \beta \times e^{j\theta_{11}} & \beta \times \alpha \times e^{j(\theta_{11}+\lambda(i))} \end{pmatrix} \quad \text{Equation (27)}$$

or

[MATH. 28]
$$F(i) = \frac{1}{\sqrt{\alpha^2+1}} = \begin{pmatrix} \alpha \times e^{j\theta_{21}} & e^{j(\theta_{21}\lambda(i)+\pi)} \\ e^{j\theta_{11}} & \alpha \times e^{j(\theta_{11}+\lambda(i))} \end{pmatrix} \quad \text{Equation (28)}$$

or

[MATH. 29]
$$F = \begin{pmatrix} \beta \times e^{j\theta_{11}} & \beta \times \alpha \times e^{j(\theta_{11}+\lambda)} \\ \beta \times \alpha \times e^{j\theta_{21}} & \beta \times e^{j(\theta_{21}+\lambda+\pi)} \end{pmatrix} \quad \text{Equation (29)}$$

or

[MATH. 30]
$$F = \frac{1}{\sqrt{\alpha^2+1}} = \begin{pmatrix} e^{j\theta_{11}} & \alpha \times e^{j(\theta_{11}+\lambda)} \\ \alpha \times e^{j\theta_{21}} & e^{j(\theta_{21}+\lambda+\pi)} \end{pmatrix} \quad \text{Equation (30)}$$

or

[MATH. 31]

$$F = \begin{pmatrix} \beta \times \alpha \times e^{j\theta_{21}} & \beta \times e^{j(\theta_{21}+\lambda+\pi)} \\ \beta \times e^{j\theta_{11}} & \beta \times \alpha \times e^{j(\theta_{11}+\lambda)} \end{pmatrix} \quad \text{Equation (31)}$$

or

[MATH. 32]

$$F = \frac{1}{\sqrt{\alpha^2+1}} = \begin{pmatrix} \alpha \times e^{j\theta_{21}} & e^{j(\theta_{21}+\lambda+\pi)} \\ e^{j\theta_{21}} & \alpha \times e^{j(\theta_{11}+\lambda)} \end{pmatrix} \quad \text{Equation (32)}$$

However, $\theta_{11}(i)$, $\theta_{21}(i)$, and $\lambda(i)$ are functions (real numbers) of i (symbol number). $\lambda$ is, for example, a fixed value (real number) (however, $\lambda$ need not be a fixed value). $\alpha$ may be a real number, and, alternatively, may be an imaginary number. $\beta$ may be a real number, and, alternatively, may be an imaginary number. However, $\alpha$ is not 0 (zero). $\beta$ is also not 0 (zero). Moreover, $\theta 11$ and $\theta 21$ are real numbers.

Moreover, each exemplary embodiment herein can also be carried out by using a precoding matrix other than these matrices.

or

[MATH. 33]

$$F(i) = \begin{pmatrix} 1 & 0 \\ 0 & 1 \end{pmatrix} \quad \text{Equation (33)}$$

or

[MATH. 34]

$$F(i) = \begin{pmatrix} \beta & 0 \\ 0 & \beta \end{pmatrix} \quad \text{Equation (34)}$$

or

[MATH. 35]

$$F(i) = \begin{pmatrix} 1 & 0 \\ 0 & -1 \end{pmatrix} \quad \text{Equation (35)}$$

or

[MATH. 36]

$$F(i) = \begin{pmatrix} \beta & 0 \\ 0 & -\beta \end{pmatrix} \quad \text{Equation (36)}$$

Note that in Equation (34) and Equation (36), $\beta$ may be a real number and, alternatively, may be an imaginary number. However, $\beta$ is not 0 (zero). When the precoding matrix is expressed as in Equation (33) and Equation (34), weighting synthesizer 203 in FIG. 2 outputs mapped signal 201A as weighting synthesized signal 204A and mapped signal 201B as weighting synthesized signal 204B without performing signal processing on mapped signals 201A, 201B. Stated differently, weighting synthesizer 203 may be omitted. Alternately, when weighting synthesizer 203 is provided, control for whether to perform weighting synthesis or not may be determined according to control signal 200.

Inserter 207A receives inputs of weighting synthesized signal 204A, pilot symbol signal (pa(t))(t is time)(251A), preamble signal 252, control information symbol signal 253, and control signal 200, and based on information on the frame configuration included in control signal 200, outputs baseband signal 208A based on the frame configuration.

Similarly, inserter 207B receives inputs of phase-changed signal 206B, pilot symbol signal (pb(t))(251B), preamble signal 252, control information symbol signal 253, and control signal 200, and based on information on the frame configuration included in control signal 200, outputs baseband signal 208B based on the frame configuration.

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as x'(i). Then, phase-changed signal 210B (x(i)) can be expressed as x(i)= ej×ε(i)×x'(i) (j is an imaginary number unit).

Note that the operation performed by phase changer 209B may be CDD (cyclic delay diversity) or CSD (cycle shift diversity) disclosed in NPTL 2 and 3. One characteristic of phase changer 209B is that it applies a phase change to a symbol present along the frequency axis (i.e., applies a phase change to, for example, a data symbol, a pilot symbol, and/or a control information symbol).

In FIG. 2, phase changer 209B is included in the configuration, but phase changer 209B may be omitted from the configuration. In such cases, baseband signals 208A, 208B are the output in FIG. 2 (phase changer 209B need not operate).

Figure 3:
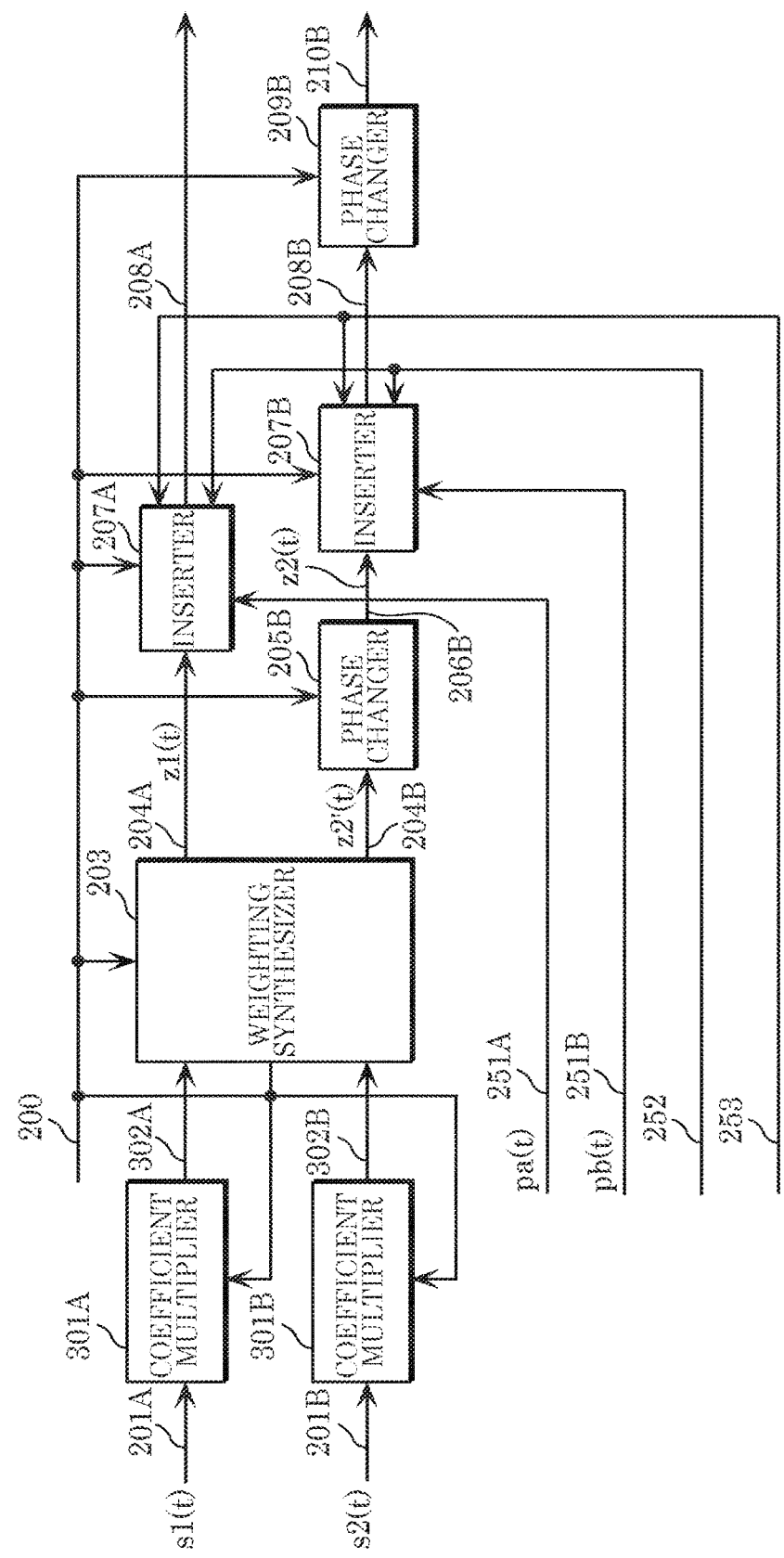
FIG. 3 illustrates one example of a configuration of a signal processor in a transmission device.

FIG. 3 illustrates an example of a configuration of signal processor 106 illustrated in FIG. 1 that differs from the configuration illustrated in FIG. 2. In FIG. 3, components that operate the same as in FIG. 2 share like reference marks. Note that duplicate description of components that perform the same operations as in FIG. 2 will be omitted.

Coefficient multiplier 301A receives inputs of mapped signal 201A (s1(i)) and control signal 200, and based on control signal 200, multiplies mapped signal 201A (s1(i)) by a coefficient, and outputs coefficient multiplied signal 302A. Note that when the coefficient is expressed as u, coefficient multiplied signal 302A is expressed as u×s1(i) (u may be a real number and, alternatively, may be a complex number). However, when u=1, coefficient multiplier 301A outputs mapped signal 201A (s1(i)) as coefficient multiplied signal 302A without multiplying mapped signal 201A (s1(i)) by the coefficient.

Similarly, coefficient multiplier 301B receives inputs of mapped signal 201B (s2(i)) and control signal 200, and based on control signal 200, multiplies mapped signal 201B (s2(i)) by a coefficient, and outputs coefficient multiplied signal 302B. Note that when the coefficient is expressed as v, coefficient multiplied signal 302B is expressed as v×s2(i) (v may be a real number and, alternatively, may be a complex number). However, when v=1, coefficient multiplier 301B outputs mapped signal 201B (s2(i)) as coefficient multiplied signal 302B without multiplying mapped signal 201B (s2(i)) by the coefficient.

Accordingly, weighting synthesized signal 204A (z1(i)) and phase-changed signal 206B (z2(i)) can be expressed with the following equation.

[MATH. 37]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} a & b \\ c & d \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} a & b \\ c & d \end{pmatrix} \begin{pmatrix} u & 0 \\ 0 & v \end{pmatrix} \begin{pmatrix} s1(i) \\ s2(i) \end{pmatrix}$$

Equation (37)

Note that the example of the (precoding) matrix F is as previously described (for example, see Equation (5) through Equation (36)), and the example of phase change value y(i) is as indicated in Equation (2), but the (precoding) matrix F and phase change value y(i) are not limited to these examples.

Next, "the (precoding) matrix F and phase change value y(i) when the modulation scheme for mapped signal 201A (s1(i)) is QPSK (quadrature phase shift keying) and the modulation scheme used for mapped signal 201B (s2(i)) is 16QAM (QAM: quadrature amplitude modulation)" used in the description of the present invention will be described.

Note that here, the average (transmission) power of mapped signal 201A and the average (transmission) power of mapped signal 201B are the same.

In such cases, by obtaining weighting synthesized signal 204A (z1(i)) and phase-changed signal 206B (z2(i)) as illustrated in Equation (38) through Equation (45), in the reception device that receives the modulated signal transmitted by the transmission device illustrated in FIG. 1, an advantageous effect that data reception quality is improved can be achieved.

[MATH. 38]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \beta \times \cos\theta & -\beta \times \sin\theta \\ \beta \times \sin\theta & \beta \times \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \beta \times \cos\frac{\pi}{4} & -\beta \times \sin\frac{\pi}{4} \\ \beta \times \sin\frac{\pi}{4} & \beta \times \cos\frac{\pi}{4} \end{pmatrix}$$
$$\begin{pmatrix} \sqrt{\frac{2}{3}} & 0 \\ 0 & \sqrt{\frac{4}{3}} \end{pmatrix} \begin{pmatrix} s1(i) \\ s2(i) \end{pmatrix}$$

Equation (38)

[MATH. 39]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \beta \times \cos\theta & -\beta \times \sin\theta \\ \beta \times \sin\theta & \beta \times \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \beta \times \cos\frac{\pi}{4} & -\beta \times \sin\frac{\pi}{4} \\ \beta \times \sin\frac{\pi}{4} & \beta \times \cos\frac{\pi}{4} \end{pmatrix}$$
$$\begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Equation (39)

[MATH. 40]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

Equation (40)

$$= \begin{pmatrix} 1 & 0 \\ 0 & y(i) \end{pmatrix} \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \cos\frac{\pi}{4} & -\sin\frac{\pi}{4} \\ \sin\frac{\pi}{4} & \cos\frac{\pi}{4} \end{pmatrix} \begin{pmatrix} \sqrt{\frac{2}{3}} & 0 \\ 0 & \sqrt{\frac{4}{3}} \end{pmatrix} \begin{pmatrix} s1(i) \\ s2(i) \end{pmatrix}$$

[MATH. 41]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \cos\frac{\pi}{4} & -\sin\frac{\pi}{4} \\ \sin\frac{\pi}{4} & \cos\frac{\pi}{4} \end{pmatrix}$$
$$\begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Equation (41)

[MATH. 42]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \beta \times \cos\theta & \beta \times \sin\theta \\ \beta \times \sin\theta & -\beta \times \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \beta \times \cos\frac{\pi}{4} & -\beta \times \sin\frac{\pi}{4} \\ \beta \times \sin\frac{\pi}{4} & \beta \times \cos\frac{\pi}{4} \end{pmatrix}$$
$$\begin{pmatrix} \sqrt{\frac{2}{3}} & 0 \\ 0 & \sqrt{\frac{4}{3}} \end{pmatrix} \begin{pmatrix} s1(i) \\ s2(i) \end{pmatrix}$$

Equation (42)

[MATH. 43]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \beta \times \cos\theta & \beta \times \sin\theta \\ \beta \times \sin\theta & -\beta \times \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \beta \times \cos\frac{\pi}{4} & \beta \times \sin\frac{\pi}{4} \\ \beta \times \sin\frac{\pi}{4} & -\beta \times \cos\frac{\pi}{4} \end{pmatrix}$$
$$\begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Equation (43)

[MATH. 44]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \cos\theta & \sin\theta \\ \sin\theta & -\cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \cos\frac{\pi}{4} & \sin\frac{\pi}{4} \\ \sin\frac{\pi}{4} & -\cos\frac{\pi}{4} \end{pmatrix} \begin{pmatrix} \sqrt{\frac{2}{3}} & 0 \\ 0 & \sqrt{\frac{4}{3}} \end{pmatrix} \begin{pmatrix} s1(i) \\ s2(i) \end{pmatrix}$$

Equation (44)

[MATH. 45]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

Equation (45)

-continued $$=\begin{pmatrix} 1 & 0 \\ 0 & y(i) \end{pmatrix}\begin{pmatrix} \cos\theta & \sin\theta \\ \sin\theta & -\cos\theta \end{pmatrix}\begin{pmatrix} u & 0 \\ 0 & v \end{pmatrix}\begin{pmatrix} s1(i) \\ s2(i) \end{pmatrix}$$

$$=\begin{pmatrix} 1 & 0 \\ 0 & e^{j\times\delta(i)} \end{pmatrix}\begin{pmatrix} \cos\frac{\pi}{4} & \sin\frac{\pi}{4} \\ \sin\frac{\pi}{4} & -\cos\frac{\pi}{4} \end{pmatrix}$$

$$\begin{pmatrix} \alpha\times\sqrt{\frac{2}{3}} & 0 \\ 0 & \alpha\sqrt{\frac{4}{3}} \end{pmatrix}\begin{pmatrix} s1(i) \\ s2(i) \end{pmatrix}$$

Note that in Equation (38) through Equation (45), α and β may be real numbers and, alternatively, may be imaginary numbers.

Next, the characteristic points of Equation (38) through Equation (45) will be described.

In Equation (38) through Equation (45), 0 is set to π/4 radians (45 degrees). The average (transmission) power of coefficient multiplied signal 302A and the average (transmission) power of coefficient multiplied signal 302B are different, but by setting θ to π/4 radians (45 degrees), the average (transmission) power of weighting synthesized signal 204A(z1(i)) and the average (transmission) power of phase-changed signal 206B (z2(i)) can be made to be the same, so when the transmission rules stipulate a condition that the average transmission power of each modulated signal transmitted from the antennas be the same, it is necessary to set θ to π/4 radians (45 degrees). Note that, here, θ is set to π/4 radians (45 degrees), but θ may be set to any one of: π/4 radians (45 degrees); (3×π)/4 radians (135 degrees); (5×π)/4 radians (225 degrees); and (7×π)/4 radians (315 degrees).

Moreover, the coefficients u, v are set as illustrated in Equation (38) through Equation (45).

Note that symbols (for example, z1(i), z2(i)) are described as being generated using the methods exemplified in FIG. 1, FIG. 2, FIG. 3, and Equation (1) through Equation (45). In such cases, the generated symbols may be arranged along the time axis. When a multi-carrier scheme such as OFDM (orthogonal frequency division multiplexing) is used, the generated symbols may be arranged along the frequency axis and may be arranged along the time and frequency axes. Moreover, the generated symbols may be interleaved (i.e., rearranged) and arranged along the time axis, along the frequency axis, and along the time and frequency axes. However, z1(i) and z2(i), which are both symbol number i, are transmitted from the transmission device at the same time and using the same frequency (same frequency band).

Figure 4:
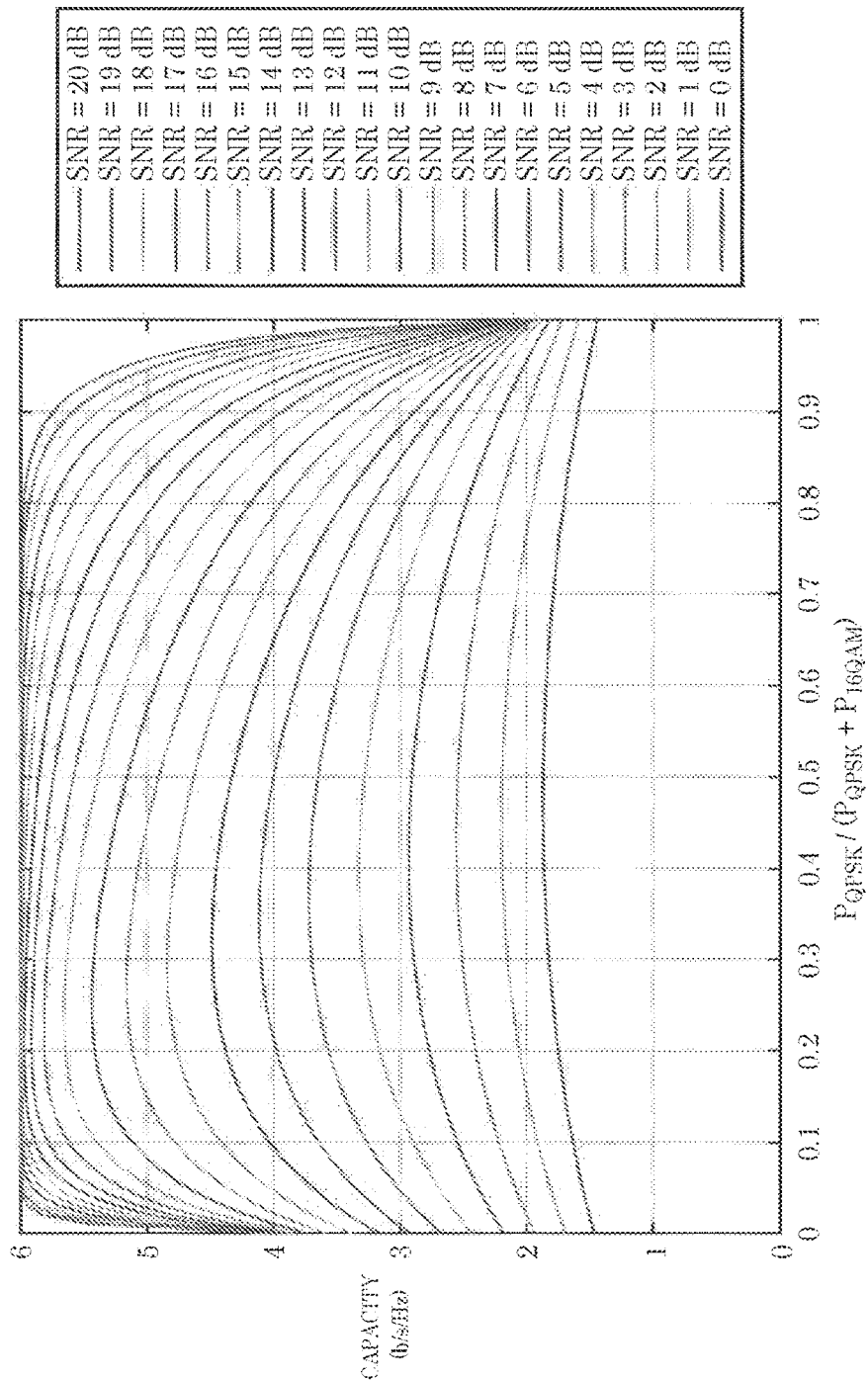
FIG. 4 illustrates the capacity for each SNR in an AWGN environment.

FIG. 4 shows the capacity for each SNR (signal-to-noise power ratio). In FIG. 4, PQPSK/(PQPSK+P16QAM) is represented on the horizontal axis, and capacity is represented on the vertical axis. PQPSK is the average (transmission) power of QPSK, and P16QAM is the average (transmission) power of 16QAM (note that the channel model in the graph is an AWGN (additive white Gaussian noise) environment). As can be seen from the results, by using the settings illustrated in Equation (38) through Equation (45), the reception device can achieve an advantageous effect of good data reception quality.

The transmission device illustrated in FIG. 1 switches the transmission method of the modulated signal based on information on the transmission method included in control signal 100. The transmission device illustrated in FIG. 1 can select the following transmission methods.

Transmission Method #1:
A single stream is transmitted (s1(i) is transmitted). The modulation scheme (of s1(i)) is BPSK (binary phase shift keying) (or π/2 shift BPSK) (however, the single stream modulated signal may be transmitted using a single antenna and, alternatively, transmitted using a plurality of antennas).

Transmission Method #2:
A single stream is transmitted (s1(i) is transmitted). The modulation scheme (of s1(i)) is QPSK (quadrature phase shift keying) (or π/2 shift QPSK) (however, the single stream modulated signal may be transmitted using a single antenna and, alternatively, transmitted using a plurality of antennas).

Transmission Method #3:
A single stream is transmitted (s1(i) is transmitted). The modulation scheme (of s1(i)) is 16QAM (or π/2 shift 16QAM) (or a modulation scheme in which 16 signal points are in the in-phase I-quadrature Q plane, such as 16APSK (APSK: amplitude phase shift keying) (a shift may be performed)) (however, the single stream modulated signal may be transmitted using a single antenna and, alternatively, transmitted using a plurality of antennas).

Transmission Method #4:
A single stream is transmitted (s1(i) is transmitted). The modulation scheme (of s1(i)) is 64QAM (or π/2 shift 64QAM) (or a modulation scheme in which 64 signal points are in the in-phase I-quadrature Q plane, such as 64APSK (APSK: amplitude phase shift keying) (a shift may be performed)) (however, the single stream modulated signal may be transmitted using a single antenna and, alternatively, transmitted using a plurality of antennas).

Two streams are transmitted (s1(i) and s2(i) are transmitted). The modulation scheme of s1(i) is BPSK (or π/2 shift BPSK), and the modulation scheme of s2(i) is BPSK (or π/2 shift BPSK). Here, two modulated signals are transmitted. The first modulated signal is transmitted using one or more antennas, and the second modulated signal is transmitted using one or more antennas.

Transmission Method #6:
Two streams are transmitted (s1(i) and s2(i) are transmitted). The modulation scheme of s1(i) is QPSK (or π/2 shift QPSK), and the modulation scheme of s2(i) is QPSK (or π/2 shift QPSK). Here, two modulated signals are transmitted. The first modulated signal is transmitted using one or more antennas, and the second modulated signal is transmitted using one or more antennas.

Transmission Method #7:
Two streams are transmitted (s1(i) and s2(i) are transmitted). The modulation scheme of s1(i) is QPSK (or π/2 shift QPSK), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas.

Transmission Method #8:
Two streams are transmitted (s1(i) and s2(i) are transmitted). The modulation scheme of s1(i) is 16QAM (or π/2 shift 16QAM) (or a modulation scheme in which 16 signal points are in the in-phase I-quadrature Q plane, such as 16APSK (a shift may be performed)), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted.

The first modulated signal is transmitted using one or more antennas, and the second modulated signal is transmitted using one or more antennas.

Transmission Method #9:

Two streams are transmitted (s1(i) and s2(i) are transmitted). The modulation scheme of s1(i) is 64QAM (or π/2 shift 64QAM) (or a modulation scheme in which 64 signal points are in the in-phase I-quadrature Q plane, such as 16APSK (a shift may be performed)), and the modulation scheme of s2(i) is 64QAM (or π/2 shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas.

Here, based on FIG. 2 and FIG. 3, precoding (weighted synthesis) and a phase change are performed (phase changer 205B need not perform a phase change), and any one of the (precoding) matrices in Equation (13) through Equation (20) is used as the precoding matrix. However, θ in Equation (13) through Equation (20) is greater than or equal to 0 radians and less than 2π radians (0 radians≤θ<2π radians).

With this, the following is satisfied.

Transmission Method #1:

The number of signal points in the in-phase I-quadrature Q plane of the transmission signal is 2.

Transmission Method #2:

The number of signal points in the in-phase I-quadrature Q plane of the transmission signal is 4.

Transmission Method #3:

The number of signal points in the in-phase I-quadrature Q plane of the transmission signal is 16.

Transmission Method #4:

The number of signal points in the in-phase I-quadrature Q plane of the transmission signal is 64.

The number of signal points in the in-phase I-quadrature Q plane of the transmission signal is greater than or equal to 2 and less than or equal to 4. However, when θ=0 radians in Equation (13) through Equation (20), the number of signal points in the in-phase I-quadrature Q plane of the transmission signal is 2.

Transmission Method #6:

The number of signal points in the in-phase I-quadrature Q plane of the transmission signal is greater than or equal to 4 and less than or equal to 16. However, when θ=0 radians in Equation (13) through Equation (20), the number of signal points in the in-phase I-quadrature Q plane of the transmission signal is 4.

Transmission Method #7:

The number of signal points in the in-phase I-quadrature Q plane of the transmission signal is greater than or equal to 4 and less than or equal to 64. However, when θ=0 radians in Equation (13) through Equation (20), the number of signal points in the in-phase I-quadrature Q plane of the first transmission signal is 4, and the number of signal points in the in-phase I-quadrature Q plane of the second transmission signal is 16.

Transmission Method #8:

The number of signal points in the in-phase I-quadrature Q plane of the transmission signal is greater than or equal to 16 and less than or equal to 256. However, when θ=0 radians in Equation (13) through Equation (20), the number of signal points in the in-phase I-quadrature Q plane of the transmission signal is 16.

Transmission Method #9:

The number of signal points in the in-phase I-quadrature Q plane of the transmission signal is greater than or equal to 64 and less than or equal to 4096. However, when θ=0 radians in Equation (13) through Equation (20), the number of signal points in the in-phase I-quadrature Q plane of the transmission signal is 64.

As described above, the maximum number of signal points when the transmission device illustrated in FIG. 1 transmits the single stream modulated signal is 64.

When the influence of phase noise in RF (radio frequency) unit included in radio units 107_A, 107_B in the transmission device illustrated in FIG. 1 and the influence of non-linear distortion in the transmission power amplifier included in radio units 107_A, 107_B are taken into consideration, a modulation scheme in which the PAPR (peak-to-average power ratio) is low and a modulation scheme having a signal point arrangement that yields little phase noise influence are preferably used. Taking these into consideration, it is preferable that the number of signal points in the in-phase I-quadrature Q plane of the transmission signal (modulated signal) be reduced. As described above, when the transmission device can select from a plurality of transmission methods, since, by minimizing the number of signal points in the in-phase I-quadrature Q plane in the transmission method having the largest number of signal points in the in-phase I-quadrature Q plane, influence of phase noise in the RF unit can be inhibited and influence of non-linear distortion in the transmission power amplifier can be inhibited in the transmission device, in the reception device that receives the modulated signal transmitted by the transmission device illustrated in FIG. 1, it is possible to achieve an advantageous effect that the data reception quality is improved. Moreover, when the transmission device illustrated in FIG. 1 transmits a modulated signal characterized by low phase noise influence in the RF unit and low non-linear distortion in the transmission power amplifier, an advantageous effect that the scale of the circuits for the RF unit and transmission power amplifier in the transmission device can be reduced can be achieved (when the PAPR greatly varies from modulation scheme to modulation scheme, for example, an RF unit and transmission power amplification unit need to be provided for each modulation scheme, thereby increasing the scale of circuitry).

As described above, the maximum number of signal points when the transmission device illustrated in FIG. 1 transmits the single stream modulated signal is 64. Accordingly, if the maximum number of signal points when the transmission device illustrated in FIG. 1 transmits two streams of modulated signals can be kept to 64, the above-described advantageous effects can be achieved.

On the other hand, when the transmission device illustrated in FIG. 1 transmits two streams of modulated signals, and the s1(i) signal is transmitted from a plurality of antennas and the s2(i) signal is transmitted from a plurality of antennas, the advantageous effects of transmit diversity are achieved, so the reception device that receives the modulated signal transmitted by the transmission device illustrated in FIG. 1 can achieve the advantageous effect that data reception quality is improved. However, in order to achieve this advantageous effect, it is important that the modulated signal transmitted by the transmission device illustrated in FIG. 1 exhibit a small phase noise influence in the RF unit and a small non-linear distortion influence in the transmission power amplifier.

In view of this, consider a first or second selection method.

First Selection Method:

The transmission device illustrated in FIG. 1 switches the transmission method of the modulated signal based on information on the transmission method included in control signal 100. Here, the transmission device illustrated in FIG. 1 can select the following transmission methods.

Transmission Method #1-1:

A single stream is transmitted (s1(i) is transmitted). The modulation scheme (of s1(i)) is BPSK (or $\pi/2$ shift BPSK) (however, the single stream modulated signal may be transmitted using a single antenna and, alternatively, transmitted using a plurality of antennas).

Transmission Method #1-2:

A single stream is transmitted (s1(i) is transmitted). The modulation scheme (of s1(i)) is QPSK (or $\pi/2$ shift QPSK) (however, the single stream modulated signal may be transmitted using a single antenna and, alternatively, transmitted using a plurality of antennas).

Transmission Method #1-3:

A single stream is transmitted (s1(i) is transmitted). The modulation scheme of s1(i) is 16QAM (or $\pi/2$ shift 16QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #1-4:

A single stream is transmitted (s1(i) is transmitted). The modulation scheme of s1(i) is 64QAM (or $\pi/2$ shift 64QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #1-5:

Two streams are transmitted (s1(i) and s2(i) are transmitted). The modulation scheme of s1(i) is BPSK (or $\pi/2$ shift BPSK), and the modulation scheme of s2(i) is BPSK (or $\pi/2$ shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians $\leq \theta < 2\pi$ radians)).

Transmission Method #1-6:

Two streams are transmitted (s1(i) and s2(i) are transmitted). The modulation scheme of s1(i) is QPSK (or $\pi/2$ shift QPSK), and the modulation scheme of s2(i) is QPSK (or $\pi/2$ shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians $\leq \theta < 2\pi$ radians)).

Transmission Method #1-7:

Two streams are transmitted (s1(i) and s2(i) are transmitted). The modulation scheme of s1(i) is QPSK (or $\pi/2$ shift QPSK), and the modulation scheme of s2(i) is 16QAM (or $\pi/2$ shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians $\leq \theta < 2\pi$ a radians)) (when $\theta = \pi/4$ radians (45 degrees), the average transmission power of the modulated signals transmitted from the antennas is equal).

Transmission Method #1-8:

Two streams are transmitted (s1(i) and s2(i) are transmitted). The modulation scheme of s1(i) is 16QAM (or $\pi/2$ shift 16QAM) (or a modulation scheme in which 16 signal points are in the in-phase I-quadrature Q plane, such as 16APSK (a shift may be performed)), and the modulation scheme of s2(i) is 16QAM (or $\pi/2$ shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta = 0$ radians in Equation (13) through Equation (20) (note that $\theta$ is greater than or equal to 0 radians and less than $2\pi$ radians (0 radians $\leq \theta < 2\pi$ radians)).

Transmission Method #1-9:

Two streams are transmitted (s1(i) and s2(i) are transmitted). The modulation scheme of s1(i) is 64QAM (or $\pi/2$ shift 64QAM) (or a modulation scheme in which 64 signal points are in the in-phase I-quadrature Q plane, such as 16APSK (a shift may be performed)), and the modulation scheme of s2(i) is 64QAM (or $\pi/2$ shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<2π radians)).

Note that in the first selection method, the transmission method need not correspond to all transmission methods from transmission method #1-1 to transmission method #1-9. For example, in the first selection method, the transmission method may correspond to one or more transmission method from among the following three transmission methods: transmission method #1-5, transmission method #1-6, and transmission method #1-7. In the first transmission method, the transmission method may correspond to one or more transmission method from among the following two transmission methods: transmission method #1-8 and transmission method #1-9.

In the first selection method, the transmission method need not correspond to transmission method #1-1 (in the first selection method, the transmission method need not include transmission method #1-1 in the transmission method selection candidates in the transmission device illustrated in FIG. 1).

The first selection method may include a transmission method other than those from transmission method #1-1 to transmission method #1-9.

Here, the following is satisfied.

Transmission Method #1-1:
The number of signal points in the in-phase I-quadrature Q plane of the transmission signal is 2.

Transmission Method #1-2:
The number of signal points in the in-phase I-quadrature Q plane of the transmission signal is 4.

Transmission Method #1-3:
The number of signal points in the in-phase I-quadrature Q plane of the transmission signal is 16.

Transmission Method #1-4:
The number of signal points in the in-phase I-quadrature Q plane of the transmission signal is 64.

Transmission Method #1-5:
The number of signal points in the in-phase I-quadrature Q plane of the transmission signal is greater than 2 and less than or equal to 4. The advantageous effect of transmit diversity is achievable.

Transmission Method #1-6:
The number of signal points in the in-phase I-quadrature Q plane of the transmission signal is greater than 4 and less than or equal to 16. The advantageous effect of transmit diversity is achievable.

Transmission Method #1-7:
The number of signal points in the in-phase I-quadrature Q plane of the transmission signal is greater than 4 and less than or equal to 64. The advantageous effect of transmit diversity is achievable.

Transmission Method #1-8:
The number of signal points in the in-phase I-quadrature Q plane of the transmission signal is 16.

Transmission Method #1-9:
The number of signal points in the in-phase I-quadrature Q plane of the transmission signal is 64.

Since the above-described characteristics are achieved, by using the first selection method, in the transmission device illustrated in FIG. 1, influence of phase noise in RF unit and influence of non-linear distortion in transmission power amplifier can be reduced, and advantageous effect of transmit diversity is achievable in transmission method #1-5 through transmission method #1-7. Accordingly, in the reception device that receives the modulated signal transmitted by the transmission device illustrated in FIG. 1, it is possible to achieve an advantageous effect of improvement in data reception quality.

Second Selection Method:

Transmission Method #2-1:
A single stream is transmitted (s1(i) is transmitted). The modulation scheme (of s1(i)) is BPSK (or π/2 shift BPSK) (however, the single stream modulated signal may be transmitted using a single antenna and, alternatively, transmitted using a plurality of antennas).

Transmission Method #2-2:
A single stream is transmitted (s1(i) is transmitted). The modulation scheme (of s1(i)) is QPSK (or π/2 shift QPSK) (however, the single stream modulated signal may be transmitted using a single antenna and, alternatively, transmitted using a plurality of antennas).

Transmission Method #2-3:
A single stream is transmitted (s1(i) is transmitted). The modulation scheme of s1(i) is 16QAM (or π/2 shift 16QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #2-4:
A single stream is transmitted (s1(i) is transmitted). The modulation scheme of s1(i) is 64QAM (or π/2 shift 64QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #2-5:
Two streams are transmitted (s1(i) and s2(i) are transmitted). The modulation scheme of s1(i) is BPSK (or π/2 shift BPSK), and the modulation scheme of s2(i) is BPSK (or π/2 shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Transmission Method #2-6:

Two streams are transmitted (s1(i) and s2(i) are transmitted). The modulation scheme of s1(i) is QPSK (or π/2 shift QPSK), and the modulation scheme of s2(i) is QPSK (or π/2 shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Transmission Method #2-7:

Two streams are transmitted (s1(i) and s2(i) are transmitted). The modulation scheme of s1(i) is QPSK (or π/2 shift QPSK), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that θ is greater than or equal to 0 radians and less than 2π radians (0 radians≤θ<2π a radians)) (when θ=π/4 radians (45 degrees), the average transmission power of the modulated signals transmitted from the antennas is equal).

Transmission Method #2-8:

Two streams are transmitted (s1(i) and s2(i) are transmitted). The modulation scheme of s1(i) is 16QAM (or π/2 shift 16QAM) (or a modulation scheme in which 16 signal points are in the in-phase I-quadrature Q plane, such as 16APSK (a shift may be performed)), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta=0$ radians in Equation (13) through Equation (20) (note that θ is greater than or equal to 0 radians and less than 2π radians (0 radians≤θ<2π radians)).

Transmission Method #2-9:

Two streams are transmitted (s1(i) and s2(i) are transmitted). The modulation scheme of s1(i) is 64QAM (or π/2 shift 64QAM) (or a modulation scheme in which 64 signal points are in the in-phase I-quadrature Q plane, such as 16APSK (a shift may be performed)), and the modulation scheme of s2(i) is 64QAM (or π/2 shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta=0$ radians in Equation (13) through Equation (20) (note that θ is greater than or equal to 0 radians and less than 2π radians (0 radians≤θ<2π radians)).

Note that in the second selection method, the transmission method need not correspond to all transmission methods from transmission method #2-1 to transmission method #2-9. For example, in the second selection method, the transmission method may correspond to one or more transmission method from among the following three transmission methods: transmission method #2-5, transmission method #2-6, and transmission method #2-7. In the second transmission method, the transmission method may correspond to one or more transmission method from among the following two transmission methods: transmission method #2-8 and transmission method #2-9.

In the second selection method, the transmission method need not correspond to transmission method #2-1 (in the second selection method, the transmission method need not include transmission method #2-1 in the transmission method selection candidates in the transmission device illustrated in FIG. 1).

The second selection method may include a transmission method other than those from transmission method #2-1 to transmission method #2-9.

Here, the following is satisfied.

Transmission Method #2-1:

The number of signal points in the in-phase I-quadrature Q plane of the transmission signal is 2.

Transmission Method #2-2:

The number of signal points in the in-phase I-quadrature Q plane of the transmission signal is 4.

Transmission Method #2-3:

The number of signal points in the in-phase I-quadrature Q plane of the transmission signal is 16.

Transmission Method #2-4:
   The number of signal points in the in-phase I-quadrature Q plane of the transmission signal is 64.
Transmission Method #2-5:
   The number of signal points in the in-phase I-quadrature Q plane of the transmission signal is greater than or equal to 2 and less than or equal to 4. There are cases in which the advantageous effect of transmit diversity is achievable.
Transmission Method #2-6:
   The number of signal points in the in-phase I-quadrature Q plane of the transmission signal is greater than or equal to 4 and less than or equal to 16. There are cases in which the advantageous effect of transmit diversity is achievable.
Transmission Method #2-7:
   The number of signal points in the in-phase I-quadrature Q plane of the transmission signal is greater than 4 and less than or equal to 64. The advantageous effect of transmit diversity is achievable.
Transmission Method #2-8:
   The number of signal points in the in-phase I-quadrature Q plane of the transmission signal is 16.
Transmission Method #2-9:
   The number of signal points in the in-phase I-quadrature Q plane of the transmission signal is 64.
   Since the above-described characteristics are achieved, by using the second selection method, in the transmission device illustrated in FIG. 1, influence of phase noise in RF unit and influence of non-linear distortion in transmission power amplifier can be reduced, and there are cases in which the advantageous effect of transmit diversity is achievable in transmission method #2-5 through transmission method #2-7. Accordingly, in the reception device that receives the modulated signal transmitted by the transmission device illustrated in FIG. 1, it is possible to achieve an advantageous effect of improvement in data reception quality.
   Moreover, a third selection method, which is a combination of the first selection method and the second selection method, may be used.
Third Selection Method:
   The transmission device illustrated in FIG. 1 switches the transmission method of the modulated signal based on information on the transmission method included in control signal 100. Here, the transmission method illustrated in FIG. 1 can select the following transmission methods.
Transmission Method #3-1:
   A single stream is transmitted (s1(i) is transmitted). The modulation scheme (of s1(i)) is BPSK (or π/2 shift BPSK) (however, the single stream modulated signal may be transmitted using a single antenna and, alternatively, transmitted using a plurality of antennas).
Transmission Method #3-2:
   A single stream is transmitted (s1(i) is transmitted). The modulation scheme (of s1(i)) is QPSK (or π/2 shift QPSK) (however, the single stream modulated signal may be transmitted using a single antenna and, alternatively, transmitted using a plurality of antennas).
Transmission Method #3-3:
   A single stream is transmitted (s1(i) is transmitted). The modulation scheme of s1(i) is 16QAM (or π/2 shift 16QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).
Transmission Method #3-4:
   A single stream is transmitted (s1(i) is transmitted). The modulation scheme of s1(i) is 64QAM (or π/2 shift 64QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).
Transmission Method #3-5:
   Either one of transmission method #1-5 or transmission method #2-5.
Transmission Method #3-6:
   Either one of transmission method #1-6 or transmission method #2-6.
Transmission Method #3-7:
   Two streams are transmitted (s1(i) and s2(i) are transmitted). The modulation scheme of s1(i) is QPSK (or π/2 shift QPSK), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π a radians)).
Transmission Method #3-8:
   Two streams are transmitted (s1(i) and s2(i) are transmitted). The modulation scheme of s1(i) is 16QAM (or π/2 shift 16QAM) (or a modulation scheme in which 16 signal points are in the in-phase I-quadrature Q plane, such as 16APSK (a shift may be performed)), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<2π radians)).
Transmission Method #3-9:
   Two streams are transmitted (s1(i) and s2(i) are transmitted). The modulation scheme of s1(i) is 64QAM (or π/2 shift 64QAM) (or a modulation scheme in which 64 signal points are in the in-phase I-quadrature Q plane, such as 16APSK (a shift may be performed)), and the modulation scheme of s2(i) is 64QAM (or π/2 shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG.

3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<2π radians)).

Note that in the third selection method, the transmission method need not correspond to all transmission methods from transmission method #3-1 to transmission method #3-9. For example, in the third selection method, the transmission method may correspond to one or more transmission method from among the following three transmission methods: transmission method #3-5, transmission method #3-6, and transmission method #3-7. In the third transmission method, the transmission method may correspond to one or more transmission method from among the following two transmission methods: transmission method #3-8 and transmission method #3-9.

In the third selection method, the transmission method need not correspond to transmission method #3-1 (in the third selection method, the transmission method need not include transmission method #3-1 in the transmission method selection candidates in the transmission device illustrated in FIG. 1).

The third selection method may include a transmission method other than those from transmission method #3-1 to transmission method #3-9.

Since the above-described characteristics are achieved, by using the third selection method, in the transmission device illustrated in FIG. 1, influence of phase noise in RF unit and influence of non-linear distortion in transmission power amplifier can be reduced, and there are cases in which the advantageous effect of transmit diversity is achievable in transmission method #3-5 through transmission method #3-7. Accordingly, in the reception device that receives the modulated signal transmitted by the transmission device illustrated in FIG. 1, it is possible to achieve an advantageous effect of improvement in data reception quality.

Figure 5:
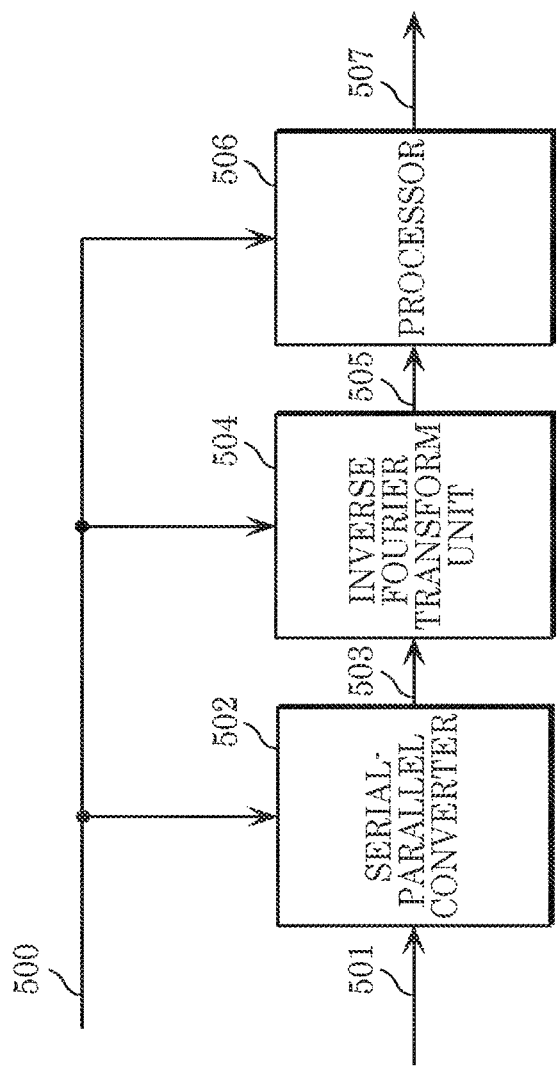
FIG. 5 illustrates one example of a configuration of a radio unit in a transmission device.

FIG. 5 illustrates one example of a configuration of radio units 107_A and 107_B illustrated in FIG. 1 when the transmission device illustrated in FIG. 1 has an OFDM (orthogonal frequency division multiplexing) configuration. Serial-parallel converter 502 receives inputs of signal 501 and control signal 500 (control signal 100 in FIG. 1), applies a serial-parallel conversion based on control signal 500, and outputs serial-parallel converted signal 503.

Inverse Fourier transform unit 504 receives inputs of serial-parallel converted signal 503 and control signal 500, and based on control signal 500, applies, as one example of an inverse Fourier transform, an IFFT (inverse fast Fourier transform), and outputs inverse Fourier transformed signal 505.

Processor 506 receives inputs of inverse Fourier transformed signal 505 and control signal 500, applies processing such as frequency conversion and amplification based on control signal 500, and outputs modulated signal 507.

(For example, when signal 501 is signal-processed signal 106_A illustrated in FIG. 1, modulated signal 507 corresponds to transmission signal 108_A in FIG. 1. Moreover, when signal 501 is signal-processed signal 106_B illustrated in FIG. 1, modulated signal 507 corresponds to transmission signal 108_B in FIG. 1.)

Figure 6:
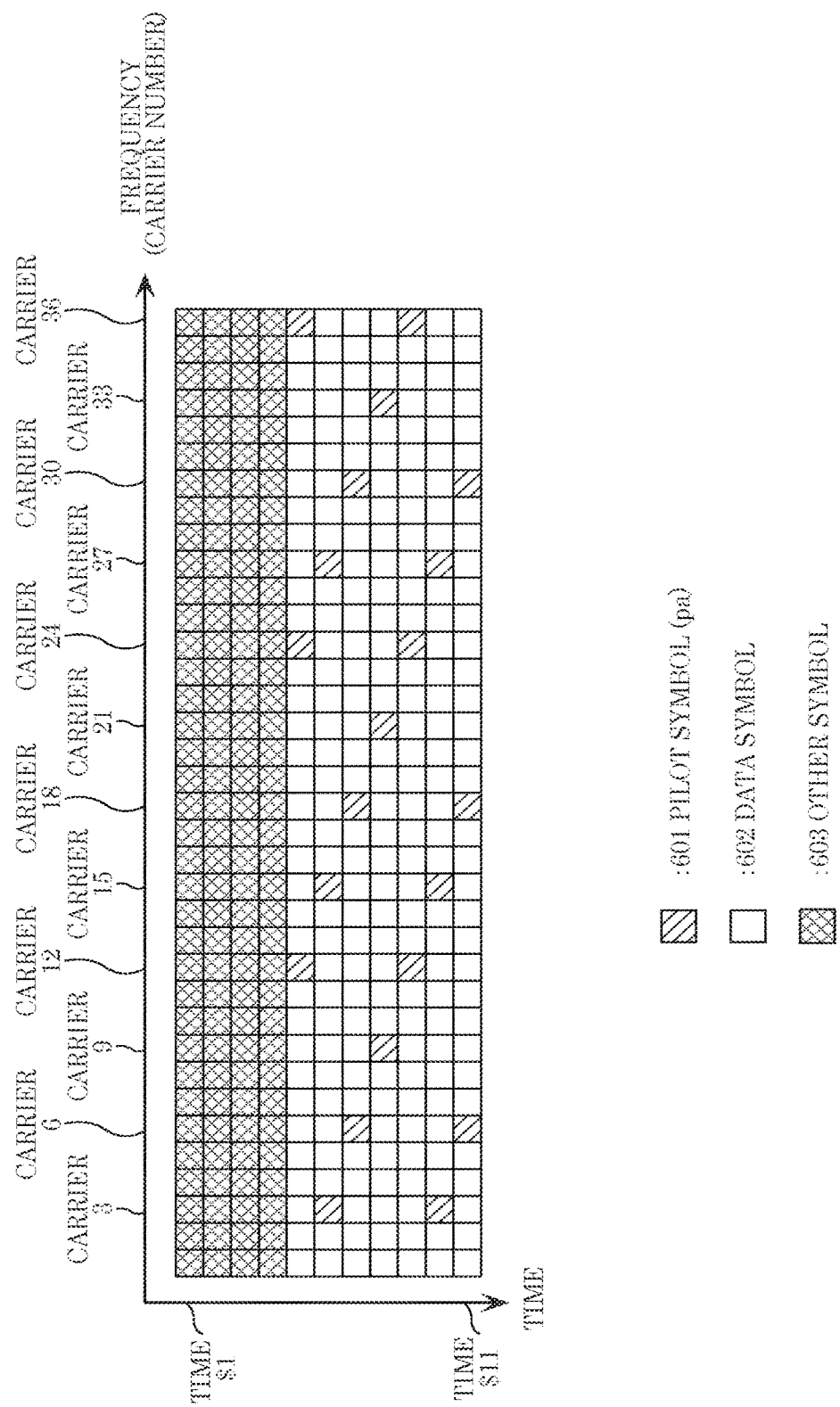
FIG. 6 illustrates one example of a frame configuration of a transmission signal.

FIG. 6 illustrates a frame configuration of transmission signal 108_A illustrated in FIG. 1. In FIG. 6, frequency (carriers) is (are) represented on the horizontal axis and time is represented on the vertical axis. Since a multi-carrier transmission method such as OFDM is used, symbols are present in the carrier direction. In FIG. 6, symbols from carriers 1 to 36 are shown. Moreover, in FIG. 6, symbols for time $1 through time $11 are shown.

In FIG. 6, 601 is a pilot symbol (pilot signal 251A (pa(t) in FIG. 2, FIG. 3)), 602 is a data symbol, and 603 is an other symbol. Here, a pilot symbol is, for example, a PSK (phase shift keying) symbol, and is a symbol for the reception device that receives this frame to perform channel estimation (propagation path fluctuation estimation), frequency offset estimation, and phase fluctuation estimation. For example, the transmission device illustrated in FIG. 1 and the reception device that receives the frame illustrated in FIG. 6 may share the transmission method of the pilot symbol.

Note that mapped signal 201A (mapped signal 105_1 in FIG. 1) is referred to as "stream #1" and mapped signal 201B (mapped signal 105_2 in FIG. 1) is referred to as "stream #2." Note that this also applied to subsequent descriptions.

Data symbol 602 is a symbol that corresponds to a data symbol included in baseband signal 208A generated in the signal processing illustrated in FIG. 2, FIG. 3. Accordingly, data symbol 602 satisfies "a symbol including both the symbol "stream #1" and the symbol "stream #2"", "the symbol "stream #1"", or "the symbol "stream #2"", as determined by the configuration of the precoding matrix used by weighting synthesizer 203 (in other words, data symbol 602 corresponds to weighting synthesized signal 204A (z1(i))).

Other symbols 603 are symbols corresponding to preamble signal 252 and control information symbol signal 253 illustrated in FIG. 2, FIG. 3 (however, the other symbols may include symbols other than a preamble or control information symbol). Here, a preamble may transmit data (control data), and may be configured as, for example, a symbol for signal detection, a signal for performing frequency and time synchronization, or a symbol for performing channel estimation (a symbol for performing propagation path fluctuation estimation). The control information symbol is a symbol including control information for the reception device that received the frame in FIG. 6 to demodulate and decode a data symbol.

For example, carriers $1 to 36 from time $1 to time 4 in FIG. 6 are other symbols 603. Then, at time $5, carrier 1 through carrier 11 are data symbols 602. Thereafter, at time $5, carrier 12 is pilot symbol 601, at time $5, carriers 13 to 23 are data symbols 602, at time $5, carrier 24 is pilot symbol 601 . . . at time $6, carriers 1 and 2 are data symbols 602, at time $6, carrier 3 is pilot symbol 601 . . . at time $11, carrier 30 is pilot symbol 601, at time $11, carriers 31 to 36 are data symbols 602.

Figure 7:
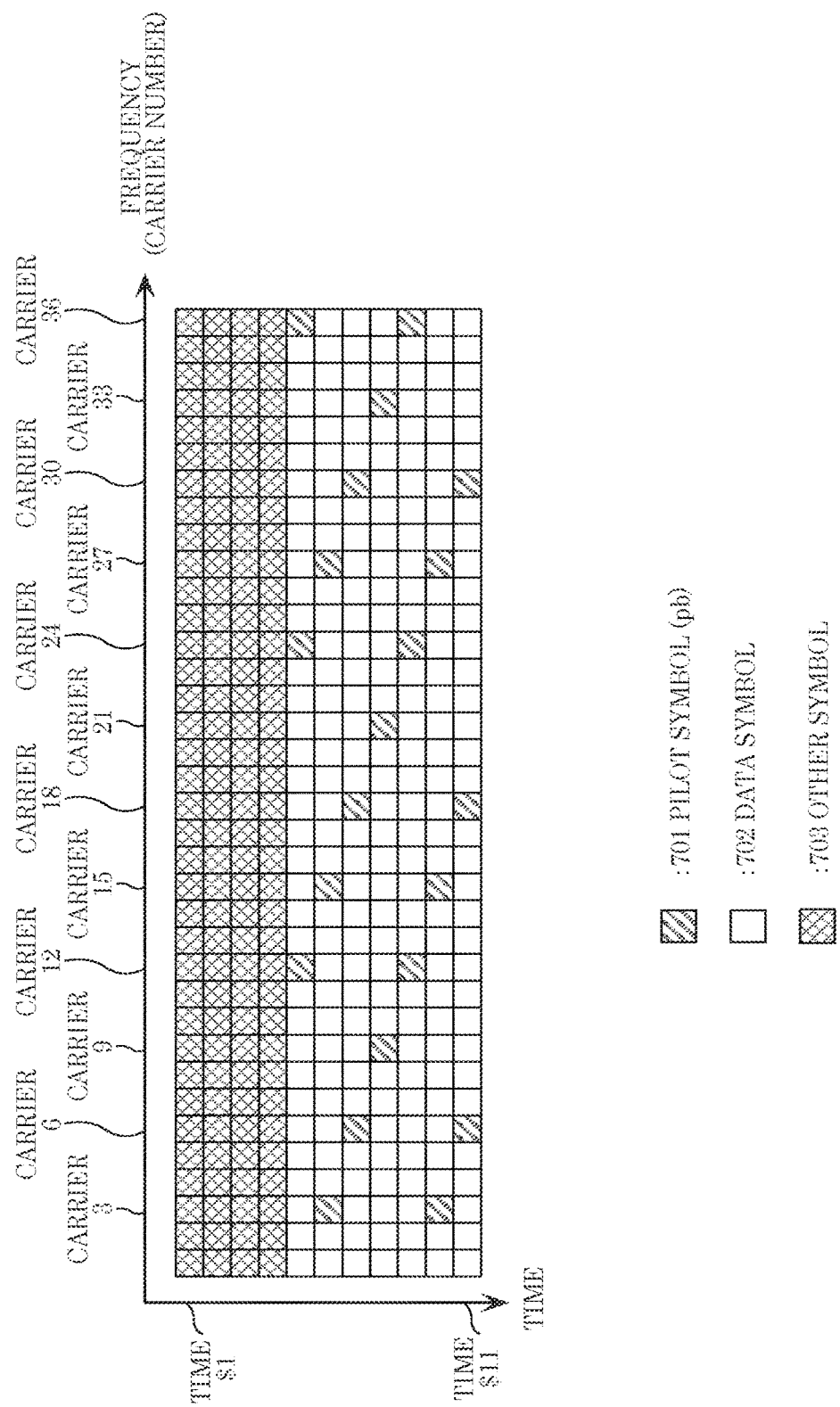
FIG. 7 illustrates one example of a frame configuration of a transmission signal.

FIG. 7 illustrates a frame configuration of transmission signal 108_B illustrated in FIG. 1. In FIG. 7, frequency (carriers) is (are) represented on the horizontal axis and time is represented on the vertical axis. Since a multi-carrier transmission method such as OFDM is used, symbols are present in the carrier direction. In FIG. 7, symbols from carriers 1 to 36 are shown. Moreover, in FIG. 7, symbols for time $1 through time $11 are shown.

In FIG. 7, 701 is a pilot symbol (pilot signal 251B (pb(t) in FIG. 2, FIG. 3)), 702 is a data symbol, and 703 is an other symbol. Here, a pilot symbol is, for example, a PSK symbol, and is a symbol for the reception device that receives this frame to perform channel estimation (propagation path fluctuation estimation), frequency offset estimation, and phase fluctuation estimation. For example, the transmission device illustrated in FIG. 1 and the reception device that receives the frame illustrated in FIG. 7 may share the transmission method of the pilot symbol.

Data symbol 702 is a symbol that corresponds to a data symbol included in baseband signal 208B generated in the signal processing illustrated in FIG. 2, FIG. 3. Accordingly, data symbol 702 satisfies "a symbol including both the symbol "stream #1" and the symbol "stream #2"", "the symbol "stream #1"", or "the symbol "stream #2"", as determined by the configuration of the precoding matrix used by weighting synthesizer 203 (in other words, data symbol 702 corresponds to phase-changed signal 206B (z2(i))).

Other symbols 703 are symbols corresponding to preamble signal 252 and control information symbol signal 253 illustrated in FIG. 2, FIG. 3 (however, the other symbols may include symbols other than a preamble or control information symbol). Here, a preamble may transmit data (control data), and is configured as, for example, a symbol for signal detection, a signal for performing frequency and time synchronization, or a symbol for performing channel estimation (a symbol for performing propagation path fluctuation estimation). The control information symbol is a symbol including control information for the reception device that received the frame in FIG. 7 to demodulate and decode a data symbol.

For example, carriers 1 to 36 from time $1 to time 4 in FIG. 7 are other symbols 703. Then, at time $5, carrier 1 through carrier 11 are data symbols 702. Thereafter, at time $5, carrier 12 is pilot symbol 701, at time $5, carriers 13 to 23 are data symbols 702, at time $5, carrier 24 is pilot symbol 701 . . . at time $6, carriers 1 and 2 are data symbols 702, at time $6, carrier 3 is pilot symbol 701 . . . at time $11, carrier 30 is pilot symbol 701, at time $11, carriers 31 to 36 are data symbols 702.

When a symbol is present in carrier A at time $B in FIG. 6 and a symbol is present in carrier A at time $B in FIG. 7, the symbol in carrier A at time $B in FIG. 6 and the symbol in carrier A at time $B in FIG. 5 are transmitted at the same time and same frequency. Note that the frame configuration is not limited to the configurations illustrated in FIG. 6 and FIG. 7; FIG. 6 and FIG. 7 are mere examples of frame configurations.

The other symbols in FIG. 6 and FIG. 7 are symbols corresponding to "preamble signal 252 and control information symbol signal 253 in FIG. 2, FIG. 3." Accordingly, when an other symbol 603 in FIG. 6 at the same time and same frequency (same carrier) as an other symbol 703 in FIG. 7 transmits control information, it transmits the same data (the same control information).

Note that this is under the assumption that the frame of FIG. 6 and the frame of FIG. 7 are received at the same time by the reception device, but even when the frame of FIG. 6 or the frame of FIG. 7 has been received, the reception device can obtain the data transmitted by the transmission device.

Figure 8:
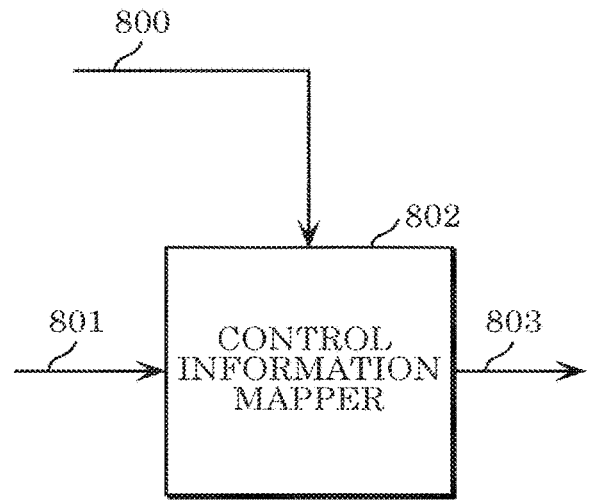
FIG. 8 illustrates one example of a configuration of components relevant to control information generation.

FIG. 8 illustrates one example of components relating to control information generation for generating control information symbol signal 253 illustrated in FIG. 2, FIG. 3.

Control information mapper 802 receives inputs of data 801 related to control information and control signal 800, maps data 801 related to control information in using a modulation scheme based on control signal 800, and outputs control information mapped signal 803. Note that control information mapped signal 803 corresponds to control information symbol signal 253 in FIG. 2, FIG. 3.

Figure 9:
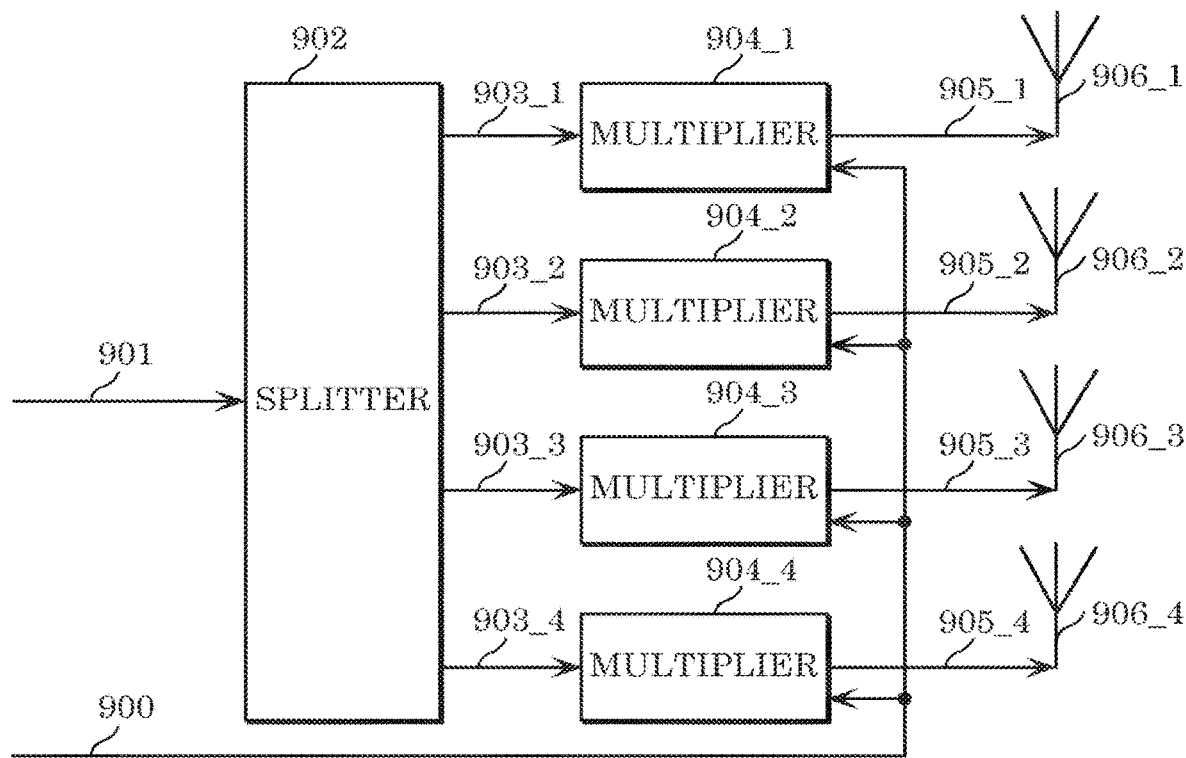
FIG. 9 illustrates one example of a configuration of an antenna unit in a transmission device.

FIG. 9 illustrates one example of a configuration of antenna unit #A (109_A), antenna #B (109_B) illustrated in FIG. 1 (antenna unit #A (109_A) and antenna unit #B (109_B) are exemplified as including a plurality of antennas). Splitter 902 receives an input of transmission signal 901, performs splitting, and outputs transmission signals 903_1, 903_2, 903_3, and 903_4.

Multiplier 904_1 receives inputs of transmission signal 903_1 and control signal 900, and based on the multiplication coefficient included in control signal 900, multiplies a multiplication coefficient with transmission signal 903_1, and outputs multiplied signal 905_1. Multiplied signal 905_1 is output from antenna 906_1 as radio waves.

When transmission signal 903_1 is expressed as Tx1(t) (t is time) and the multiplication coefficient is expressed as W1 (W1 can be defined as a complex number and thus may be a real number), multiplied signal 905_1 can be expressed as Tx1(t)×W1.

Multiplier 904_2 receives inputs of transmission signal 903_2 and control signal 900, and based on the multiplication coefficient included in control signal 900, multiplies a multiplication coefficient with transmission signal 903_2, and outputs multiplied signal 905_2. Multiplied signal 905_2 is output from antenna 906_2 as radio waves.

When transmission signal 903_2 is expressed as Tx2(t) and the multiplication coefficient is expressed as W2 (W2 can be defined as a complex number and thus may be a real number), multiplied signal 905_2 can be expressed as Tx2(t)×W2.

Multiplier 904_3 receives inputs of transmission signal 903_3 and control signal 900, and based on the multiplication coefficient included in control signal 900, multiplies a multiplication coefficient with transmission signal 903_3, and outputs multiplied signal 905_3. Multiplied signal 905_3 is output from antenna 906_3 as radio waves.

When transmission signal 903_3 is expressed as Tx3(t) and the multiplication coefficient is expressed as W3 (W3 can be defined as a complex number and thus may be a real number), multiplied signal 905_3 can be expressed as Tx3(t)×W3.

Multiplier 904_4 receives inputs of transmission signal 903_4 and control signal 900, and based on the multiplication coefficient included in control signal 900, multiplies a multiplication coefficient with transmission signal 903_4, and outputs multiplied signal 905_4. Multiplied signal 905_4 is output from antenna 906_4 as radio waves.

When transmission signal 903_4 is expressed as Tx4(t) and the multiplication coefficient is expressed as W4 (W4 can be defined as a complex number and thus may be a real number), multiplied signal 905_4 can be expressed as Tx4(t)×W4.

Note that "the absolute value of W1, the absolute value of W2, the absolute value of W3, and the absolute value of W4 are equal" may be true. Here, this is the equivalent of having performed a phase change (it goes without saying that the absolute value of W1, the absolute value of W2, the absolute value of W3, and the absolute value of W4 may be unequal).

Moreover, in FIG. 9, the antenna unit is exemplified as including four antennas (and four multipliers), but the number of antennas is not limited to four; the antenna unit may include two or more antennas.

When the configuration of antenna unit #A (109_A) in FIG. 1 is as illustrated in FIG. 9, transmission signal 901 corresponds to transmission signal 108_A in FIG. 1. When the configuration of antenna unit #B (109_B) in FIG. 1 is as illustrated in FIG. 9, transmission signal 901 corresponds to transmission signal 108_B in FIG. 1 and transmission signal 108_B in FIG. 1. However, antenna unit #A (109_A) and antenna unit #B (109_B) need not have the configurations illustrated in FIG. 9; as previously described, the antenna units need not receive an input of control signal 100. For example, antenna unit #A (109_A), antenna unit #B (109_B) illustrated in FIG. 1 may include one antenna and, alternatively, may include a plurality of antennas.

Figure 10:
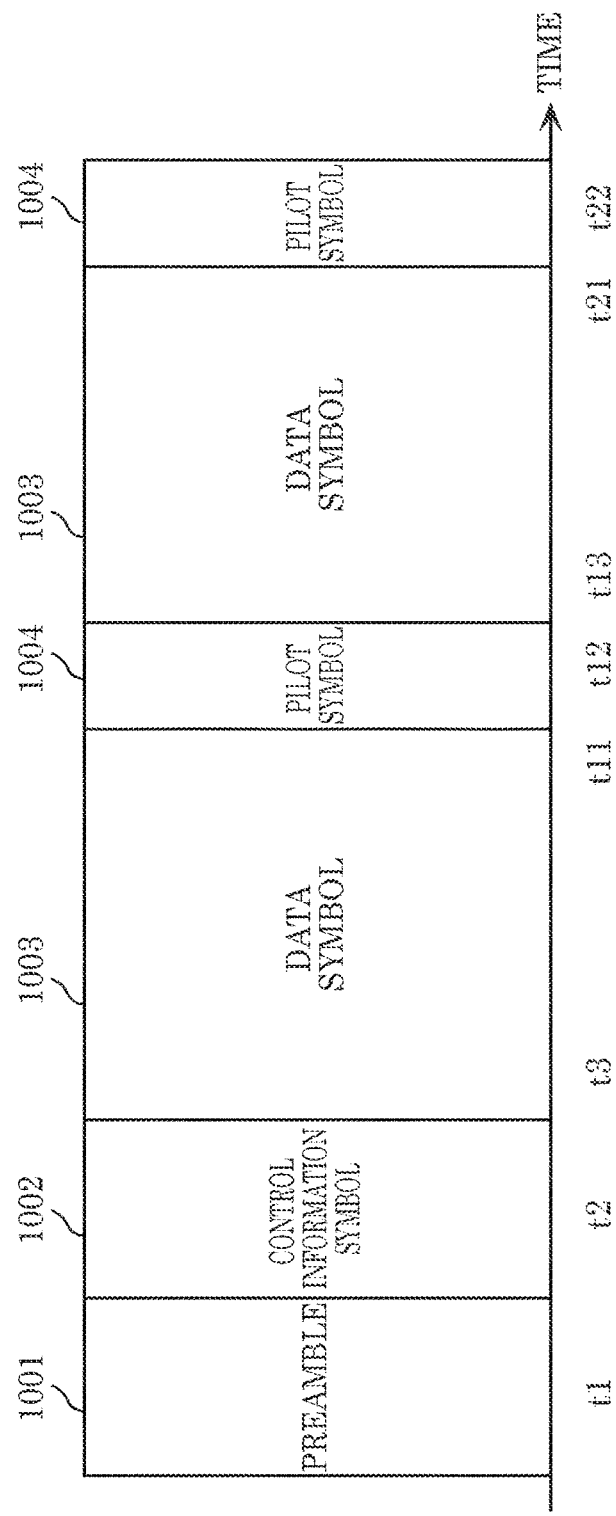
FIG. 10 illustrates one example of a frame configuration of a transmission signal.

FIG. 10 illustrates an example of a frame configuration of transmission signal 108_A illustrated in FIG. 1. In FIG. 10, time is represented on the horizontal axis. The difference between FIG. 10 and FIG. 6 is that the frame configuration illustrated in FIG. 10 is an example of a frame configuration when a single-carrier scheme is used, and symbols are present along the time axis. In FIG. 10, symbols from time t1 to t22 are shown.

Preamble 1001 in FIG. 10 corresponds to preamble signal 252 in, for example, FIG. 2, FIG. 3. Here, for example, the preamble may transmit data (for control purposes), may be a symbol for signal detection, a symbol for frequency and time synchronization, or a symbol for channel estimation (a symbol for propagation path fluctuation estimation).

Control information symbol 1002 in FIG. 10 is a symbol that corresponds to control information symbol signal 253 in, for example, FIG. 2, FIG. 3, and is a symbol including control information for realizing demodulation and decoding of data symbols by the reception device that received the frame illustrated in FIG. 10.

Pilot symbol 1004 illustrated in FIG. 10 is a symbol corresponding to pilot signal 251A (pa(t)) such as in FIG. 2, FIG. 3. Pilot symbol 1004 is, for example, a PSK symbol, and is used by the reception device that receives the frame for, for example, channel estimation (propagation path variation estimation), frequency offset estimation, and phase variation estimation. For example, the transmission device illustrated in FIG. 1 and the reception device that receives the frame illustrated in FIG. 10 may share the pilot symbol transmission method.

1003 in FIG. 10 is a data symbol for transmitting data.

Note that mapped signal 201A (mapped signal 105_1 in FIG. 1) is referred to as "stream #1" and mapped signal 201B (mapped signal 105_2 in FIG. 1) is referred to as "stream #2."

Data symbol 1003 is a symbol that corresponds to a data symbol included in baseband signal 208A generated in the signal processing illustrated in FIG. 2, FIG. 3. Accordingly, data symbol 1003 satisfies "a symbol including both the symbol "stream #1" and the symbol "stream #2"", "the symbol "stream #1"", or "the symbol "stream #2"", as determined by the configuration of the precoding matrix used by weighting synthesizer 203 (in other words, data symbol 1003 corresponds to weighting synthesized signal 204A (z1(i))).

Note that, although not illustrated in FIG. 10, the frame may include symbols other than a preamble, control information symbol, data symbol, and pilot symbol.

For example, in FIG. 10, the transmission device transmits preamble 1001 at time t1, transmits control information symbol 1002 at time t2, transmits data symbols 1003 from time t3 to time t11, transmits pilot symbol 1004 at time t12, transmits data symbols 1003 from time t13 to time t21, and transmits pilot symbol 1004 at time t22.

Figure 11:
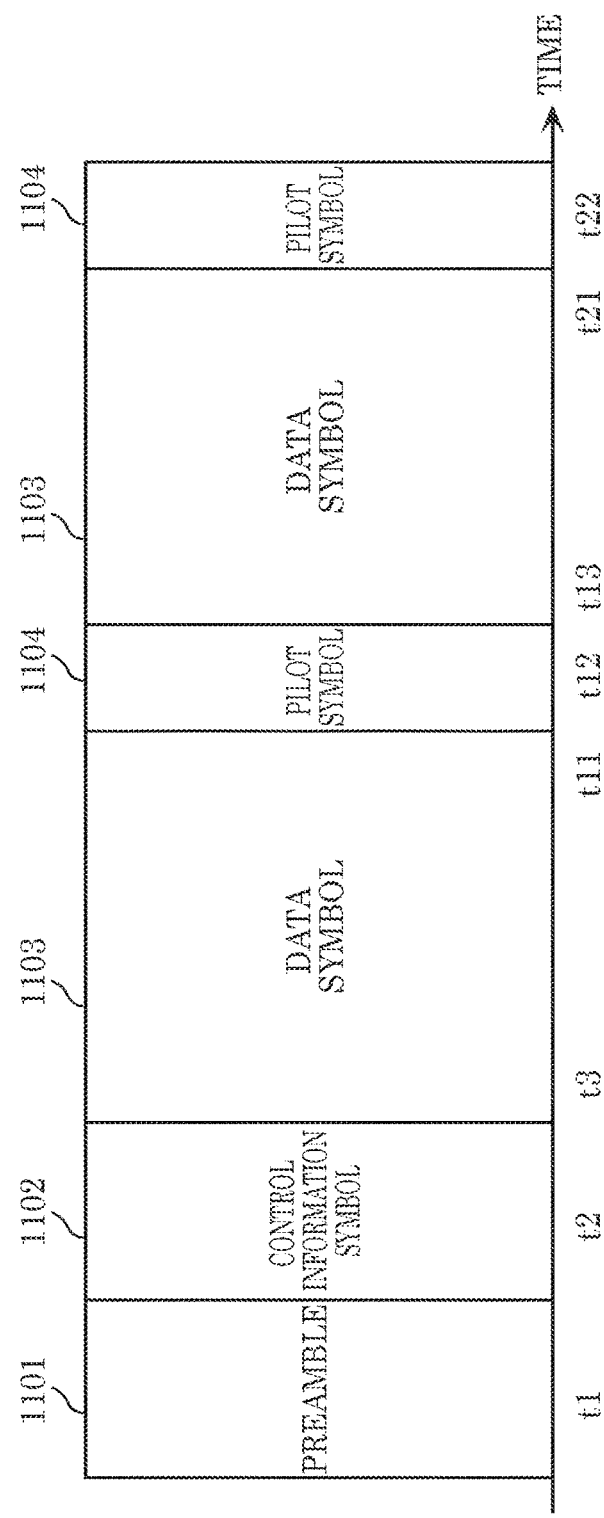
FIG. 11 illustrates one example of a frame configuration of a transmission signal.

FIG. 11 illustrates an example of a frame configuration of transmission signal 108_B illustrated in FIG. 1. In FIG. 11, time is represented on the horizontal axis. The difference between FIG. 11 and FIG. 7 is that the frame configuration illustrated in FIG. 11 is an example of a frame configuration when a single-carrier scheme is used, and symbols are present along the time axis. In FIG. 11, symbols from time t1 to t22 are shown.

Preamble 1101 in FIG. 11 corresponds to preamble signal 252 in, for example, FIG. 2, FIG. 3. Here, a preamble may transmit data (for control purposes), and may be configured as, for example, a symbol for signal detection, a signal for performing frequency and time synchronization, or a symbol for performing channel estimation (a symbol for performing propagation path fluctuation estimation).

Control information symbol 1102 in FIG. 11 is a symbol that corresponds to control information symbol signal 253 in, for example, FIG. 2, FIG. 3, and is a symbol including control information for realizing demodulation and decoding of data symbols by the reception device that received the frame illustrated in FIG. 11.

Pilot symbol 1104 illustrated in FIG. 11 is a symbol corresponding to pilot signal 251B (pb(t)) such as in FIG. 2, FIG. 3. Pilot symbol 1104 is, for example, a PSK symbol, and is used by the reception device that receives the frame for, for example, channel estimation (propagation path variation estimation), frequency offset estimation, and phase variation estimation. For example, the transmission device illustrated in FIG. 1 and the reception device that receives the frame illustrated in FIG. 11 may share the pilot symbol transmission method.

1103 in FIG. 11 is a data symbol for transmitting data.

Note that mapped signal 201A (mapped signal 105_1 in FIG. 1) is referred to as "stream #1" and mapped signal 201B (mapped signal 105_2 in FIG. 1) is referred to as "stream #2."

Data symbol 1103 is a symbol that corresponds to a data symbol included in baseband signal 208B generated in the signal processing illustrated in FIG. 2, FIG. 3. Accordingly, data symbol 1103 satisfies "a symbol including both the symbol "stream #1" and the symbol "stream #2"", "the symbol "stream #1"", or "the symbol "stream #2"", as determined by the configuration of the precoding matrix used by weighting synthesizer 203 (in other words, data symbol 1103 corresponds to phase-changed signal 206B (z2(i))).

Note that, although not illustrated in FIG. 11, the frame may include symbols other than a preamble, control information symbol, data symbol, and pilot symbol.

For example, in FIG. 11, the transmission device transmits preamble 1101 at time t1, transmits control information symbol 1102 at time t2, transmits data symbols 1103 from time t3 to time t11, transmits pilot symbol 1104 at time t12, transmits data symbols 1103 from time t13 to time t21, and transmits pilot symbol 1104 at time t22.

When a symbol is present at time tp in FIG. 10 and a symbol is present at time tp in FIG. 10 (where p is an integer that is greater than or equal to 1), the symbol at time tp in FIG. 10 and the symbol at time tp in FIG. 11 are transmitted at the same time and same frequency (for example, the data symbol at time t3 in FIG. 10 and the data symbol at time t3 in FIG. 11 are transmitted at the same time and same frequency). Note that the frame configuration is not limited to the configurations illustrated in FIG. 10 and FIG. 11; FIG. 10 and FIG. 11 are mere examples of frame configurations.

Moreover, a method in which the preamble and control information symbol in FIG. 10 and FIG. 11 transmit the same data (same control information) may be used.

Note that this is under the assumption that the frame of FIG. 10 and the frame of FIG. 11 are received at the same time by the reception device, but even when the frame of FIG. 10 or the frame of FIG. 11 has been received, the reception device can obtain the data transmitted by the transmission device.

Figure 12:
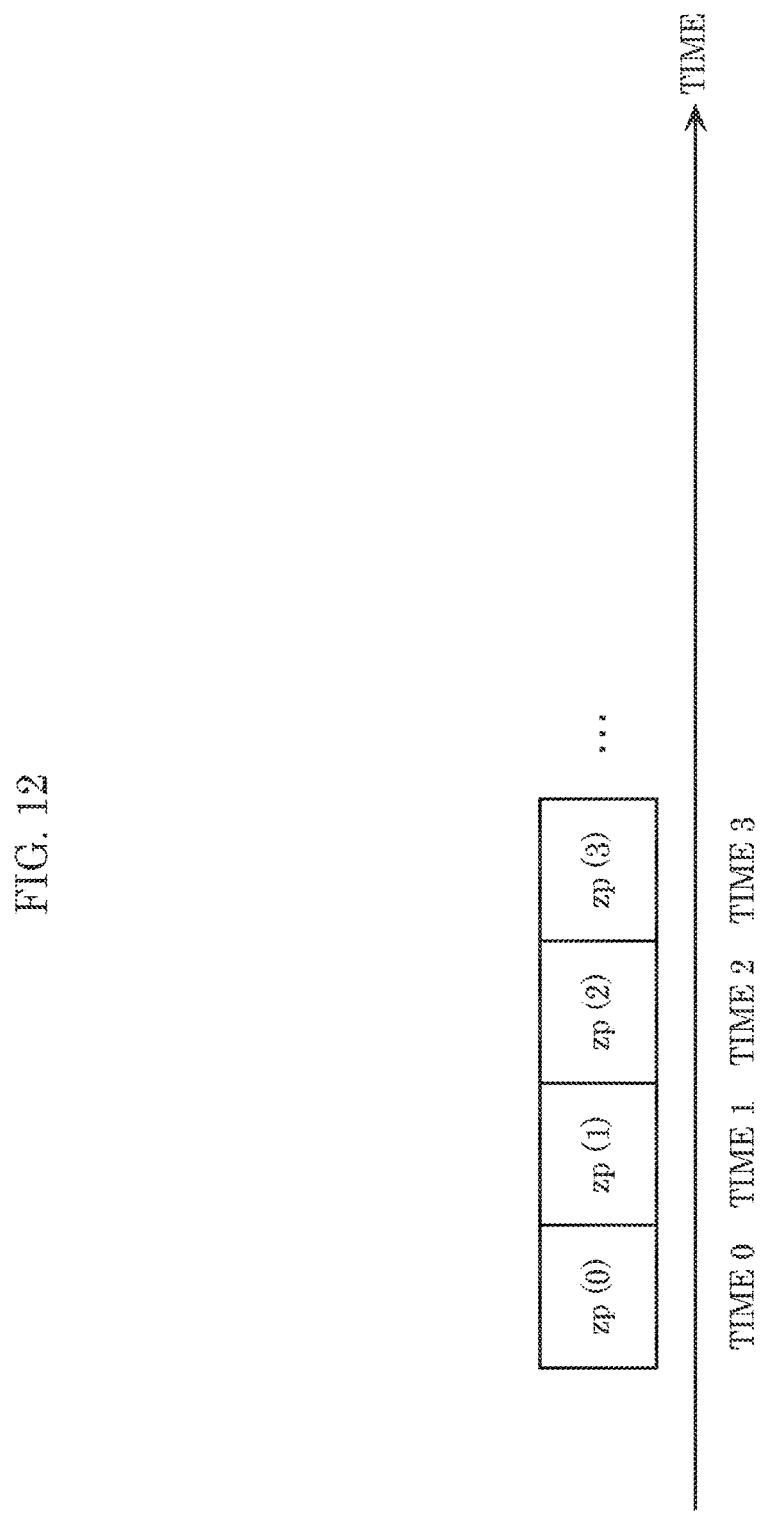
FIG. 12 illustrates one example of a symbol arrangement method with respect to the time axis.

FIG. 12 illustrates an example of a method of arranging symbols on the time axis for weighting synthesized signal 204A (z1(i)) and phase-changed signal 206B (z2(i)).

In FIG. 12, for example, zp(0) is shown. Here, q is 1 or 2. Accordingly, zp(0) in FIG. 12 indicates "in z1(i) and z2(i), z1(0) and z2(0) when symbol number i=0." Similarly, zp(1) indicates "in z1(i) and z2(i), z1(1) and z2(1) when symbol number i=1" (in other words, zp(X) indicates "in z1(i) and z2(i), z1(X) and z2(X) when symbol number i=X"). Note that this also applies to FIG. 13, FIG. 14, and FIG. 15.

As illustrated in FIG. 12, symbol zp(0) whose symbol number i=0 is arranged at time 0, symbol zp(1) whose symbol number i=1 is arranged at time 1, symbol zp(2) whose symbol number i=2 is arranged at time 2, symbol zp(3) whose symbol number i=3 is arranged at time 3, and other symbols are arranged in a similar fashion. With this, symbols are arranged on the time axis for weighting synthesized signal 204A (z1(i)) and phase-changed signal 206B (z2(i)). However, FIG. 12 merely illustrates one example; the relationship between time and symbol number is not limited to this example.

Figure 13:
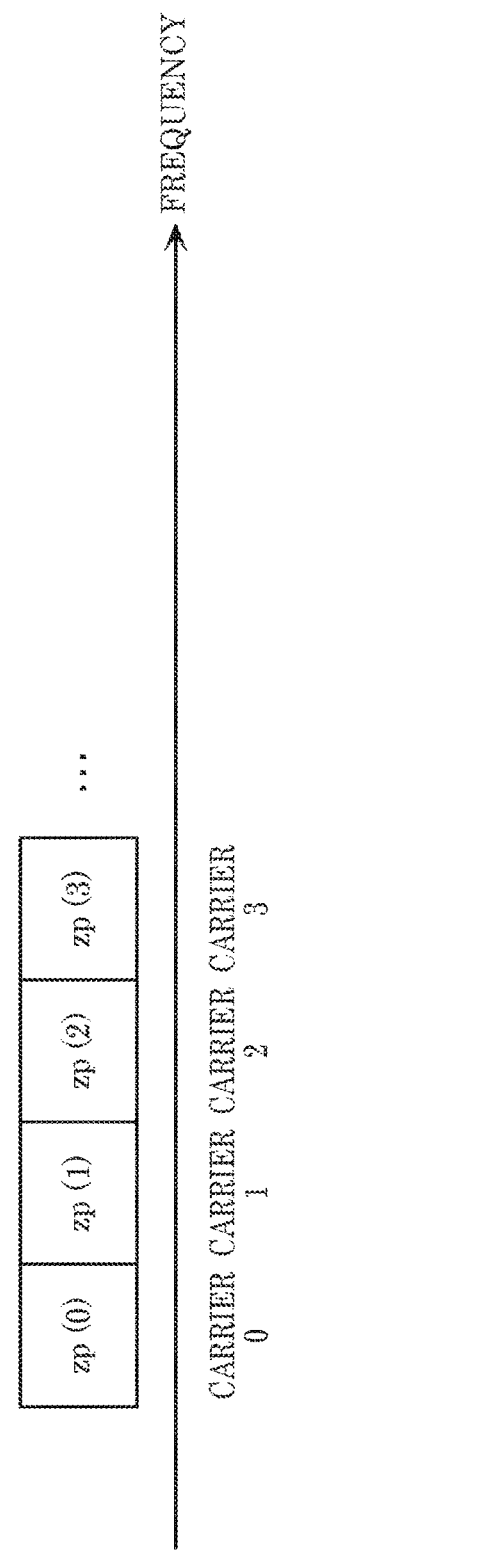
FIG. 13 illustrates one example of a symbol arrangement method with respect to the frequency axis.

FIG. 13 illustrates an example of a method of arranging symbols on the frequency axis for weighting synthesized signal 204A (z1(i)) and phase-changed signal 206B (z2(i)).

As illustrated in FIG. 13, symbol zp(0) whose symbol number i=0 is arranged at carrier 0, symbol zp(1) whose symbol number i=1 is arranged at carrier 1, symbol zp(2) whose symbol number i=2 is arranged at carrier 2, symbol zp(3) whose symbol number i=3 is arranged at carrier 3, and other symbols are arranged in a similar fashion. With this, symbols are arranged on the frequency axis for weighting synthesized signal 204A (z1(i)) and phase-changed signal 206B (z2(i)). However, FIG. 13 merely illustrates one example; the relationship between frequency and symbol number is not limited to this example.

Figure 14:
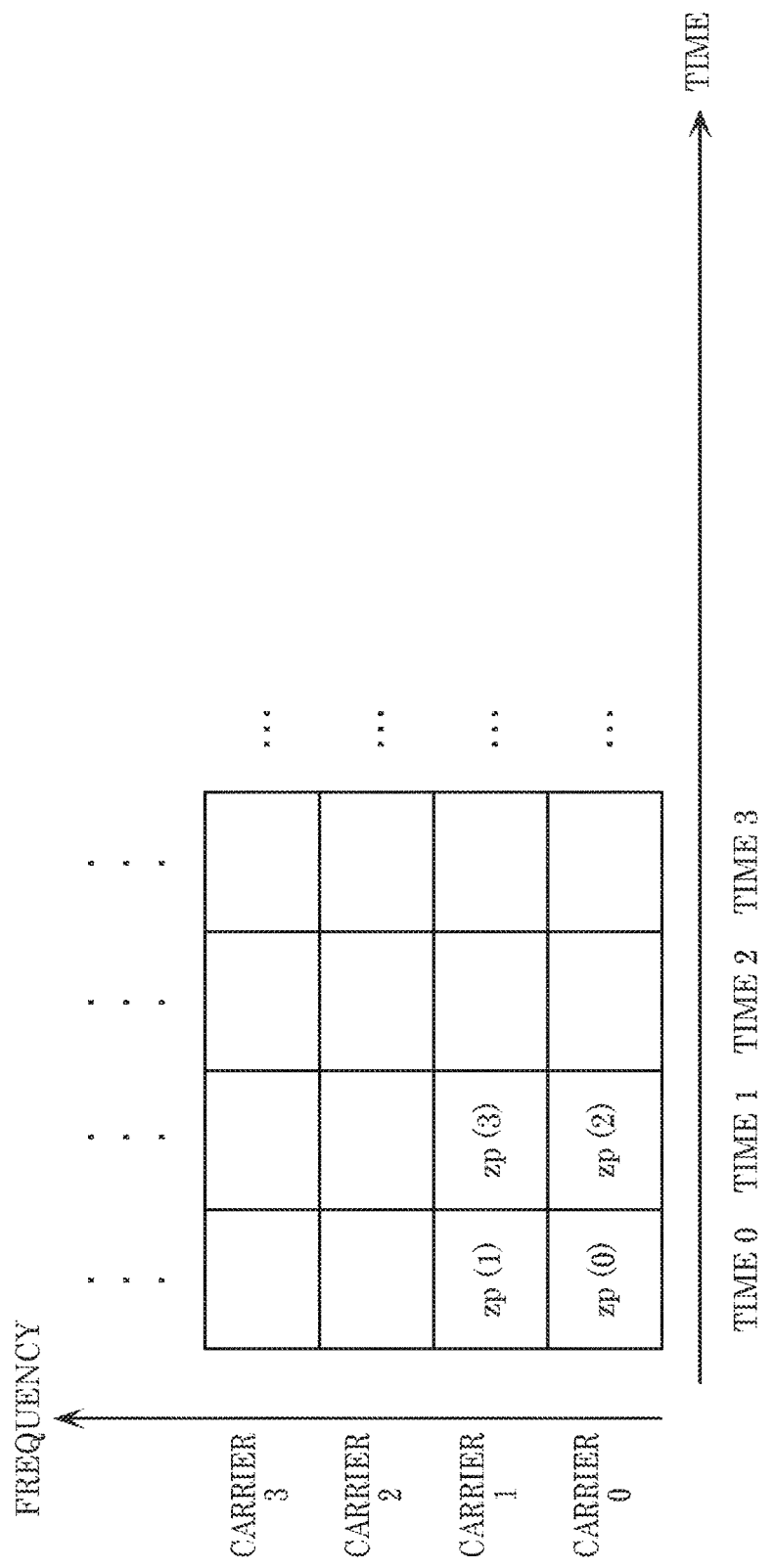
FIG. 14 illustrates one example of a symbol arrangement method with respect to the time and frequency axes.

FIG. 14 illustrates an example of an arrangement of symbols on the time and frequency axes for weighting synthesized signal 204A (z1(i)) and phase-changed signal 206B (z2(i)).

As illustrated in FIG. 14, symbol zp(0) whose symbol number i=0 is arranged at time 0 and carrier 0, symbol zp(1) whose symbol number i=1 is arranged at time 0 and carrier 1, symbol zp(2) whose symbol number i=2 is arranged at time 1 and carrier 0, symbol zp(3) whose symbol number i=3 is arranged at time 1 and carrier 1, and other symbols are arranged in a similar fashion. With this, symbols are arranged on the time and frequency axes for weighting synthesized signal 204A (z1(i)) and phase-changed signal 206B (z2(i)). However, FIG. 14 merely illustrates one example; the relationship between time and frequency and symbol number is not limited to this example.

Figure 15:
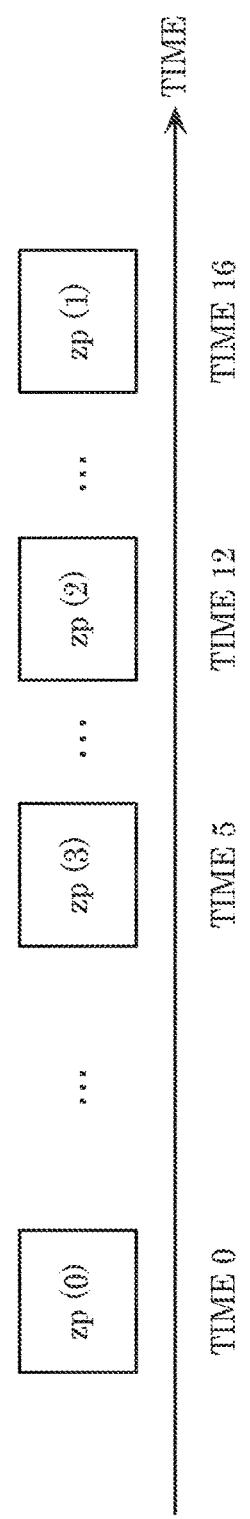
FIG. 15 illustrates one example of a symbol arrangement method with respect to the time axis.

FIG. 15 illustrates an example of an arrangement of symbols relative to time for weighting synthesized signal 204A (z1(i)) and phase-changed signal 206B (z2(i)). Note FIG. 15 illustrates an example of an arrangement of symbols when an interleaver (component for rearranging symbols) is included in radio units 107_A, 107_B illustrated in FIG. 1 (note that the configuration of radio units 107_A, 107_B illustrated in FIG. 1 when including an interleaver (component for rearranging symbols) will be described later with reference to FIG. 18).

As illustrated in FIG. 15, symbol zp(0) whose symbol number i=0 is arranged at time 0, symbol zp(1) whose symbol number i=1 is arranged at time 16, symbol zp(2) whose symbol number i=2 is arranged at time 12, symbol zp(3) whose symbol number i=3 is arranged at time 5, and other symbols are arranged in a similar fashion. With this, symbols are arranged on the time axis for weighting synthesized signal 204A (z1(i)) and phase-changed signal 206B (z2(i)). However, FIG. 15 merely illustrates one example; the relationship between time and symbol number is not limited to this example.

Figure 16:
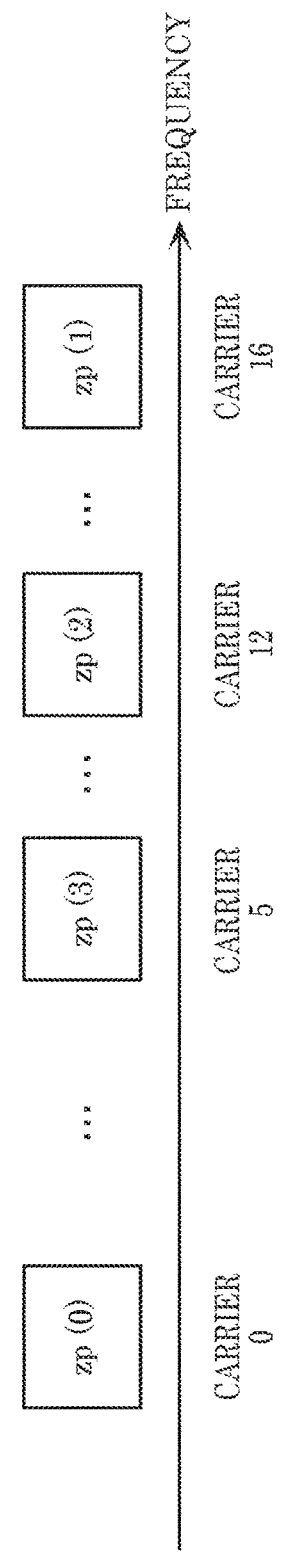
FIG. 16 illustrates one example of a symbol arrangement method with respect to the frequency axis.

FIG. 16 illustrates an example of an arrangement of symbols relative to time for weighting synthesized signal 204A (z1(i)) and phase-changed signal 206B (z2(i)). Note FIG. 16 illustrates an example of an arrangement of symbols when an interleaver (component for rearranging symbols) is included in radio units 107_A, 107_B illustrated in FIG. 1 (note that the configuration of radio units 107_A, 107_B illustrated in FIG. 1 when including an interleaver (component for rearranging symbols) will be described later with reference to FIG. 18).

As illustrated in FIG. 16, symbol zp(0) whose symbol number i=0 is arranged at carrier 0, symbol zp(1) whose symbol number i=1 is arranged at carrier 16, symbol zp(2) whose symbol number i=2 is arranged at carrier 12, symbol zp(3) whose symbol number i=3 is arranged at carrier 5, and other symbols are arranged in a similar fashion. With this, symbols are arranged on the time axis for weighting synthesized signal 204A (z1(i)) and phase-changed signal 206B (z2(i)). However, FIG. 16 merely illustrates one example; the relationship between frequency and symbol number is not limited to this example.

Figure 17:
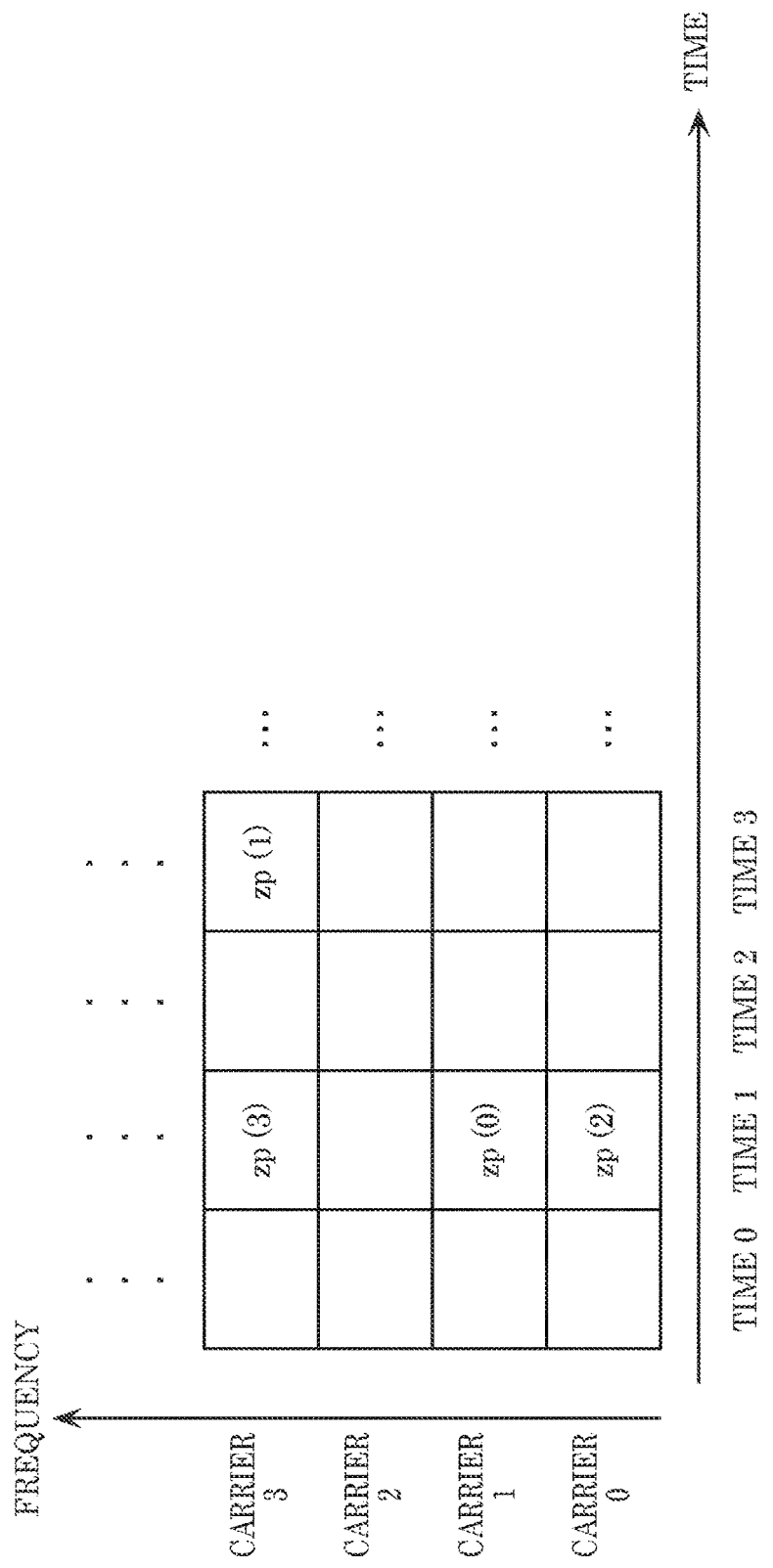
FIG. 17 illustrates one example of a symbol arrangement method with respect to the time and frequency axes.

FIG. 17 illustrates an example of an arrangement of symbols relative to time for weighting synthesized signal 204A (z1(i)) and phase-changed signal 206B (z2(i)). Note FIG. 17 illustrates an example of an arrangement of symbols when an interleaver (component for rearranging symbols) is included in radio units 107_A, 107_B illustrated in FIG. 1 (note that the configuration of radio units 107_A, 107_B illustrated in FIG. 1 when including an interleaver (component for rearranging symbols) will be described later with reference to FIG. 18).

As illustrated in FIG. 17, symbol zp(0) whose symbol number i=0 is arranged at time 1 and carrier 1, symbol zp(1) whose symbol number i=1 is arranged at time 3 and carrier 3, symbol zp(2) whose symbol number i=2 is arranged at time 1 and carrier 0, symbol zp(3) whose symbol number i=3 is arranged at time 1 and carrier 3, and other symbols are arranged in a similar fashion. With this, symbols are arranged on the time and frequency axes for weighting synthesized signal 204A (z1(i)) and phase-changed signal 206B (z2(i)). However, FIG. 17 merely illustrates one example; the relationship between time and frequency and symbol number is not limited to this example.

Figure 18:
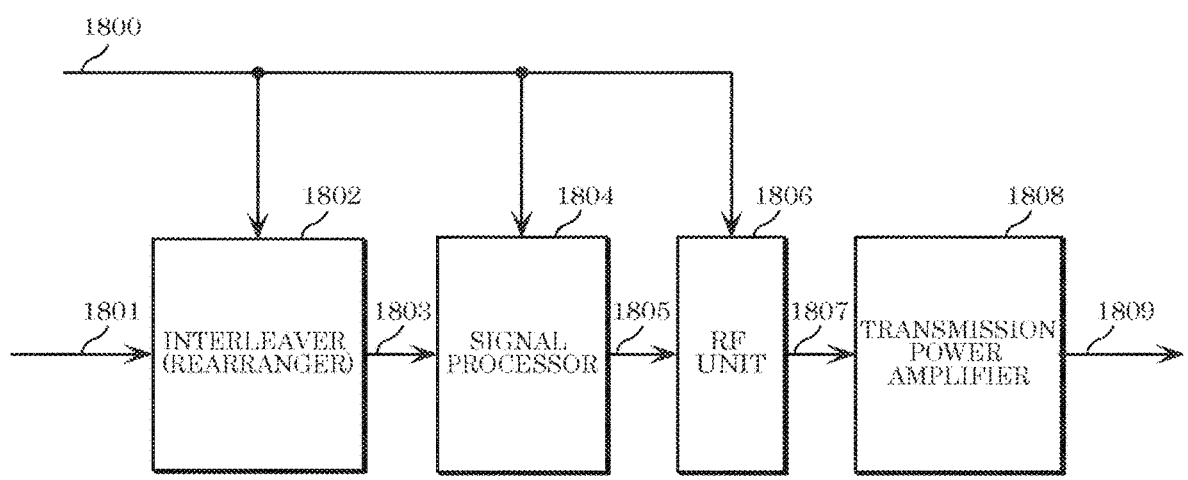
FIG. 18 illustrates one example of a configuration of a radio unit in a transmission device.

FIG. 18 illustrates an example of arrangement of symbols when radio units 107_A, 107_B illustrated in FIG. 1 include an interleaver (component for rearranging symbols).

Interleaver (rearranger) 1802 receives inputs of signal-processed signal 1801 (corresponding to 105_1, 105_2 in FIG. 1) and control signal 1800 (corresponding to 100 in FIG. 1), and, for example, in accordance with control signal 1800, rearrange the symbols, and output rearranged signal 1803. Note that an example of the rearrangement of symbols is as described with reference to FIG. 14 through FIG. 17.

Signal processor 1804 receives inputs of rearranged signal 1803 and control signal 1800, and in accordance with control signal 1800, performs signal processing, and outputs signal-processed signal 1805. For example, when the transmission device illustrated in FIG. 1 supports both a single-carrier scheme and an OFDM scheme, based on control signal 1800, signal processor 1804 either performs signal processing in accordance with the single-carrier scheme or performs signal processing in accordance with the OFDM scheme.

RF unit 1806 receives inputs of signal-processed signal 1805 and control signal 1800, and based on control signal 1800, performs processing such as frequency conversion, and outputs modulated signal 1807.

Transmission power amplifier 1808 receives an input of modulated signal 1807, performs signal amplification, and outputs modulated signal 1809.

Figure 19:
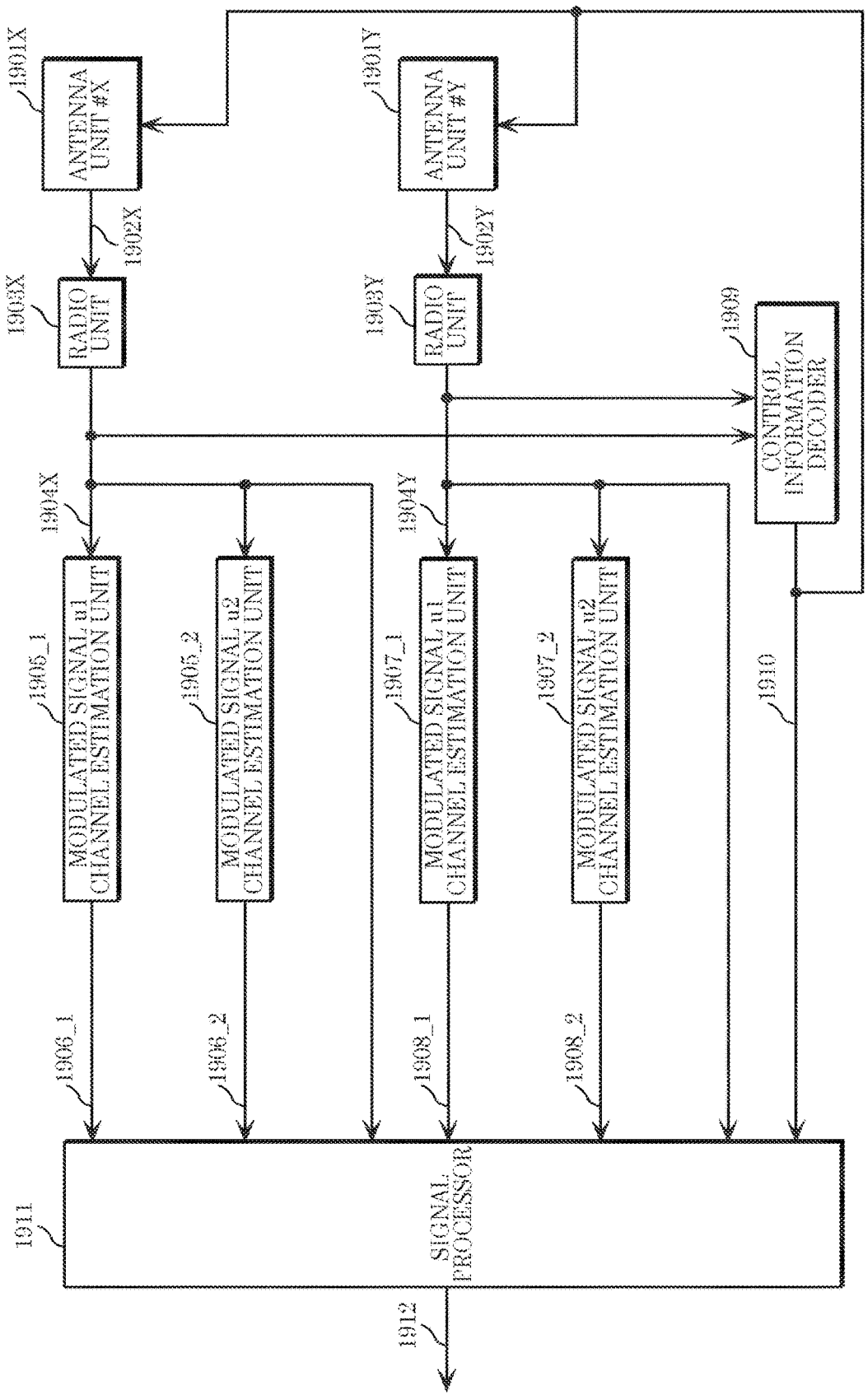
FIG. 19 illustrates one example of a configuration of a reception device.

FIG. 19 illustrates one example of a configuration of a reception device that receives a modulated signal upon the transmission device illustrated in FIG. 1 transmitting, for example, the frame configuration illustrated in FIG. 6 or FIG. 7, or a transmission signal illustrated in FIG. 10 or FIG. 11.

Radio unit 1903X receives an input of reception signal 1902X received by antenna unit #X (1901X), applies processing such as frequency conversion and a Fourier transform, and outputs baseband signal 1904X.

Similarly, radio unit 1903Y receives an input of reception signal 1902Y received by antenna unit #Y (1901Y), applies processing such as frequency conversion and a Fourier transform, and outputs baseband signal 1904Y.

Note FIG. 19 illustrates a configuration in which antenna unit #X (1901X) and antenna unit #Y (1901Y) receive control signal 1910 as an input, but antenna unit #X (1901X) and antenna unit #Y (1901Y) may be configured to not receive an input of control signal 1910. Operations performed when control signal 1910 is present as an input will be described in detail later.

Figure 20:
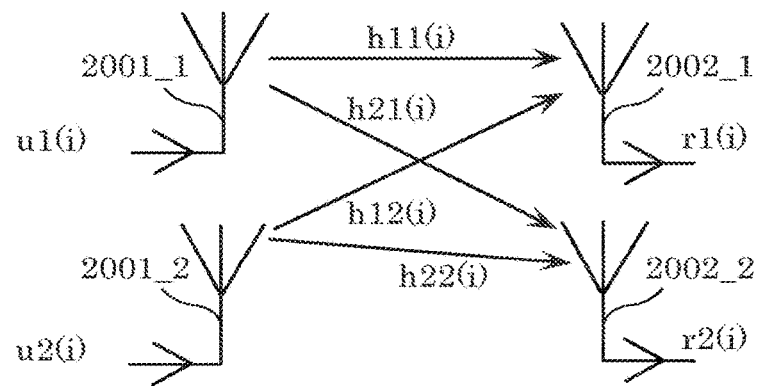
FIG. 20 illustrates one example of the relationship between a transmission device and a reception device.

FIG. 20 illustrates the relationship between the transmission device and the reception device. Antennas 2001_1 and 2001_2 in FIG. 20 are transmitting antennas, and antenna 2001_1 in FIG. 20 corresponds to antenna unit #A (109_A) in FIG. 1. Antenna 2001_2 in FIG. 20 corresponds to antenna unit #B (109_B) in FIG. 1.

Antennas 2002_1 and 2002_2 in FIG. 20 are receiving antennas, and antenna 2002_1 in FIG. 20 corresponds to antenna unit #X (1901X) in FIG. 19. Antenna 2002_2 in FIG. 20 corresponds to antenna unit #Y (1901Y) in FIG. 19.

As illustrated in FIG. 20, the signal transmitted from transmitting antenna 2001_1 is u1(i), the signal transmitted from transmitting antenna 2001_2 is u2(i), the signal received by receiving antenna 2002_1 is r1(i), and the signal received by receiving antenna 2002_2 is r2(i) Note that i is a symbol number, and, for example, is an integer that is greater than or equal to 0.

The propagation coefficient from transmitting antenna 2001_1 to receiving antenna 2002_1 is h11(i), the propagation coefficient from transmitting antenna 2001_1 to receiving antenna 2002_2 is h21(i), the propagation coefficient from transmitting antenna 2001_2 to receiving antenna 2002_1 is h12(i), and the propagation coefficient from transmitting antenna 2001_2 to receiving antenna 2002_2 is h22(i). In this case, the following relation equation holds true.

[MATH. 46]

$$\begin{pmatrix} r1(i) \\ r2(i) \end{pmatrix} = \begin{pmatrix} h11(i) & h12(i) \\ h21(i) & h22(i) \end{pmatrix} \begin{pmatrix} u1(i) \\ u2(i) \end{pmatrix} + \begin{pmatrix} n1(i) \\ n2(i) \end{pmatrix} \quad \text{Equation (46)}$$

Note that n1(i) and n2(i) are noise.

Channel estimation unit 1905_1 of modulated signal u1 in FIG. 19 receives an input of baseband signal 1904X, and using the preamble and/or pilot symbol illustrated in FIG. 6 or FIG. 7 (or FIG. 10 or FIG. 11), performs channel estimation on modulated signal u1, that is to say, estimates h11(i) in Equation (46), and outputs channel estimated signal 1906_1.

Channel estimation unit 1905_2 of modulated signal u2 receives an input of baseband signal 1904X, and using the preamble and/or pilot symbol illustrated in FIG. 6 or FIG. 7 (or FIG. or FIG. 11), performs channel estimation on modulated signal u2, that is to say, estimates h12(i) in Equation (46), and outputs channel estimated signal 1906_2.

Channel estimation unit 1907_1 of modulated signal u1 receives an input of baseband signal 1904Y, and using the preamble and/or pilot symbol illustrated in FIG. 6 or FIG. 7 (or FIG. or FIG. 11), performs channel estimation on modulated signal u1, that is to say, estimates h21(i) in Equation (46), and outputs channel estimated signal 1908_1.

Channel estimation unit 1907_2 of modulated signal u2 receives an input of baseband signal 1904Y, and using the preamble and/or pilot symbol illustrated in FIG. 6 or FIG. 7 (or FIG. or FIG. 11), performs channel estimation on modulated signal u2, that is to say, estimates h22(i) in Equation (46), and outputs channel estimated signal 1908_2.

Control information decoder 1909 receives inputs of baseband signals 1904X and 1904Y, demodulates and decodes control information including "other symbols" in FIG. 6 and FIG. 7 (or FIG. 10 and FIG. 11), and outputs control signal 1910 including control information.

Signal processor 1911 receives inputs of channel estimated signals 1906_1, 1906_2, 1908_1, 1908_2, baseband signals 1904X, 1904Y, and control signal 1910, and performs demodulation and decoding using the relationship in Equation (46) or based on control information in control signal 1910 (for example, information on a modulation scheme or a scheme relating to the error correction code), and outputs reception data 1912.

Note that control signal 1910 need not be generated via the method illustrated in FIG. 19. For example, control signal 1910 in FIG. 19 may be generated based on information transmitted by a device that is the communication partner (FIG. 1) in FIG. 8, and, alternatively, the device in FIG. 19 may include an input unit, and control signal 1910 may be generated based on information input from the input unit.

Figure 21:
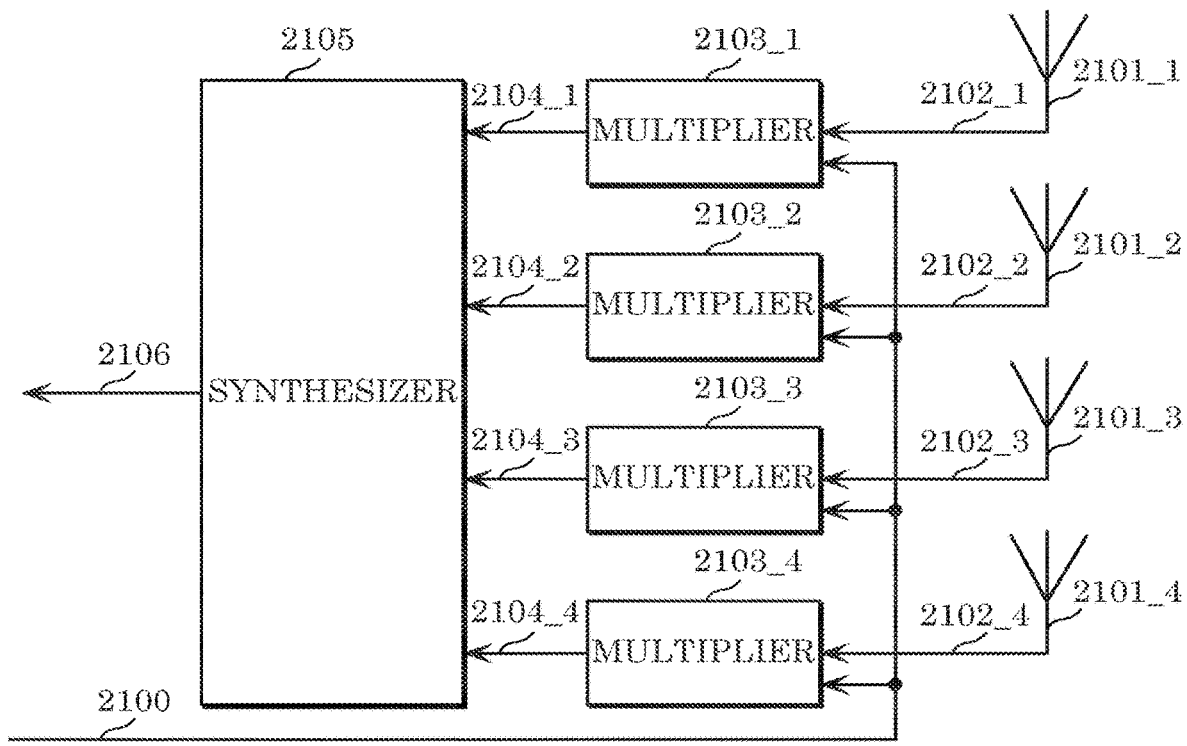
FIG. 21 illustrates one example of a configuration of an antenna unit in a reception device.

FIG. 21 illustrates one example of a configuration of antenna unit #X (1901X) and antenna unit #Y (1901Y) illustrated in FIG. 19 (antenna unit #X (1901X) and antenna unit #Y (1901Y) are exemplified as including a plurality of antennas).

Multiplier 2103_1 receives inputs of reception signal 2102_1 received by antenna 2101_1 and control signal 2100, and based on information on a multiplication coefficient included in control signal 2100, multiplies reception signal 2102_1 with the multiplication coefficient, and outputs multiplied signal 2104_1.

When reception signal 2102_1 is expressed as Rx1(t) (t is time) and the multiplication coefficient is expressed as D1 (D1 can be defined as a complex number and thus may be a real number), multiplied signal 2104_1 can be expressed as Rx1(t)×D1.

Multiplier 2103_2 receives inputs of reception signal 2102_2 received by antenna 2101_2 and control signal 2100, and based on information on a multiplication coefficient included in control signal 2100, multiplies reception signal 2102_2 with the multiplication coefficient, and outputs multiplied signal 2104_2.

When reception signal 2102_2 is expressed as Rx2(t) and the multiplication coefficient is expressed as D2 (D2 can be defined as a complex number and thus may be a real number), multiplied signal 2104_2 can be expressed as Rx2(t)×D2.

Multiplier 2103_3 receives inputs of reception signal 2102_3 received by antenna 2101_3 and control signal 2100, and based on information on a multiplication coefficient included in control signal 2100, multiplies reception signal 2102_3 with the multiplication coefficient, and outputs multiplied signal 2104_3.

When reception signal 2102_3 is expressed as Rx3(t) and the multiplication coefficient is expressed as D3 (D3 can be defined as a complex number and thus may be a real number), multiplied signal 2104_3 can be expressed as Rx3(t)×D3.

Multiplier 2103_4 receives inputs of reception signal 2102_4 received by antenna 2101_4 and control signal 2100, and based on information on a multiplication coefficient included in control signal 2100, multiplies reception signal 2102_4 with the multiplication coefficient, and outputs multiplied signal 2104_4.

When reception signal 2102_4 is expressed as Rx4(t) and the multiplication coefficient is expressed as D4 (D4 can be defined as a complex number and thus may be a real number), multiplied signal 2104_4 can be expressed as Rx4(t)×D4.

Synthesizer 2105 receives inputs of multiplied signals 2104_1, 2104_2, 2104_3, and 1004_4, synthesizes multiplied signals 2104_1, 2104_2, 2104_3, and 2104_4, and outputs synthesized signal 2106. Note that synthesized signal 2106 is expressed as Rx1(t)×D1+Rx2(t)×D2+Rx3(t)×D3+Rx4(t)×D4.

In FIG. 21, the antenna unit is exemplified as including four antennas (and four multipliers), but the number of antennas is not limited to four; the antenna unit may include two or more antennas.

When antenna unit #X (1901X) illustrated in FIG. 19 has the configuration illustrated in FIG. 21, reception signal 1902X corresponds to synthesized signal 2106 in FIG. 21, and control signal 1910 corresponds to control signal 2100 in FIG. 10. When antenna unit #Y (1901Y) illustrated in FIG. 19 has the configuration illustrated in FIG. 21, reception signal 1902Y corresponds to synthesized signal 2106 in FIG. 21, and control signal 1910 corresponds to control signal 2100 in FIG. 21.

However, antenna unit #X (1901X) and antenna unit #Y (1901Y) need not have the configurations illustrated in FIG. 21; as previously described, the antenna units need not receive an input of control signal 1910. antenna unit #X (1901X) and antenna unit #Y (1901Y) may each be comprised on a single antenna.

Note that control signal 1900 may be generated based on information transmitted by a device that is the communication partner, and, alternatively, the device may include an input unit, and control signal 1900 may be generated based on information input from the input unit.

With the transmission method described in this embodiment, by the transmission device illustrated in FIG. 1 transmitting the modulated signal, the reception device in FIG. 19 that receives the modulated signal transmitted by the transmission device in FIG. 1 can reduce the influence of phase noise and the influence of non-linear distortion, and thus can achieve an advantageous effect that the data reception quality is improved.

Note that the modulated signal transmitted by the transmission device illustrated in FIG. 1 may be a single-carrier scheme modulated signal and, alternatively, may be a multi-carrier scheme modulated signal such as an OFDM modulated signal. Moreover, the modulated signal may be applied with a spread spectrum communication method.

Control signal 100 in the transmission device illustrated in FIG. 1 may include control information for specifying transmission using a single-carrier scheme or transmission using a multi-carrier scheme such as OFDM. When control signal 100 indicates transmission using a single-carrier scheme, the transmission device illustrated in FIG. 1 transmits a single-carrier scheme modulated signal, and when control signal 100 indicates transmission using a multi-carrier scheme such as OFDM, the transmission device illustrated in FIG. 1 transmits a multi-carrier scheme modulated signal such as an OFDM modulated signal. Note that as a result of the transmission signal illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted in FIG. 1.

Embodiment 2

In this embodiment, differences from Embodiment 1 will be described when the transmission device illustrated in FIG. 1 can transmit both a single-carrier scheme modulated signal and a multi-carrier scheme modulated signal such as an OFDM modulated signal, or one or the other.

In this embodiment, the following three types of transmission devices will be considered.

First Transmission Device:

The first transmission device is a transmission device capable of selectively transmitting both a single-carrier scheme modulated signal and a multi-carrier scheme modulated signal such as an OFDM modulated signal. Control signal 100 in the transmission device illustrated in FIG. 1 includes control information for specifying transmission using a single-carrier scheme or transmission using a multi-carrier scheme such as OFDM, and when control signal 100 indicates transmission using a single-carrier scheme, the transmission device illustrated in FIG. 1 transmits a single-carrier scheme modulated signal, and when control signal 100 indicates transmission using a multi-carrier scheme such as OFDM, the transmission device illustrated in FIG. 1 transmits a multi-carrier scheme modulated signal such as an OFDM modulated signal. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

Second Transmission Device:

The second transmission device is a transmission device capable of transmitting a single-carrier scheme modulated signal. When control signal 100 in the transmission device illustrated in FIG. 1 includes control information for specifying transmission using a single-carrier scheme or transmission using a multi-carrier scheme such as OFDM, the second transmission device can only select transmission using a single-carrier scheme as this control information. Accordingly, the transmission device illustrated in FIG. 1 transmits a single-carrier scheme modulated signal. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

Third Transmission Device:

The third transmission device is a transmission device capable of transmitting a multi-carrier scheme modulated signal such as an OFDM modulated signal. When control signal 100 in the transmission device illustrated in FIG. 1 includes control information for specifying transmission using a single-carrier scheme or transmission using a multi-carrier scheme such as OFDM, the second transmission device can only select transmission using a multi-carrier scheme such as OFMD as this control information. Accordingly, the transmission device illustrated in FIG. 1 transmits a multi-carrier scheme modulated signal such as a OFDM modulated signal. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

In Embodiment 1, the configuration of the transmission device, the configuration of the reception device that receives the modulated signal transmitted by the transmission device, the frame configuration example in the case of single-carrier scheme, and the frame configuration example in the case of multi-carrier scheme such as OFDM have already been described, so repeated description will be omitted.

In this embodiment, as a transmission signal method for a modulated signal when a single-carrier scheme is used, any one of the first selection method, second selection method, or third selection method described in Embodiment 1 is applied, and the transmission device illustrated in FIG. 1 transmits the modulated signal. Here, in the second transmission device, influence of phase noise in the RF unit and influence of non-linear distortion in the transmission power amplifier can be reduced, and depending on the transmission method, it is possible to achieve an advantageous effect of transmit diversity. Accordingly, in the reception device that receives the modulated signal transmitted by the second transmission device, it is possible to achieve an advantageous effect of improvement in data reception quality.

In this embodiment, the following methods for transmitting a multi-carrier scheme modulated signal such as an OFDM modulated signal will be considered.

Fourth Selection Method:

The transmission device illustrated in FIG. 1 switches the transmission method of the modulated signal based on information on the transmission method included in control signal 100. Here, the transmission device illustrated in FIG. 1 can select the following transmission methods.

Transmission Method #4-1:

A single stream is transmitted (s1(i) is transmitted). The modulation scheme (of s1(i)) is BPSK (or π/2 shift BPSK) (however, the single stream modulated signal may be transmitted using a single antenna and, alternatively, transmitted using a plurality of antennas).

Transmission Method #4-2:

A single stream is transmitted (s1(i) is transmitted). The modulation scheme (of s1(i)) is QPSK (or π/2 shift QPSK) (however, the single stream modulated signal may be transmitted using a single antenna and, alternatively, transmitted using a plurality of antennas).

Transmission Method #4-3:

A single stream is transmitted (s1(i) is transmitted). The modulation scheme of s1(i) is 16QAM (or π/2 shift 16QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #4-4:

A single stream is transmitted (s1(i) is transmitted). The modulation scheme of s1(i) is 64QAM (or π/2 shift 64QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #4-5:

Two streams are transmitted (s1(i) and s2(i) are transmitted). The modulation scheme of s1(i) is BPSK (or π/2 shift BPSK), and the modulation scheme of s2(i) is BPSK (or π/2 shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Transmission Method #4-6:

Two streams are transmitted (s1(i) and s2(i) are transmitted). The modulation scheme of s1(i) is QPSK (or π/2 shift QPSK), and the modulation scheme of s2(i) is QPSK (or π/2 shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Transmission Method #4-7:

Two streams are transmitted (s1(i) and s2(i) are transmitted). The modulation scheme of s1(i) is QPSK (or π/2 shift QPSK), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas.

Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians $\leq \theta < 2\pi$ radians)) (when $\theta = \pi/4$ radians (45 degrees), the average transmission power of the modulated signals transmitted from the antennas is equal).

Transmission Method #4-8:

Two streams are transmitted (s1(i) and s2(i) are transmitted). The modulation scheme of s1(i) is 16QAM (or $\pi/2$ shift 16QAM) (or a modulation scheme in which 16 signal points are in the in-phase I-quadrature Q plane, such as 16APSK (a shift may be performed)), and the modulation scheme of s2(i) is 16QAM (or $\pi/2$ shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians $\leq \theta < 2\pi$ radians)).

Transmission Method #4-9:

Two streams are transmitted (s1(i) and s2(i) are transmitted). The modulation scheme of s1(i) is 64QAM (or $\pi/2$ shift 64QAM) (or a modulation scheme in which 64 signal points are in the in-phase I-quadrature Q plane, such as 16APSK (a shift may be performed)), and the modulation scheme of s2(i) is 64QAM (or $\pi/2$ shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians $\leq \theta < 2\pi$ radians)).

Alternatively, two streams are transmitted (s1(i) and s2(i) are transmitted). The modulation scheme of s1(i) is 64QAM (or $\pi/2$ shift 64QAM) (or a modulation scheme in which 64 signal points are in the in-phase I-quadrature Q plane, such as 16APSK (a shift may be performed)), and the modulation scheme of s2(i) is 64QAM (or $\pi/2$ shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta = 0$ radians in Equation (13) through Equation (20) (note that $\theta$ is greater than or equal to 0 radians and less than $2\pi$ radians (0 radians $\leq \theta < \pi$ radians)).

Alternatively, two streams are transmitted (s1(i) and s2(i) are transmitted). The modulation scheme of s1(i) is 64QAM (or $\pi/2$ shift 64QAM) (or a modulation scheme in which 64 signal points are in the in-phase I-quadrature Q plane, such as 64APSK (a shift may be performed)), and the modulation scheme of s2(i) is 64QAM (or $\pi/2$ shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta = 0$, and include at least one precoding matrix that satisfies any one of Equation (13) through Equation (20) in which $\theta \neq 0$.

Note that in the fourth selection method, the transmission method need not correspond to all transmission methods from transmission method #4-1 through transmission method #4-9. For example, in the fourth selection method, the transmission method may correspond to one or more transmission method from among the following three transmission methods: transmission method #4-5, transmission method #4-6, and transmission method #4-7. In the fourth transmission method, the transmission method may correspond to one or more transmission method from among the following two transmission methods: transmission method #4-8 and transmission method #4-9.

In the fourth selection method, the transmission method need not correspond to transmission method #4-1 (in the fourth selection method, the transmission method need not include transmission method #4-1 in the transmission method selection candidates in the transmission device illustrated in FIG. 1). The fourth selection method may include a transmission method other than those from transmission method #4-1 to transmission method #4-9.

Here, the following is satisfied.
Transmission Method #4-1:
The number of signal points in the in-phase I-quadrature Q plane of the transmission signal is 2.
Transmission Method #4-2:
The number of signal points in the in-phase I-quadrature Q plane of the transmission signal is 4.
Transmission Method #4-3:
The number of signal points in the in-phase I-quadrature Q plane of the transmission signal is 16.
Transmission Method #4-4:
The number of signal points in the in-phase I-quadrature Q plane of the transmission signal is 64.
Transmission Method #4-5:
The number of signal points in the in-phase I-quadrature Q plane of the transmission signal is greater than 2 and less than or equal to 4. The advantageous effect of transmit diversity is achievable.
Transmission Method #4-6:
The number of signal points in the in-phase I-quadrature Q plane of the transmission signal is greater than 4 and less than or equal to 16. The advantageous effect of transmit diversity is achievable.
Transmission Method #4-7:
The number of signal points in the in-phase I-quadrature Q plane of the transmission signal is greater than 4 and less than or equal to 64. The advantageous effect of transmit diversity is achievable.
Transmission Method #4-8:
The number of signal points in the in-phase I-quadrature Q plane of the transmission signal is greater than 16 and less than or equal to 256. The advantageous effect of transmit diversity is achievable.
Transmission Method #4-9:
The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the fourth selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)). Accordingly, when the transmission device illustrated in FIG. 1 is the third transmission device (or the first transmission device), by using the fourth selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, a fifth selection method different than the fourth selection method that is used when transmitting a multi-carrier scheme modulated signal such as an OFDM modulated signal will be described.
Fifth Selection Method:
Transmission Method #5-1:
A single stream is transmitted (s1(i) is transmitted). The modulation scheme (of s1(i)) is BPSK (or $\pi/2$ shift BPSK) (however, the single stream modulated signal may be transmitted using a single antenna and, alternatively, transmitted using a plurality of antennas).
Transmission Method #5-2:
A single stream is transmitted (s1(i) is transmitted). The modulation scheme (of s1(i)) is QPSK (or $\pi/2$ shift QPSK) (however, the single stream modulated signal may be transmitted using a single antenna and, alternatively, transmitted using a plurality of antennas).
Transmission Method #5-3:
A single stream is transmitted (s1(i) is transmitted). The modulation scheme of s1(i) is 16QAM (or $\pi/2$ shift 16QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).
Transmission Method #5-4:
A single stream is transmitted (s1(i) is transmitted). The modulation scheme of s1(i) is 64QAM (or $\pi/2$ shift 64QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).
Transmission Method #5-5:
Two streams are transmitted (s1(i) and s2(i) are transmitted). The modulation scheme of s1(i) is BPSK (or $\pi/2$ shift BPSK), and the modulation scheme of s2(i) is BPSK (or $\pi/2$ shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians$\leq \theta < 2\pi$ radians)).
Transmission Method #5-6:
Two streams are transmitted (s1(i) and s2(i) are transmitted). The modulation scheme of s1(i) is QPSK (or $\pi/2$ shift QPSK), and the modulation scheme of s2(i) is QPSK (or $\pi/2$ shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians$\leq \theta < 2\pi$ radians)).

Transmission Method #5-7:

Two streams are transmitted (s1(i) and s2(i) are transmitted). The modulation scheme of s1(i) is QPSK (or $\pi/2$ shift QPSK), and the modulation scheme of s2(i) is 16QAM (or $\pi/2$ shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians$\leq \theta < 2\pi$ a radians)) (when $\theta = \pi/4$ radians (45 degrees), the average transmission power of the modulated signals transmitted from the antennas is equal).

Transmission Method #5-8:

Two streams are transmitted (s1(i) and s2(i) are transmitted). The modulation scheme of s1(i) is 16QAM (or $\pi/2$ shift 16QAM) (or a modulation scheme in which 16 signal points are in the in-phase I-quadrature Q plane, such as 16APSK (a shift may be performed)), and the modulation scheme of s2(i) is 16QAM (or $\pi/2$ shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta = 0$, and include at least one precoding matrix that satisfies any one of Equation (13) through Equation (20) in which $\theta \neq 0$.

Transmission Method #5-9:

Two streams are transmitted (s1(i) and s2(i) are transmitted). The modulation scheme of s1(i) is 64QAM (or $\pi/2$ shift 64QAM) (or a modulation scheme in which 64 signal points are in the in-phase I-quadrature Q plane, such as 16APSK (a shift may be performed)), and the modulation scheme of s2(i) is 64QAM (or $\pi/2$ shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians$\leq \theta < 2\pi$ radians)).

Alternatively, two streams are transmitted (s1(i) and s2(i) are transmitted). The modulation scheme of s1(i) is 64QAM (or $\pi/2$ shift 64QAM) (or a modulation scheme in which 64 signal points are in the in-phase I-quadrature Q plane, such as 16APSK (a shift may be performed)), and the modulation scheme of s2(i) is 64QAM (or $\pi/2$ shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta = 0$ radians in Equation (13) through Equation (20) (note that $\theta$ is greater than or equal to 0 radians and less than $2\pi$ radians (0 radians$\leq \theta < \pi$ radians)).

Alternatively, two streams are transmitted (s1(i) and s2(i) are transmitted). The modulation scheme of s1(i) is 64QAM (or $\pi/2$ shift 64QAM) (or a modulation scheme in which 64 signal points are in the in-phase I-quadrature Q plane, such as 64APSK (a shift may be performed)), and the modulation scheme of s2(i) is 64QAM (or $\pi/2$ shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Note that in the fifth selection method, the transmission method need not correspond to all transmission methods from transmission method #5-1 through transmission method #5-9. For example, in the fifth selection method, the transmission method may correspond to one or more transmission method from among the following three transmission methods: transmission method #5-5, transmission method #5-6, and transmission method #5-7. In the fifth transmission method, the transmission method may correspond to one or more transmission method from among the following two transmission methods: transmission method #5-8 and transmission method #5-9.

In the fifth selection method, the transmission method need not correspond to transmission method #4-1 (in the fifth selection method, the transmission method need not include transmission method #5-1 in the transmission method selection candidates in the transmission device illustrated in FIG. 1).

The fifth selection method may include a transmission method other than those from transmission method #5-1 to transmission method #5-9.

Here, the following is satisfied.
Transmission Method #5-1:
The number of signal points in the in-phase I-quadrature Q plane of the transmission signal is 2.
Transmission Method #5-2:
The number of signal points in the in-phase I-quadrature Q plane of the transmission signal is 4.
Transmission Method #5-3:
The number of signal points in the in-phase I-quadrature Q plane of the transmission signal is 16.
Transmission Method #5-4:
The number of signal points in the in-phase I-quadrature Q plane of the transmission signal is 64.
Transmission Method #5-5:
The number of signal points in the in-phase I-quadrature Q plane of the transmission signal is greater than 2 and less than or equal to 4. The advantageous effect of transmit diversity is achievable.
Transmission Method #5-6:
The number of signal points in the in-phase I-quadrature Q plane of the transmission signal is greater than 4 and less than or equal to 16. The advantageous effect of transmit diversity is achievable.
Transmission Method #5-7:
The number of signal points in the in-phase I-quadrature Q plane of the transmission signal is greater than 4 and less than or equal to 64. The advantageous effect of transmit diversity is achievable.
Transmission Method #5-8:
The number of signal points in the in-phase I-quadrature Q plane of the transmission signal is greater than or equal to 16 and less than or equal to 256. The advantageous effect of transmit diversity may be achievable.
Transmission Method #5-9:
The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the fifth selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)).

Accordingly, when the transmission device illustrated in FIG. 1 is the third transmission device (or the first transmission device), by using the fifth selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, a sixth selection method different than the fourth selection method and the fifth selection method that is used when transmitting a multi-carrier scheme modulated signal such as an OFDM modulated signal will be described.
Sixth Selection Method:
Transmission Method #6-1:
A single stream is transmitted (s1(i) is transmitted). The modulation scheme (of s1(i)) is BPSK (or π/2 shift BPSK) (however, the single stream modulated signal may be transmitted using a single antenna and, alternatively, transmitted using a plurality of antennas).

Transmission Method #6-2:

A single stream is transmitted (s1(i) is transmitted). The modulation scheme (of s1(i)) is QPSK (or π/2 shift QPSK) (however, the single stream modulated signal may be transmitted using a single antenna and, alternatively, transmitted using a plurality of antennas).
Transmission Method #6-3:

A single stream is transmitted (s1(i) is transmitted). The modulation scheme of s1(i) is 16QAM (or π/2 shift 16QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).
Transmission Method #6-4:

A single stream is transmitted (s1(i) is transmitted). The modulation scheme of s1(i) is 64QAM (or π/2 shift 64QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).
Transmission Method #6-5:

Two streams are transmitted (s1(i) and s2(i) are transmitted). The modulation scheme of s1(i) is BPSK (or π/2 shift BPSK), and the modulation scheme of s2(i) is BPSK (or π/2 shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.
Transmission Method #6-6:

Two streams are transmitted (s1(i) and s2(i) are transmitted). The modulation scheme of s1(i) is QPSK (or π/2 shift QPSK), and the modulation scheme of s2(i) is QPSK (or π/2 shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.
Transmission Method #6-7:

Two streams are transmitted (s1(i) and s2(i) are transmitted). The modulation scheme of s1(i) is QPSK (or π/2 shift QPSK), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π a radians)) (when θ=π/4 radians (45 degrees), the average transmission power of the modulated signals transmitted from the antennas is equal).
Transmission Method #6-8:

Two streams are transmitted (s1(i) and s2(i) are transmitted). The modulation scheme of s1(i) is 16QAM (or π/2 shift 16QAM) (or a modulation scheme in which 16 signal points are in the in-phase I-quadrature Q plane, such as 16APSK (a shift may be performed)), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation

(13) through Equation (20) (note that θ is greater than or equal to 0 radians and less than 2π radians (0 radians≤θ<2π radians)).

Transmission Method #6-9:

Two streams are transmitted (s1(i) and s2(i) are transmitted). The modulation scheme of s1(i) is 64QAM (or π/2 shift 64QAM) (or a modulation scheme in which 64 signal points are in the in-phase I-quadrature Q plane, such as 16APSK (a shift may be performed)), and the modulation scheme of s2(i) is 64QAM (or π/2 shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64QAM (or π/2 shift 64QAM) (or a modulation scheme in which 64 signal points are in the in-phase I-quadrature Q plane, such as 16APSK (a shift may be performed)), and the modulation scheme of s2(i) is 64QAM (or π/2 shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<π radians)).

Alternatively, two streams are transmitted (s1(i) and s2(i) are transmitted). The modulation scheme of s1(i) is 64QAM (or π/2 shift 64QAM) (or a modulation scheme in which 64 signal points are in the in-phase I-quadrature Q plane, such as 64APSK (a shift may be performed)), and the modulation scheme of s2(i) is 64QAM (or π/2 shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Note that in the sixth selection method, the transmission method need not correspond to all transmission methods from transmission method #6-1 through transmission method #6-9. For example, in the sixth selection method, the transmission method may correspond to one or more transmission method from among the following three transmission methods: transmission method #6-5, transmission method #6-6, and transmission method #6-7. In the sixth transmission method, the transmission method may correspond to one or more transmission method from among the following two transmission methods: transmission method #6-8 and transmission method #6-9.

In the sixth selection method, the transmission method need not correspond to transmission method #6-1 (in the sixth selection method, the transmission method need not include transmission method #6-1 in the transmission method selection candidates in the transmission device illustrated in FIG. 1).

The sixth selection method may include a transmission method other than those from transmission method #6-1 to transmission method #6-9.

Here, the following is satisfied.

Transmission Method #6-1:

The number of signal points in the in-phase I-quadrature Q plane of the transmission signal is 2.

Transmission Method #6-2:

The number of signal points in the in-phase I-quadrature Q plane of the transmission signal is 4.

Transmission Method #6-3:

The number of signal points in the in-phase I-quadrature Q plane of the transmission signal is 16.

Transmission Method #6-4:

The number of signal points in the in-phase I-quadrature Q plane of the transmission signal is 64.

Transmission Method #6-5:

The number of signal points in the in-phase I-quadrature Q plane of the transmission signal is greater than or equal to 2 and less than or equal to 4. There are cases in which the advantageous effect of transmit diversity is achievable.

Transmission Method #6-6:

The number of signal points in the in-phase I-quadrature Q plane of the transmission signal is greater than or equal to 4 and less than or equal to 16. There are cases in which the advantageous effect of transmit diversity is achievable.

Transmission Method #6-7:

The number of signal points in the in-phase I-quadrature Q plane of the transmission signal is greater than 4 and less than or equal to 64. The advantageous effect of transmit diversity is achievable.

Transmission Method #6-8:

The number of signal points in the in-phase I-quadrature Q plane of the transmission signal is greater than 16 and less than or equal to 256. The advantageous effect of transmit diversity is achievable.

Transmission Method #6-9:

The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the sixth selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)).

Accordingly, when the transmission device illustrated in FIG. 1 is the third transmission device (or the first transmission device), by using the sixth selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, a seventh selection method different than the fourth selection method, the fifth selection method, and the sixth selection method that is used when transmitting a multi-carrier scheme modulated signal such as an OFDM modulated signal will be described.

Seventh Selection Method:

Transmission Method #7-1:

A single stream is transmitted (s1(i) is transmitted). The modulation scheme (of s1(i)) is BPSK (or π/2 shift BPSK) (however, the single stream modulated signal may be transmitted using a single antenna and, alternatively, transmitted using a plurality of antennas).

Transmission Method #7-2:

A single stream is transmitted (s1(i) is transmitted). The modulation scheme (of s1(i)) is QPSK (or π/2 shift QPSK) (however, the single stream modulated signal may be transmitted using a single antenna and, alternatively, transmitted using a plurality of antennas).

Transmission Method #7-3:

A single stream is transmitted (s1(i) is transmitted). The modulation scheme of s1(i) is 16QAM (or π/2 shift 16QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #7-4:

A single stream is transmitted (s1(i) is transmitted). The modulation scheme of s1(i) is 64QAM (or π/2 shift 64QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #7-5:

Two streams are transmitted (s1(i) and s2(i) are transmitted). The modulation scheme of s1(i) is BPSK (or π/2 shift BPSK), and the modulation scheme of s2(i) is BPSK (or π/2 shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Transmission Method #7-6:

Two streams are transmitted (s1(i) and s2(i) are transmitted). The modulation scheme of s1(i) is QPSK (or π/2 shift QPSK), and the modulation scheme of s2(i) is QPSK (or π/2 shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Transmission Method #7-7:

Two streams are transmitted (s1(i) and s2(i) are transmitted). The modulation scheme of s1(i) is QPSK (or $\pi/2$ shift QPSK), and the modulation scheme of s2(i) is 16QAM (or $\pi/2$ shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians ($0 \text{ radians} \leq \theta < 2\pi$ a radians)) (when $\theta=\pi/4$ radians (45 degrees), the average transmission power of the modulated signals transmitted from the antennas is equal).

Transmission Method #7-8:

Two streams are transmitted (s1(i) and s2(i) are transmitted). The modulation scheme of s1(i) is 16QAM (or $\pi/2$ shift 16QAM) (or a modulation scheme in which 16 signal points are in the in-phase I-quadrature Q plane, such as 16APSK (a shift may be performed)), and the modulation scheme of s2(i) is 16QAM (or $\pi/2$ shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Transmission Method #7-9:

Two streams are transmitted (s1(i) and s2(i) are transmitted). The modulation scheme of s1(i) is 64QAM (or $\pi/2$ shift 64QAM) (or a modulation scheme in which 64 signal points are in the in-phase I-quadrature Q plane, such as 16APSK (a shift may be performed)), and the modulation scheme of s2(i) is 64QAM (or $\pi/2$ shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians ($0 \text{ radians} \leq \theta < 2\pi$ radians)).

Alternatively, two streams are transmitted (s1(i) and s2(i) are transmitted). The modulation scheme of s1(i) is 64QAM (or $\pi/2$ shift 64QAM) (or a modulation scheme in which 64 signal points are in the in-phase I-quadrature Q plane, such as 16APSK (a shift may be performed)), and the modulation scheme of s2(i) is 64QAM (or $\pi/2$ shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta=0$ radians in Equation (13) through Equation (20) (note that $\theta$ is greater than or equal to 0 radians and less than $2\pi$ radians ($0 \text{ radians} \leq \theta < \pi$ radians)).

Alternatively, two streams are transmitted (s1(i) and s2(i) are transmitted). The modulation scheme of s1(i) is 64QAM (or $\pi/2$ shift 64QAM) (or a modulation scheme in which 64 signal points are in the in-phase I-quadrature Q plane, such as 64APSK (a shift may be performed)), and the modulation scheme of s2(i) is 64QAM (or $\pi/2$ shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \ne 0$.

Note that in the seventh selection method, the transmission method need not correspond to all transmission methods from transmission method #7-1 through transmission method #7-9. For example, in the seventh selection method, the transmission method may correspond to one or more transmission method from among the following three transmission methods: transmission method #7-5, transmission method #7-6, and transmission method #7-7. In the seventh transmission method, the transmission method may correspond to one or more transmission method from among the following two transmission methods: transmission method #7-8 and transmission method #7-9.

In the seventh selection method, the transmission method need not correspond to transmission method #7-1 (in the seventh selection method, the transmission method need not include transmission method #7-1 in the transmission method selection candidates in the transmission device illustrated in FIG. 1). The seventh selection method may include a transmission method other than those from transmission method #7-1 to transmission method #7-9.

Here, the following is satisfied.
Transmission Method #7-1:
The number of signal points in the in-phase I-quadrature Q plane of the transmission signal is 2.
Transmission Method #7-2:
The number of signal points in the in-phase I-quadrature Q plane of the transmission signal is 4.
Transmission Method #7-3:
The number of signal points in the in-phase I-quadrature Q plane of the transmission signal is 16.
Transmission Method #7-4:
The number of signal points in the in-phase I-quadrature Q plane of the transmission signal is 64.

Transmission Method #7-5:
The number of signal points in the in-phase I-quadrature Q plane of the transmission signal is greater than or equal to 2 and less than or equal to 4. There are cases in which the advantageous effect of transmit diversity is achievable.
Transmission Method #7-6:
The number of signal points in the in-phase I-quadrature Q plane of the transmission signal is greater than or equal to 4 and less than or equal to 16. There are cases in which the advantageous effect of transmit diversity is achievable.
Transmission Method #7-7:
The number of signal points in the in-phase I-quadrature Q plane of the transmission signal is greater than 4 and less than or equal to 64. The advantageous effect of transmit diversity is achievable.
Transmission Method #7-8:
The number of signal points in the in-phase I-quadrature Q plane of the transmission signal is greater than or equal to 16 and less than or equal to 256. The advantageous effect of transmit diversity may be achievable.
Transmission Method #7-9:
The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the seventh selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)).

Accordingly, when the transmission device illustrated in FIG. 1 is the third transmission device (or the first transmission device), by using the seventh selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, an eighth selection method different than the fourth selection method, the fifth selection method, the sixth selection method, and the seventh selection method that is used when transmitting a multi-carrier scheme modulated signal such as an OFDM modulated signal will be described.

Eighth Selection Method:
Transmission Method #8-1:
A single stream is transmitted (s1(i) is transmitted). The modulation scheme (of s1(i)) is BPSK (or π/2 shift BPSK) (however, the single stream modulated signal may be transmitted using a single antenna and, alternatively, transmitted using a plurality of antennas).

Transmission Method #8-2:
A single stream is transmitted (s1(i) is transmitted). The modulation scheme (of s1(i)) is QPSK (or π/2 shift QPSK) (however, the single stream modulated signal may be transmitted using a single antenna and, alternatively, transmitted using a plurality of antennas).

Transmission Method #8-3:
A single stream is transmitted (s1(i) is transmitted). The modulation scheme of s1(i) is 16QAM (or π/2 shift 16QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #8-4:
A single stream is transmitted (s1(i) is transmitted). The modulation scheme of s1(i) is 64QAM (or π/2 shift 64QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #8-5:
Either one of transmission method #4-5 or transmission method #6-5.

Transmission Method #8-6:
Either one of transmission method #4-6 or transmission method #6-6.

Transmission Method #8-7:
Two streams are transmitted (s1(i) and s2(i) are transmitted). The modulation scheme of s1(i) is QPSK (or π/2 shift QPSK), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π a radians)).

Transmission Method #8-8:
Two streams are transmitted (s1(i) and s2(i) are transmitted). The modulation scheme of s1(i) is 16QAM (or π/2 shift 16QAM) (or a modulation scheme in which 16 signal points are in the in-phase I-quadrature Q plane, such as 16APSK (a shift may be performed)), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Transmission Method #8-9:
Two streams are transmitted (s1(i) and s2(i) are transmitted). The modulation scheme of s1(i) is 64QAM (or π/2 shift 64QAM) (or a modulation scheme in which 64 signal points are in the in-phase I-quadrature Q plane, such as 16APSK (a shift may be performed)), and the modulation scheme of s2(i) is 64QAM (or π/2 shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64QAM (or π/2 shift 64QAM) (or a modulation scheme in which 64 signal points are in the in-phase I-quadrature Q plane, such as 16APSK (a shift may be performed)), and the modulation scheme of s2(i) is 64QAM (or π/2 shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<π radians)).

Alternatively, two streams are transmitted (s1(i) and s2(i) are transmitted). The modulation scheme of s1(i) is 64QAM (or π/2 shift 64QAM) (or a modulation scheme in which 64 signal points are in the in-phase I-quadrature Q plane, such as 64APSK (a shift may be performed)), and the modulation scheme of s2(i) is 64QAM (or π/2 shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Note that in the eighth selection method, the transmission method need not correspond to all transmission methods from transmission method #8-1 through transmission method #8-9. For example, in the eighth selection method, the transmission method may correspond to one or more transmission method from among the following three transmission methods: transmission method #8-5, transmission method #8-6, and transmission method #8-7. In the eighth transmission method, the transmission method may correspond to one or more transmission method from among the following two transmission methods: transmission method #8-8 and transmission method #8-9.

In the eighth selection method, the transmission method need not correspond to transmission method #8-1 (in the eighth selection method, the transmission method need not include transmission method #8-1 in the transmission method selection candidates in the transmission device illustrated in FIG. 1). The eighth selection method may include a transmission method other than those from transmission method #8-1 to transmission method #8-9.

Here, the following is satisfied.
Transmission Method #8-1:
  The number of signal points in the in-phase I-quadrature Q plane of the transmission signal is 2.
Transmission Method #8-2:
  The number of signal points in the in-phase I-quadrature Q plane of the transmission signal is 4.
Transmission Method #8-3:
  The number of signal points in the in-phase I-quadrature Q plane of the transmission signal is 16.
Transmission Method #8-4:
  The number of signal points in the in-phase I-quadrature Q plane of the transmission signal is 64.
Transmission Method #8-5:
  The number of signal points in the in-phase I-quadrature Q plane of the transmission signal is greater than or equal to 2 and less than or equal to 4. There are cases in which the advantageous effect of transmit diversity is achievable.
Transmission Method #8-6:
  The number of signal points in the in-phase I-quadrature Q plane of the transmission signal is greater than or equal to 4 and less than or equal to 16. There are cases in which the advantageous effect of transmit diversity is achievable.
Transmission Method #8-7:
  The number of signal points in the in-phase I-quadrature Q plane of the transmission signal is greater than 4 and less than or equal to 64. The advantageous effect of transmit diversity is achievable.
Transmission Method #8-8:
  The number of signal points in the in-phase I-quadrature Q plane of the transmission signal is greater than 16 and less than or equal to 256. The advantageous effect of transmit diversity is achievable.
Transmission Method #8-9:
  The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the eighth selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)).

Accordingly, when the transmission device illustrated in FIG. 1 is the third transmission device (or the first transmission device), by using the eighth selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, a ninth selection method different than the fourth selection method, the fifth selection method, the sixth selection method, the seventh selection method, and the eighth selection method that is used when transmitting a multi-carrier scheme modulated signal such as an OFDM modulated signal will be described.

Ninth Selection Method:
Transmission Method #9-1:
  A single stream is transmitted (s1(i) is transmitted). The modulation scheme (of s1(i)) is BPSK (or π/2 shift BPSK) (however, the single stream modulated signal may be transmitted using a single antenna and, alternatively, transmitted using a plurality of antennas).

Transmission Method #9-2:

A single stream is transmitted (s1(i) is transmitted). The modulation scheme (of s1(i)) is QPSK (or π/2 shift QPSK) (however, the single stream modulated signal may be transmitted using a single antenna and, alternatively, transmitted using a plurality of antennas).

Transmission Method #9-3:

A single stream is transmitted (s1(i) is transmitted). The modulation scheme of s1(i) is 16QAM (or π/2 shift 16QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #9-4:

A single stream is transmitted (s1(i) is transmitted). The modulation scheme of s1(i) is 64QAM (or π/2 shift 64QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #9-5:

Either one of transmission method #4-5 or transmission method #6-5.

Transmission Method #9-6:

Either one of transmission method #4-6 or transmission method #6-6.

Transmission Method #9-7:

Two streams are transmitted (s1(i) and s2(i) are transmitted). The modulation scheme of s1(i) is QPSK (or π/2 shift QPSK), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π a radians)).

Transmission Method #9-8:

Two streams are transmitted (s1(i) and s2(i) are transmitted). The modulation scheme of s1(i) is 16QAM (or π/2 shift 16QAM) (or a modulation scheme in which 16 signal points are in the in-phase I-quadrature Q plane, such as 16APSK (a shift may be performed)), and the modulation scheme of s2(i) is 16QAM (or π/2 shift 16QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Transmission Method #9-9:

Two streams are transmitted (s1(i) and s2(i) are transmitted). The modulation scheme of s1(i) is 64QAM (or π/2 shift 64QAM) (or a modulation scheme in which 64 signal points are in the in-phase I-quadrature Q plane, such as 16APSK (a shift may be performed)), and the modulation scheme of s2(i) is 64QAM (or π/2 shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64QAM (or π/2 shift 64QAM) (or a modulation scheme in which 64 signal points are in the in-phase I-quadrature Q plane, such as 16APSK (a shift may be performed)), and the modulation scheme of s2(i) is 64QAM (or π/2 shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<π radians)).

Alternatively, two streams are transmitted (s1(i) and s2(i) are transmitted). The modulation scheme of s1(i) is 64QAM (or $\pi/2$ shift 64QAM) (or a modulation scheme in which 64 signal points are in the in-phase I-quadrature Q plane, such as 64APSK (a shift may be performed)), and the modulation scheme of s2(i) is 64QAM (or $\pi/2$ shift 64QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Note that in the ninth selection method, the transmission method need not correspond to all transmission methods from transmission method #9-1 to transmission method #9-9. For example, in the ninth selection method, the transmission method may correspond to one or more transmission method from among the following three transmission methods: transmission method #9-5, transmission method #9-6, and transmission method #9-7. In the ninth transmission method, the transmission method may correspond to one or more transmission method from among the following two transmission methods: transmission method #9-8 and transmission method #9-9.

In the ninth selection method, the transmission method need not correspond to transmission method #9-1 (in the ninth selection method, the transmission method need not include transmission method #9-1 in the transmission method selection candidates in the transmission device illustrated in FIG. 1).

The ninth selection method may include a transmission method other than those from transmission method #9-1 to transmission method #9-9.

Here, the following is satisfied.
Transmission Method #9-1:
The number of signal points in the in-phase I-quadrature Q plane of the transmission signal is 2.
Transmission Method #9-2:
The number of signal points in the in-phase I-quadrature Q plane of the transmission signal is 4.
Transmission Method #9-3:
The number of signal points in the in-phase I-quadrature Q plane of the transmission signal is 16.
Transmission Method #9-4:
The number of signal points in the in-phase I-quadrature Q plane of the transmission signal is 64.
Transmission Method #9-5:
The number of signal points in the in-phase I-quadrature Q plane of the transmission signal is greater than or equal to 2 and less than or equal to 4. There are cases in which the advantageous effect of transmit diversity is achievable.
Transmission Method #9-6:
The number of signal points in the in-phase I-quadrature Q plane of the transmission signal is greater than or equal to 4 and less than or equal to 16. There are cases in which the advantageous effect of transmit diversity is achievable.
Transmission Method #9-7:
The number of signal points in the in-phase I-quadrature Q plane of the transmission signal is greater than 4 and less than or equal to 64. The advantageous effect of transmit diversity is achievable.
Transmission Method #9-8:
The number of signal points in the in-phase I-quadrature Q plane of the transmission signal is greater than or equal to 16 and less than or equal to 256. The advantageous effect of transmit diversity may be achievable.
Transmission Method #9-9:
The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the ninth selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)).

Accordingly, when the transmission device illustrated in FIG. 1 is the third transmission device (or the first transmission device), by using the ninth selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, application examples will be given of a single-carrier transmission method and a multi-carrier scheme transmission method such as an OFDM transmission method as described above.

For example, assume that communications standard α exists as a radio communications method. The frequency band used in communications standard α is predetermined, and in communications standard α, one or more frequency bands are set. In such cases, communications standard α is capable of both single-carrier modulated signal transmission and multi-carrier modulated signal transmission, such as OFDM modulated signal transmission.

Moreover, communications standard α supports any one of the first selection method, second selection method, or third selection method described in Embodiment 1 as single-carrier transmission, and supports any one of the fourth selection method, fifth selection method, sixth selection method, seventh selection method, eighth selection method, or ninth selection method described in this embodiment as multi-carrier transmission such as OFDM transmission.

Accordingly, based on the descriptions of the first transmission device, second transmission device, and third transmission device, the following three types of transmission devices can be considered.

Fourth Transmission Device:

The fourth transmission device is a transmission device capable of selectively transmitting both a single-carrier scheme modulated signal in accordance with communications standard α and a multi-carrier scheme modulated signal such as an OFDM modulated signal in accordance with communications standard α. Control signal 100 in the transmission device illustrated in FIG. 1 includes control information for specifying transmission using a single-carrier scheme or transmission using a multi-carrier scheme such as OFDM, and when control signal 100 indicates transmission using a single-carrier scheme, the transmission device illustrated in FIG. 1 transmits a single-carrier scheme modulated signal in accordance with communications standard α, and when control signal 100 indicates transmission using a multi-carrier scheme such as OFDM, the transmission device illustrated in FIG. 1 transmits a multi-carrier scheme modulated signal such as an OFDM modulated signal in accordance with communications standard α. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

Fifth Transmission Device:

The fifth transmission device is a transmission device capable of transmitting a single-carrier scheme modulated signal in accordance with communications standard α. When control signal 100 in the transmission device illustrated in FIG. 1 includes control information for specifying transmission using a single-carrier scheme or transmission using a multi-carrier scheme such as OFDM, the second transmission device can only select transmission using a single-carrier scheme as this control information. Accordingly, the transmission device illustrated in FIG. 1 transmits a single-carrier scheme modulated signal in accordance with communications standard α. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

Sixth Transmission Device:

The sixth transmission device is a transmission device capable of transmitting a multi-carrier scheme modulated signal such as an OFDM modulated signal in accordance with communications standard α. When control signal 100 in the transmission device illustrated in FIG. 1 includes control information for specifying transmission using a single-carrier scheme or transmission using a multi-carrier scheme such as OFDM, the second transmission device can only select transmission using a multi-carrier scheme such as OFMD as this control information. Accordingly, the transmission device illustrated in FIG. 1 transmits a multi-carrier scheme modulated signal such as a OFDM modulated signal in accordance with communications standard α. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

When the fourth transmission device supports communications standard α, for example, transmission of a single-carrier scheme modulated signal in accordance with single-carrier scheme and transmission of a multi-carrier scheme modulated signal such as a OFDM signal in accordance with communications standard α correspond with a common RF unit and common transmission power amplifier in the transmission device, a RF unit and transmission power amplifier that exhibit small influence of phase noise and non-linear distortion may be used for the multi-carrier scheme modulated signal such as a OFDM signal that conforms to communications standard α. Accordingly, for the single-carrier scheme modulated signal that conforms to communications standard α as well, influence of phase noise and non-linear distortion is small, and with this transmission device, regardless of whether a single-carrier scheme demodulated signal that conforms to communications standard α or a multi-carrier scheme modulated signal such as a OFDM modulated signal that conforms to communications standard α is transmitted, the reception device has an advantageous effect that it can achieve a high data reception quality.

Another example is as follows. In the fourth transmission device, when a single-carrier scheme modulated signal is transmitted in accordance with communications standard α, an RF unit and transmission power amplifier that are dedicated for single-carrier scheme modulated signal usage are used, and when a multi-carrier scheme modulated signal such as an OFDM modulated signal is transmitted in accordance with communications standard α, an RF unit and transmission power amplifier that are dedicated for multi-carrier scheme modulated signal such as OFDM modulated signal usage are used.

Accordingly, regardless of whether a single-carrier scheme demodulated signal that conforms to communications standard α or a multi-carrier scheme modulated signal such as a OFDM modulated signal that conforms to communications standard α is transmitted by this transmission device, the reception device has an advantageous effect that it can achieve a high data reception quality. Moreover, when this transmission device transmits a single-carrier scheme modulated signal in accordance with communications standard α, a suitable RF unit and transmission power amplifier can be used, which yields an advantageous effect that it is possible to reduce power consumption.

The fifth transmission device transmits a single-carrier scheme modulated signal in accordance with communications standard α. Here, as described in Embodiments 1 and 2, the transmission methods that are capable of performing transmission are limited in the selection methods, and thus, it is possible to reduce PAPR. Accordingly, it is possible to reduce the influence of phase noise and non-linear distortion, and in the reception device that receives the modulated signal transmitted by the transmission device, it is possible to achieve an advantageous effect that data reception quality can be improved, and in the transmission device, it is possible to achieve an advantageous effect that an RF unit and transmission power amplifier that are small in circuitry scale and are low-consumption can be used.

The sixth transmission device transmits a multi-carrier scheme modulated signal such as an OFDM modulated signal in accordance with communications standard α. Here, as described in Embodiment 2, the transmission methods that are capable of performing transmission are limited in the selection methods, and thus, in the reception device that receives the modulated signal transmitted by the transmission device, there is an advantageous effect that data reception quality is improved.

As described above, in communications standard α that supports both single-carrier transmission and multi-carrier transmission such as OFDM transmission, it is important that the transmission method for single-carrier transmission and the transmission method for multi-carrier transmission such as OFDM transmission include different aspects. This makes it possible to achieve the advantageous effects described above.

Note that a spread spectrum communication method may be used for the single-carrier scheme modulated signal, and a spread spectrum communication method may be used for the multi-carrier scheme modulated signal such as a OFDM modulated signal.

(Supplemental Information)

As a matter of course, the present disclosure may be carried out by combining a plurality of the exemplary embodiments and other contents described herein.

Moreover, the embodiments are merely examples. For example, while a "modulation scheme, an error correction coding method (error correction code, code length, encode rate, etc., to be used), control information, etc." are exemplified, it is possible to carry out the present disclosure with the same configuration even when other types of a "modulation scheme, an error correction coding method (error correction code, code length, encode rate, etc., to be used), control information, etc." are applied.

Regarding the modulation scheme, even when a modulation scheme other than the modulation schemes described herein is used, it is possible to carry out the embodiments and the other subject matter described herein. For example, amplitude phase shift keying (APSK) (such as 16APSK, 64APSK, 128APSK, 256APSK, 1024APSK and 4096APSK), pulse amplitude modulation (PAM) (such as 4PAM, 8PAM, 16PAM, 64PAM, 128PAM, 256PAM, 1024PAM and 4096PAM), phase shift keying (PSK) (such as BPSK, QPSK, 8PSK, 16PSK, 64PSK, 128PSK, 256PSK, 1024PSK and 4096PSK), and quadrature amplitude modulation (QAM) (such as 4QAM, 8QAM, 16QAM, 64QAM, 128QAM, 256QAM, 1024QAM and 4096QAM) may be applied, or in each modulation scheme, uniform mapping or non-uniform mapping may be performed. Moreover, a method for arranging 2, 4, 8, 16, 64, 128, 256, 1024, etc., signal points on an I-Q plane (a modulation scheme having 2, 4, 8, 16, 64, 128, 256, 1024, etc., signal points) is not limited to a signal point arrangement method of the modulation schemes described herein.

In the present disclosure, it can be considered that the apparatus which includes the transmission device is a communications and broadcast apparatus, such as a broadcast station, a base station, an access point, a terminal or a mobile phone. In such cases, it can be considered that the apparatus that includes the reception device is a communication apparatus such as a television, a radio, a terminal, a personal computer, a mobile phone, an access point, or a base station. Moreover, it can also be considered that the transmission device and reception device according to the present disclosure are each a device having communication functions that is formed so as to be connectable via some interface to an apparatus for executing an application in, for example, a television, a radio, a personal computer or a mobile phone. Moreover, in this embodiment, symbols other than data symbols, such as pilot symbols (preamble, unique word, post-amble, reference symbol, etc.) or symbols for control information, may be arranged in any way in a frame. Here, the terms "pilot symbol" and "control information" are used, but the naming of such symbols is not important; the functions that they perform are.

A pilot symbol may be a known symbol that is modulated using PSK modulation in a transceiver (alternatively, a symbol transmitted by a transmitter can be known by a receiver by the receiver being periodic), and the receiver detects, for example, frequency synchronization, time synchronization, and a channel estimation (channel state information (CSI)) symbol (of each modulated signal) by using the symbol.

Moreover, the symbol for control information is a symbol for transmitting information required to be transmitted to a communication partner in order to establish communication pertaining to anything other than data (such as application data) (this information is, for example, the modulation scheme, error correction encoding method, or encode rate of the error correction encoding method used in the communication, or settings information in an upper layer).

Note that the present invention is not limited to each exemplary embodiment, and can be carried out with various modifications. For example, in each embodiment, the present disclosure is described as being performed as a communications device. However, the present disclosure is not limited to this case, and this communications method can also be used as software.

Note that a program for executing the above-described communications method may be stored in Read Only Memory (ROM) in advance to cause a Central Processing Unit (CPU) to operate this program.

Moreover, the program for executing the communications method may be stored in a computer-readable storage medium, the program stored in the recording medium may be recorded in RAM (Random Access Memory) in a computer, and the computer may be caused to operate according to this program.

Each configuration of each of the above-described embodiments, etc., may be realized as a LSI (large scale integration) circuit, which is typically an integrated circuit. These integrated circuits may be formed as separate chips, or may be formed as one chip so as to include the entire configuration or part of the configuration of each embodiment. LSI is described here, but the integrated circuit may also be referred to as an IC (integrated circuit), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a programmable Field Programmable Gate Array (FPGA) or a reconfigurable processor which is reconfigurable in connection or settings of circuit cells inside the LSI circuit may be used. Further, when development of a semiconductor technology or another derived technology provides a circuit integration technology which replaces LSI, as a matter of course, functional blocks may be integrated by using this technology. Adaption of biotechnology, for example, is a possibility.

Figure 22:
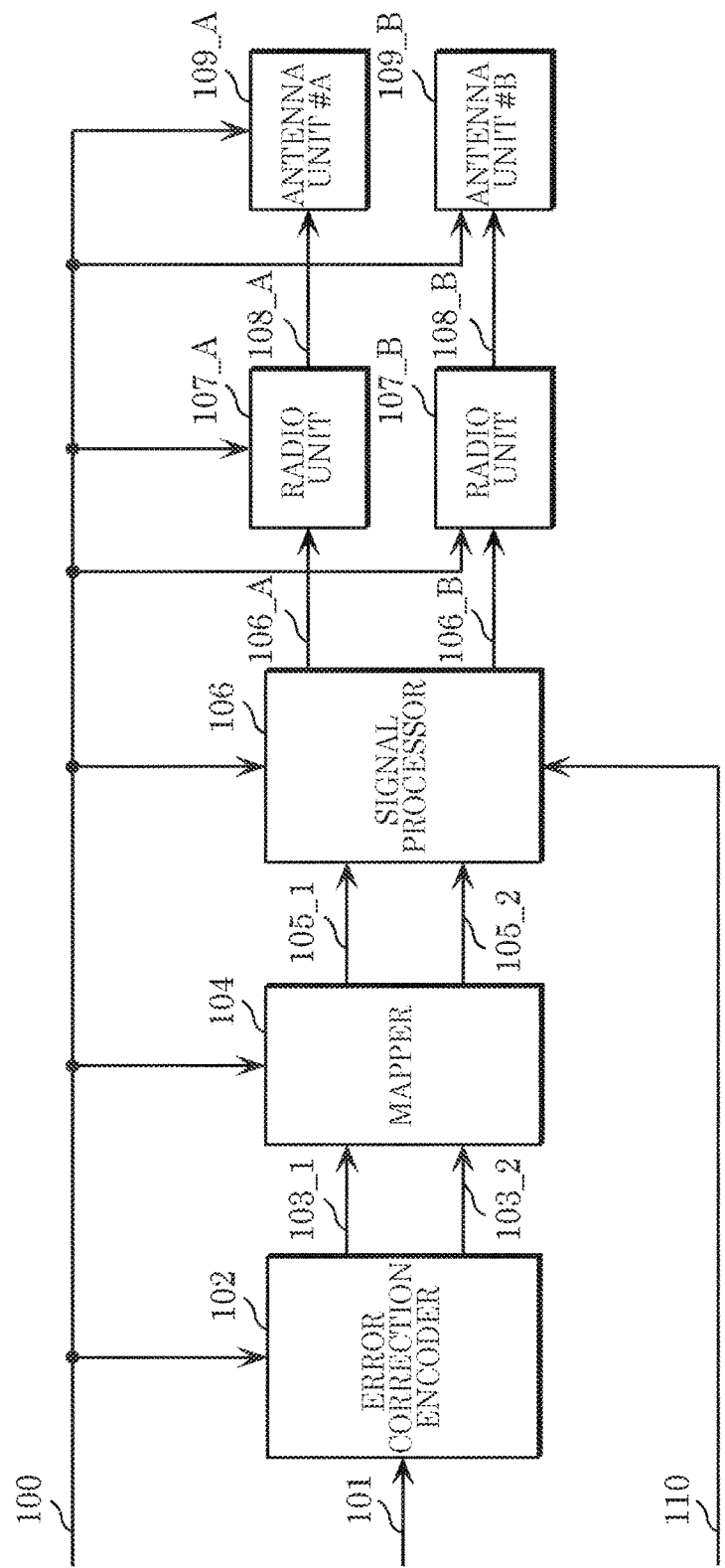
FIG. 22 illustrates one example of a configuration of a transmission device.

Moreover, in the embodiments of the present specification, the description of the configuration of the transmission device was given based on the configuration illustrated in FIG. 1, but the configuration of the transmission device is not limited to this example; for example, the transmission device may have the configuration illustrated in FIG. 22, and further, this may be applied to each of the embodiments.

In FIG. 22, components that operate the same as in FIG. 1 share like reference marks. Accordingly, descriptions that overlap with, for example, FIG. 1 will be omitted.

FIG. 22 differs in operation from FIG. 1 in that error correction encoder 102 outputs encoded data 103_1, 103_2. For example, error correction encoder 102 is a component that encodes block code such as low density parity check (LDPC) code. Here, the 2n−1-th block encoded data is output as encoded data 103_1, and the 2n-th block encoded data is output as encoded data 103_1 (n is an integer that is greater than or equal to 1).

Mapper 104 performs the modulation scheme mapping specified based on encoded data 103_1 to output mapped signal 105_1, and performs the modulation scheme mapping specified based on encoded data 103_2 to output mapped signal 105_2.

Figure 23:
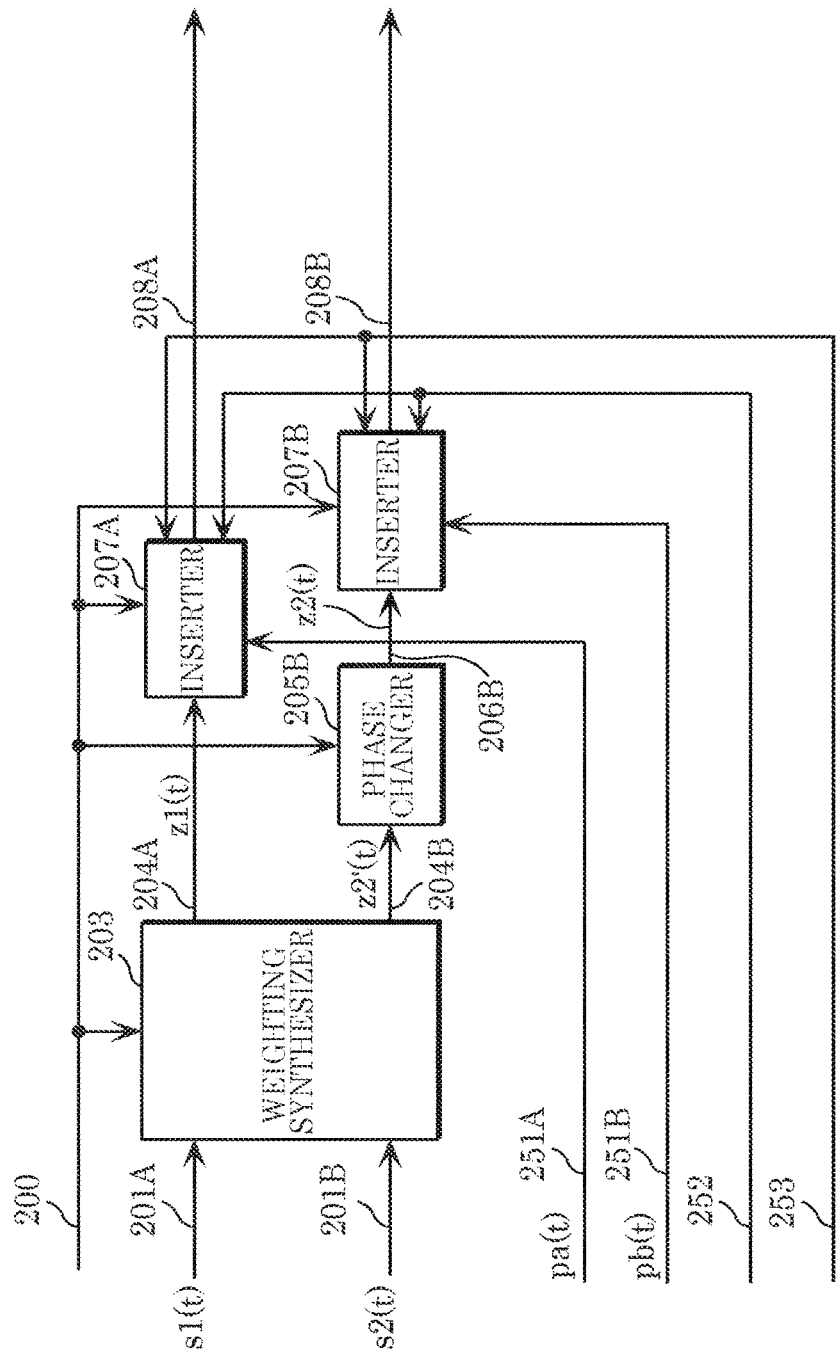
FIG. 23 illustrates one example of a configuration of a signal processor in a transmission device.

Moreover, the embodiments in the present specification described the configuration of signal processor 106 illustrated in FIG. 1 and FIG. 22 based on the configuration illustrated in FIG. 2, but signal processor 106 may have the configuration illustrated in FIG. 23 instead of FIG. 2, and further, this may be applied to each of the embodiments.

In FIG. 23, components that operate the same as in FIG. 2 share like reference marks. Accordingly, descriptions that overlap with, for example, FIG. 2 will be omitted.

FIG. 23 differs from FIG. 2 in that phase changer 209B illustrated in FIG. 2 is omitted.

Accordingly, baseband signal 208A corresponds to signal-processed signal 106_A in FIG. 1, FIG. 22, and baseband signal 208B corresponds to signal-processed signal 106_B in FIG. 1, FIG. 22.

In the present specification, even if the specifics of the transmission device configuration are different, by generating a signal equivalent to any one of signal-processed signal 106_A, 106_B described above in any of the embodiments of the present specification and transmitting the signal using a plurality of antenna units, when the reception device is in an environment in which direct waves are dominant, in particular when in an LOS environment, it is possible to achieve an advantageous effect in which the reception quality of the reception device that is performing MIMO data symbol transferring (transfer via a plurality of streams) can be improved (other advantageous effects described in the present specification are also achievable).

Note that in signal processor 106 illustrated in FIG. 1 and FIG. 22, a phase change may be provided both before and after weighting synthesizer 203. More specifically, signal processor 106 includes, before weighting synthesizer 203, one or both of phase changer 205A_1 that generates phase-changed signal 2801A by applying a phase change to mapped signal 201A, and phase changer 205B_1 that generates phase-changed signal 2801B by applying a phase change to mapped signal 201B. Signal processor 106 further includes, before inserter 207A, 207B, one or both of phase changer 205A_2 that generates phase-changed signal 206A by applying a phase change to weighting synthesized signal 204A, and phase changer 205B_2 that generates phase-changed signal 206B by applying a phase change to weighting synthesized signal 204B.

Here, when signal processor 106 includes phase changer 205A_1, one input of weighting synthesizer 203 is phase-changed signal 2801A, and when signal processor 106 does not include phase changer 205A_1, one input of weighting synthesizer 203 is mapped signal 201A. When signal processor 106 includes phase changer 205B_1, the other input of weighting synthesizer 203 is phase-changed signal 2801B, and when signal processor 106 does not include phase changer 205B_1, the other input of weighting synthesizer 203 is mapped signal 201B. When signal processor 106 includes phase changer 205A_2, the input of inserter 207A is phase-changed signal 206A, and when signal processor 106 does not include phase changer 205A_2, the input of inserter 207A is weighting synthesized signal 204A. When signal processor 106 includes phase changer 205B_2, the input of inserter 207B is phase-changed signal 206B, and when signal processor 106 does not include phase changer 205B_2, the input of inserter 207B is weighting synthesized signal 204B.

Moreover, the transmission device illustrated in FIG. 1 and FIG. 22 may include a second signal processor that implements different signal processing on signal-processed signal 106_A, 106_B, i.e., the output of signal processor 106. Here, radio unit 107_A receives an input of signal A processed with second signal processing and performs predetermined processing on the input signal, and radio unit 107_B receives an input of signal B processed with second signal processing and performs predetermined processing on the input signal, where signal A and signal B processed with second signal processing are two signals output from a second signal processor.

When signal processor 106 further includes, before inserter 207A, 207B, both of phase changer 205A_2 that generates phase-changed signal 206A by applying a phase change to weighting synthesized signal 204A, and phase changer 205B_2 that generates phase-changed signal 206B by applying a phase change to weighting synthesized signal 204B, phase-changed signals 206A (z1(i)), 206B(z2(i)) input into inserters 207A, 207B can be expressed by overwriting the following found in Equation (3) and Equation (37) through Equation (45):

[MATH. 47]

$$\begin{pmatrix} 1 & 0 \\ 0 & y(i) \end{pmatrix}$$

with

[MATH. 48]

$$\begin{pmatrix} y_A(i) & 0 \\ 0 & y_B(i) \end{pmatrix}$$

as a first replacement. When this first replacement is made in Equation (3) and Equation (37) through Equation (45), with respect to all configurations described with reference to Equation (3) and Equation (37) through Equation (45) in the present specification, the resulting equations may be applied as variations.

Note that phase change value A(yA(i)) and phase change value B(yB(i)) in the above equations can respectively be expressed as yA(i)=$e^{j \times \delta A(i)}$ and yB(i)=$e^{j \times \delta B(i)}$. Here, δA(i) and δB(i) are real numbers. δA(i) and δB(i) are set such that a result of a modulo operation of the divisor 2π with respect to δA(i)-δB(i) changes in a cycle N (N is an integer that is greater than or equal to N) However, how δA(i) and δB(i) are set is not limited to this example. For example, a method in which phase change value A(yA(i)) and phase change value B(yB(i)) each change cyclically or regularly, and the difference (yA(i)/yB(i)) between phase change values A and B changes cyclically or regularly may be used.

When signal processor 106 does not include, before inserter 207A, 207B, either one of phase changer 205A_2 that generates phase-changed signal 206A by applying a phase change to weighting synthesized signal 204A, and phase changer 205B_2 that generates phase-changed signal 206B by applying a phase change to weighting synthesized signal 204B, phase-changed signal 206A (z1(i)) and weighting synthesized signal 204B (z2(i)) input into inserters 207A, 207B can be expressed by overwriting the following found in Equation (3) and Equation (37) through Equation (45):

[MATH. 49]

$$\begin{pmatrix} 1 & 0 \\ 0 & y(i) \end{pmatrix}$$

with

[MATH. 50]

$$\begin{pmatrix} y(i) & 0 \\ 0 & 1 \end{pmatrix}$$

as a second replacement. When this second replacement is made in Equation (3) and Equation (37) through Equation (45), with respect to all configurations described with reference to Equation (3) and Equation (37) through Equation (45) in the present specification, the resulting equations may be applied as variations.

For example, phase change value y(i) is set as indicated in Equation (2). However, the method for setting phase change value y(i) is not limited to the method used in Equation (2); for example, a method in which the phase is changed cyclically or regularly is conceivable.

Note that in Embodiment 1, it is described that when the modulation scheme used for mapped signal 201A (s1(i)) is QPSK and the modulation scheme used for mapped signal 201B (s2(i)) is 16QAM, the values for u and v in Equation (37) may be set as follows to achieve good data reception quality in the reception device:

[MATH. 51]

$$u = \sqrt{\frac{2}{3}} \quad \text{Equation (51)}$$

[MATH. 52]

$$u = \sqrt{\frac{4}{3}} \quad \text{Equation (52)}$$

or

[MATH. 53]

$$u = a \times \sqrt{\frac{2}{3}} \quad \text{Equation (53)}$$

[MATH. 54]

$$u = a \times \sqrt{\frac{4}{3}} \quad \text{Equation (54)}$$

However, examples of settings for the values of u and v that can achieve good data reception quality in the reception device when the modulation scheme used for mapped signal 201A (s1(i)) is QPSK and the modulation scheme used for mapped signal 201B (s2(i)) is 16QAM is not limited to the combination of Equation (51) and Equation (52) and the combination of Equation (53) and Equation (54).

Consider the following two examples.

Consider, as the first example, that the error correction encoding scheme used by error correction encoder 102 to generate encoded data 103 is selectable between a first error correction encoding scheme and a second error correction encoding scheme that is different from the first error correction encoding scheme in regard to one or both of the encode rate and code length.

Consider, as the second example, that a plurality of the error correction encoders illustrated in FIG. 1 are provided, and in any one of the error correction encoders, one or both of the encode rate and code length of the error correction code are changed.

Next, the first and second examples will be discussed further.

Mapper 104 uses a first modulation scheme to generate mapped signal 201A (s1(i)), and uses a second modulation scheme different from the first modulation scheme to generate mapped signal 201B (s2(i)). Here, when signal processor 106 uses the first error correction encoding scheme as the error correction encoding scheme and uses the first and second modulation schemes as a combination of modulation schemes, values u1 and v1 are used as the values for u and v, respectively, in Equation (37). Moreover, when signal processor 106 uses the second error correction encoding scheme as the error correction encoding scheme and uses the first and second modulation schemes as a combination of modulation schemes, values u2 and v2 are used as the values for u and v, respectively, in Equation (37). Here, when the ratio of u1 and v1 differs from the ratio of u2 and v2, compared to when the ratio of u1 and v1 is the same as the ratio of u2 and v2, there is a probability that the reception device can achieve good data reception quality.

Note that in the above description, the ratio of values of u and v in Equation (37) was described as being changed when the encode rate or code length or both of the error correction encoding scheme used by error correction encoder 102 to generate encoded data 103 is different, but the ratio of the u and v values may be changed based on conditions other than the encode rate or code length of the error correction encoding scheme. For example, signal processor 106 may change the ratio of the u and v values in accordance with a combination of modulation schemes used as the first modulation scheme and the second modulation scheme. Furthermore, as one other example, even when error correction encoding schemes are equal and the combination of modulation schemes used as the first modulation scheme and the second modulation scheme are equal, signal processor 106 may change the ratio of the values of u and v so as to differ between when a single-carrier scheme modulated signal is transmitted and a multi-carrier scheme modulated signal such as an OFDM modulated signal is transmitted. This configuration makes it possible for reception device to achieve good data reception quality.

INDUSTRIAL APPLICABILITY

The present disclosure is applicable in radio communications systems using a single-carrier scheme and/or a multi-carrier scheme.

REFERENCE MARKS IN THE DRAWINGS 100 control signal
101 data
102 error correction encoder
103 encoded data
104 mapper
105_1, 105_2 baseband signal
106 signal processor
106_A, 106_B signal-processed signal
107_A, 107_B radio unit
108_A, 108_B transmission signal
109_A, 109_B antenna unit

What is claimed is:
1. A transmission method, comprising:
generating modulated quadrature phase shift keying (QPSK) points s1(i) by using bits of a first stream and generating modulated 16-quadrature amplitude modulation (QAM) points s2(i) by using bits of a second stream, where i is an integer greater than or equal to 0;
converting the modulated QPSK points s1(i) to first converted points z1(i) by multiplying the modulated QPSK points s1(i) by $\sqrt{2/3}$;
converting the modulated 16-QAM points s2(i) to second converted points z2(i) by multiplying the modulated 16-QAM points s2(i) by $\sqrt{4/3}$; and
generating one or more signals that include the first converted points z1(i) and the second converted points z2(i).
2. The transmission method of claim 1, wherein the first converted points z1(i) and the second converted points z2(i) are defined as:

$$\begin{pmatrix} z1(i) \\ z2(i) \end{pmatrix} = \begin{pmatrix} 1 & 0 \\ 0 & e^{j\delta(i)} \end{pmatrix} \begin{pmatrix} \cos\frac{\pi}{4} & \sin\frac{\pi}{4} \\ \sin\frac{\pi}{4} & -\cos\frac{\pi}{4} \end{pmatrix} \begin{pmatrix} \sqrt{2/3} & 0 \\ 0 & \sqrt{4/3} \end{pmatrix} \begin{pmatrix} s1(i) \\ s2(i) \end{pmatrix},$$

where j is an imaginary number unit and $\delta(i)$ is a real number.
3. The transmission method of claim 2, wherein the real number is incremented by a constant value for every i.
4. The transmission method of claim 3, wherein a value of $\delta(i)$ periodically varies with a period of N, wherein N is an integer.
5. The transmission method of claim 4, wherein N is eight.
6. The transmission method of claim 3, wherein the constant value is $2\pi/N$, where N is an integer greater than or equal to two.
7. The transmission method of claim 1, further comprising:
generating the first converted points z1(i) or the second converted points z2(i) based on one or more phase change values.
8. The transmission method of claim 1, further comprising:
transmitting the one or more signals using a plurality of antennas.
9. The transmission method of claim 1, further comprising:
receiving a control signal;
selecting a precoding matrix from a plurality of precoding matrixes based on the control signal; and
performing a precoding based on the precoding matrix.
10. A processor comprising:
storage media having instructions; and
processing circuitry coupled with the storage media, the processing circuitry to execute the instructions to:
generate modulated quadrature phase shift keying (QPSK) points s1(i) by using bits of a first stream and to generate modulated 16-quadrature amplitude modulation (QAM) points s2(i) by using bits of a second stream, where i is an integer greater than or equal to 0;
convert the modulated QPSK points s1(i) to first converted points z1(i) by multiplying the modulated QPSK points s1(i) by $\sqrt{2/3}$ and to convert the modulated 16-QAM points s2(i) to second converted points z2(i) by multiplying the modulated 16-QAM points s2(i) by $\sqrt{4/3}$; and
generate one or more signals that include the first converted points z1(i) and the second converted points z2(i).
11. The processor of claim 10, wherein the first converted points z1(i) and the second converted points z2(i) are defined as:

$$\begin{pmatrix} z1(i) \\ z2(i) \end{pmatrix} = \begin{pmatrix} 1 & 0 \\ 0 & e^{j\delta(i)} \end{pmatrix} \begin{pmatrix} \cos\frac{\pi}{4} & \sin\frac{\pi}{4} \\ \sin\frac{\pi}{4} & -\cos\frac{\pi}{4} \end{pmatrix} \begin{pmatrix} \sqrt{2/3} & 0 \\ 0 & \sqrt{4/3} \end{pmatrix} \begin{pmatrix} s1(i) \\ s2(i) \end{pmatrix},$$

where j is an imaginary number unit and $\delta(i)$ is a real number.
12. The processor of claim 11, wherein the real number is incremented by a constant value for every i.
13. The processor of claim 11, wherein a value of $\delta(i)$ periodically varies with a period of N, wherein N is an integer.
14. The processor of claim 11, wherein N is eight.
15. The processor of claim 11, wherein $e^{j\delta(i)}$ is a phase change value.
16. The processor of claim 10, wherein the processing circuitry is to execute the instructions to:
output the one or more signals to a transmitter for transmission.
17. The processor of claim 16, wherein the
transmitter is to transmit the one or more signals using a plurality of antennas.
18. A method comprising:
processing one or more reception signals that include a first converted signal z1(i) and a second converted signal z2(i),
wherein i is an integer greater than or equal to 0, the first converted signal z1(i) is generated by multiplying modulated quadrature phase shift keying (QPSK)

points s1(i) by $\sqrt{2/3}$, the second converted signal z2(i) is generated by multiplying modulated 16-quadrature amplitude modulation (QAM) points s2(i) by $\sqrt{4/3}$, the modulated QPSK points s1(i) are generated by using bits of a first stream, and the modulated 16-QAM points s2(i) are generated by using bits of a second stream; and deconverting the first converted signal z1(i) according to a conversion applied to the modulated QPSK points s1(i) and deconverting the second converted signal z2(i) according to a conversion applied to the modulated 16-QAM points s2(i).

19. The method of claim 18, wherein the first converted signal z1(i) and the second converted signal z2(i) are defined as:

$$\begin{pmatrix} z1(i) \\ z2(i) \end{pmatrix} = \begin{pmatrix} 1 & 0 \\ 0 & e^{j\delta(i)} \end{pmatrix} \frac{1}{\sqrt{2}} \begin{pmatrix} 1 & 1 \\ 1 & -1 \end{pmatrix} \begin{pmatrix} \sqrt{2/3} & 0 \\ 0 & \sqrt{4/3} \end{pmatrix} \begin{pmatrix} s1(i) \\ s2(i) \end{pmatrix},$$

where j is an imaginary number unit, and δ(i) is a real number incremented by a constant value for every i.

20. The method of claim 18, wherein the conversion applied to the modulated QPSK points s1(i) and the conversion applied to the modulated 16-QAM points s2(i) are based on one or more phase change values.

* * * * *